(12) United States Patent
Shoji et al.

(10) Patent No.: US 10,738,384 B2
(45) Date of Patent: Aug. 11, 2020

(54) SURFACE-TREATED STEEL SHEET FOR FUEL TANKS

(71) Applicant: NIPPON STEEL & SUMITOMO METAL CORPORATION, Tokyo (JP)

(72) Inventors: Hiromasa Shoji, Tokyo (JP); Taihei Kaneto, Tokyo (JP); Masahiro Fuda, Tokyo (JP); Hironori Sato, Tokyo (JP); Natsuko Sugiura, Tokyo (JP); Yuji Yamaguchi, Tokyo (JP)

(73) Assignee: NIPPON STEEL CORPORATION, Tokyo (JP)

(\*) Notice: Subject to any disclaimer, the term of this patent is extended or adjusted under 35 U.S.C. 154(b) by 124 days.

(21) Appl. No.: 15/741,606

(22) PCT Filed: Aug. 29, 2016

(86) PCT No.: PCT/JP2016/075253
§ 371 (c)(1),
(2) Date: Jan. 3, 2018

(87) PCT Pub. No.: WO2017/038786
PCT Pub. Date: Mar. 9, 2017

(65) Prior Publication Data
US 2018/0187313 A1  Jul. 5, 2018

(30) Foreign Application Priority Data

Aug. 28, 2015 (JP) ............................... 2015-169661
Aug. 28, 2015 (JP) ............................... 2015-169676
(Continued)

(51) Int. Cl.
*B32B 15/01* (2006.01)
*C23C 26/00* (2006.01)
(Continued)

(52) U.S. Cl.
CPC ................ *C23C 28/34* (2013.01); *B05D 7/14* (2013.01); *B05D 7/24* (2013.01); *B05D 7/52* (2013.01);
(Continued)

(58) Field of Classification Search
CPC .......... C21D 9/48; C21D 9/46; C21D 8/0247; C22C 38/004; C22C 38/12; C22C 38/06;
(Continued)

(56) References Cited

FOREIGN PATENT DOCUMENTS

EP    0575621 A1    12/1993
EP    1205581 A1    5/2002
(Continued)

OTHER PUBLICATIONS

Machine Translation, Ishii Yoshio, JP 08-134687, May 1996. (Year: 1996).*

(Continued)

*Primary Examiner* — Michael E. La Villa
(74) *Attorney, Agent, or Firm* — Birch, Stewart, Kolasch & Birch, LLP

(57) ABSTRACT

A surface-treated steel sheet for fuel tanks, including a Zn—Ni alloy plating layer on one surface or both surfaces of a steel sheet; and a trivalent chromate covering layer or a chromate-free covering layer on the Zn—Ni alloy plating layer, wherein, in a surface outermost layer of the trivalent chromate covering layer or the chromate-free covering layer, concavities, of which a depth from an arithmetic average height of a cross-sectional curve of the surface outermost layer is more than or equal to 0.1 μm, exist in a proportion of 50 to 1000 concavities/mm2 and at an area ratio of 20 to 80% to a surface area of the steel sheet.

14 Claims, 4 Drawing Sheets

US 10,738,384 B2
Page 2

(30) Foreign Application Priority Data

Aug. 28, 2015 (JP) ................. 2015-169702
Aug. 28, 2015 (JP) ................. 2015-169734

(51) Int. Cl.

| | |
|---|---|
| *C23C 28/00* | (2006.01) |
| *C23C 22/07* | (2006.01) |
| *C22C 38/12* | (2006.01) |
| *C22C 38/14* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 9/46* | (2006.01) |
| *C21D 8/02* | (2006.01) |
| *C25D 3/22* | (2006.01) |
| *C21D 9/48* | (2006.01) |
| *B05D 7/14* | (2006.01) |
| *B05D 7/24* | (2006.01) |
| *B05D 7/00* | (2006.01) |
| *C22C 18/00* | (2006.01) |
| *C23C 22/82* | (2006.01) |
| *B32B 15/098* | (2006.01) |
| *B32B 15/04* | (2006.01) |
| *C23C 30/00* | (2006.01) |
| *B32B 15/08* | (2006.01) |
| *B32B 15/095* | (2006.01) |
| *B32B 15/085* | (2006.01) |
| *B32B 15/18* | (2006.01) |
| *B60K 15/03* | (2006.01) |

(52) U.S. Cl.
CPC ............ *B32B 15/01* (2013.01); *B32B 15/013* (2013.01); *B32B 15/04* (2013.01); *B32B 15/043* (2013.01); *B32B 15/08* (2013.01); *B32B 15/085* (2013.01); *B32B 15/095* (2013.01); *B32B 15/098* (2013.01); *B32B 15/18* (2013.01); *C21D 8/0247* (2013.01); *C21D 9/46* (2013.01); *C21D 9/48* (2013.01); *C22C 18/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C23C 22/07* (2013.01); *C23C 22/82* (2013.01); *C23C 26/00* (2013.01); *C23C 28/00* (2013.01); *C23C 28/321* (2013.01); *C23C 28/3225* (2013.01); *C23C 28/345* (2013.01); *C23C 30/00* (2013.01); *C23C 30/005* (2013.01); *C25D 3/22* (2013.01); *B60K 2015/03046* (2013.01); *C23C 2222/10* (2013.01); *Y10T 428/12556* (2015.01); *Y10T 428/12562* (2015.01); *Y10T 428/12569* (2015.01); *Y10T 428/12854* (2015.01); *Y10T 428/12951* (2015.01); *Y10T 428/12972* (2015.01); *Y10T 428/12993* (2015.01)

(58) Field of Classification Search
CPC ..... C22C 38/02; C22C 38/002; C22C 38/001; C22C 38/04; C22C 38/14; C22C 18/00; C23C 28/00; C23C 28/34; C23C 28/321; C23C 28/3225; C23C 28/345; C23C 26/00; C23C 22/07; C23C 30/00; C23C 30/005; C23C 22/82; C23C 2222/10; B32B 15/013; B32B 15/01; B32B 15/043; B32B 15/08; B32B 15/095; B32B 15/085; B32B 15/18; B32B 15/098; Y10T 428/12854; Y10T 428/12951; Y10T 428/12972; Y10T 428/12993; Y10T 428/12556; Y10T 428/12562; Y10T 428/12569; C25D 3/22; B05D 7/14; B05D 7/24; B05D 7/52

See application file for complete search history.

(56) References Cited

FOREIGN PATENT DOCUMENTS

| | | | |
|---|---|---|---|
| JP | 57-61833 | A | 4/1982 |
| JP | 6-155656 | A | 6/1994 |
| JP | 08-134687 | * | 5/1996 |
| JP | 11-310897 | A | 11/1999 |
| JP | 2001-279470 | A | 10/2001 |
| JP | 2005-314737 | A | 11/2005 |
| JP | 2006-291246 | A | 10/2006 |
| JP | 2007-70572 | A | 3/2007 |
| JP | 2008-248360 | A | 10/2008 |
| JP | 2009-293062 | A | 12/2009 |
| JP | 2010-208154 | A | 9/2010 |
| JP | 2011-21279 | A | 2/2011 |
| JP | 2011-26669 | A | 2/2011 |
| JP | 2014-31549 | A | 2/2014 |

OTHER PUBLICATIONS

Indian Office Action, dated Apr. 25, 2019, for corresponding Indian Application No. 201817002075, with an English translation.
International Preliminary Report on Patentability and English Translation of Written Opinion of the International Search Authority, dated Mar. 6, 2018, issued in PCT/JP2016/075253 (Forms PCT/IB/373 and PCT/ISA/237).
Extended European Search Report for corresponding European Application No. 16841818.4, dated Dec. 17, 2018.
International Search Report for PCT/JP2016/075253 (PCT/ISA/210) dated Oct. 11, 2016.
Taiwanese Office Action issued in TW Application No. 105127949 dated Jun. 9, 2017.
Written Opinion of the International Searching Authority for PCT/JP2016/075253 (PCT/ISA/237) dated Oct. 11, 2016.
Korean Office Action for corresponding Korean Application No. 10-2018-7004660, dated Jul. 16, 2019, with partial English translation.

* cited by examiner (a)

(b)

SURFACE-TREATED STEEL SHEET FOR FUEL TANKS

TECHNICAL FIELD

The present invention relates to a surface-treated steel sheet having excellent strength, corrosion resistance, press moldability, and resistance weldability as a material of fuel tanks of automobiles and motorcycles.

BACKGROUND ART

Fuel tanks of automobiles and motorcycles have a complicated shape, and therefore the material of the fuel tank is required to have excellent processability (deep drawability). Further, since the fuel tank is an important safety component of automobiles and motorcycles, it is important that corrosion products constituting a cause of the clogging of a filter not be produced in the material of the fuel tank and that the material of the fuel tank be a material that has no concern of perforation corrosion and on which stable welding can be performed easily.

As a material having these various characteristics, a Pb—Sn alloy-plated steel sheet has been widely used as a material of automotive fuel tanks (see Patent Literature 1). The Pb—Sn alloy-plated steel sheet has stable chemical properties to gasoline and has plating excellent in lubricity, and is therefore excellent in press moldability and excellent also in the weldability of resistance welding such as spot welding and seam welding. However, these days, a material not using lead is demanded in terms of loads on the environment.

As a material not using Pb and having good corrosion resistance and processability, there is a Zn-based plated steel sheet. Zn has stable sacrificial anticorrosion action on a steel sheet, and therefore a Zn-based plated steel sheet has good corrosion resistance to, as well as gasoline, alcohols and organic acids produced by the degradation of gasoline.

Thus, various technologies have so far been proposed as materials for fuel tanks provided with Zn-based plating. For example, Patent Literatures 2 and 3 disclose subjecting a Zn-based plated steel sheet further to chromate treatment mainly using chromic acid and silica for the purpose of improving corrosion resistance. However, these methods are not preferable because a covering film containing a chromate as a main component contains hexavalent Cr, which has high environmental loads.

Patent Literature 4 discloses a surface-treated plated steel sheet containing neither Pb nor hexavalent Cr and including a covering film of a single-layer coating type; this covering film is a covering film containing a resin as a main component and is expected to exhibit moldability; however, there is a concern that continuous workability may be reduced due to the resistance heat generation of the covering film during welding.

Patent Literature 5 discloses a weldable zinc-based plated steel sheet containing a metal pigment in an organic resin covering film; however, due to being provided with an organic covering film, this steel sheet has a problem that a load is imposed on resistance welding and, although welding is possible, productivity is low, a problem that, although corrosion resistance is good, the cost is high, etc.

After all, in conventional technologies, the current situation is that it is difficult to satisfy continuous workability required during fuel tank production and processability and corrosion resistance required as fuel tank characteristics, and at the same time allow low-cost production.

These days, using a high strength steel sheet is investigated from demands for the weight reduction of fuel tanks. For example, Patent Literature 6 discloses a steel sheet for fuel tanks that is excellent in strength-r-value balance, with a tensile strength of more than or equal to 440 MPa and an r-value of more than or equal to 2.0, is excellent in the corrosion resistance of the inner and outer surfaces of the tank, and is excellent also in spot weldability and press processability.

However, in Patent Literature 6, although there is a description on covering treatment of a surface of the steel sheet, there is no description on a strength of the steel sheet or a surface form favorable for processability, nor on conditions of a plating layer, nor on a surface covering film; hence, the steel sheet for fuel tanks of Patent Literature 6 has a concern that processability may not have been sufficiently obtained.

Patent Literature 7 discloses a surface-treated steel sheet for fuel tanks in which a zinc-based alloy plating layer containing one or more of Ni, Co, Cr, and Fe as an alloy component is formed and a Ni plating layer is formed thereon. Although a Ni plating layer is formed on a Zn-based plating layer to enhance corrosion resistance to fuel, studies on the strength of the steel sheet and studies on a surface form and a surface covering film are not sufficiently conducted; hence, the surface-treated steel sheet for fuel tanks of Patent Literature 7 has a concern that processability may not have been sufficiently obtained.

Patent Literature 8 discloses a surface-treated steel sheet for fuel tanks excellent in press processability in which the running out of lubrication of processing oil that is put on the steel sheet during molding is suppressed by controlling the number of concavities and the total area of the surface of the steel sheet. However, the control of the surface form based on the number of concavities and the total area of the surface of the steel sheet does not provide sufficient retainability of lubrication, and there has been a concern that press processability may not be sufficiently obtained.

CITATION LIST

Patent Literature

Patent Literature 1: JP S57-061833B
Patent Literature 2: JP 2011-021279A
Patent Literature 3: JP 2008-248360A
Patent Literature 4: JP 2006-291246A
Patent Literature 5: JP 2001-279470A
Patent Literature 6: JP 2005-314737A
Patent Literature 7: JP H11-310897A
Patent Literature 8: Japanese Patent Application No. 2015-169734

SUMMARY OF INVENTION

Technical Problem

An issue of the present invention is to, in a surface-treated steel sheet of a material of fuel tanks of automobiles and motorcycles, improve the balance between corrosion resistance and resistance weldability and ensure good press moldability, and an object of the present invention is to provide a surface-treated steel sheet that solves the issue and has excellent press moldability, material strength, corrosion resistance, and resistance weldability.

Solution to Problem

To solve the issue mentioned above, the present inventors conducted studies on, as a material for fuel tanks, various aspects of a covering film of a Zn-based plated steel sheet excellent in corrosion resistance, moldability, and weldability.

Consequently, the present inventors have found that press moldability, corrosion resistance, and resistance weldability are improved when concavities are formed at a specific area ratio on a surface of a steel sheet of a prescribed component composition, a Zn—Ni alloy plating layer is formed after the concavity formation, and a prescribed resin covering layer is formed on the Zn—Ni alloy plating layer. Further, the present inventors have found that press processability, corrosion resistance, and resistance weldability are significantly improved when concavities are formed on a surface outermost layer of a steel sheet of a prescribed component composition while the sum total of the volumes (the total volume) of concavities with a prescribed depth is set within a prescribed range, a Zn—Ni alloy plating layer is formed after the concavity formation, and a prescribed resin covering layer is formed on the Zn—Ni alloy plating layer.

Further, the present inventors have found that various characteristics as a material of fuel tanks are improved when a prescribed resin covering layer is formed on a Zn—Ni alloy plating layer of which an outer layer contains an increased amount of Ni.

When a steel sheet contains a large amount of Si, a Si-enriched layer is formed on a surface of the steel sheet; hence, in the case where a steel sheet is subjected to surface treatment, attention is required to the method of the surface treatment. That is, in the case where a surface of a steel sheet is subjected to plating, it is necessary to take into account the adhesiveness between the surface of the steel sheet and the plating layer. In particular, in the case of a steel sheet that contains a large amount of Si and on a surface of which an oxide covering film is likely to be formed, it is necessary to perform surface treatment that does not cause the peeling-off of a plating layer during deep drawing processing that processes a fuel tank.

Further, a material of fuel tanks needs to be capable of being spot-welded or seam-welded; and the present inventors have found that processability that provides the capability to withstand severe processing that processes a fuel tank and weldability can be enhanced more when the form of a surface of a steel sheet is appropriately adjusted, a Zn—Ni alloy plating layer is formed on the surface, and a prescribed covering film contributing to improvement in the adhesiveness of the plating layer is formed on the plating layer.

The present invention has been made on the basis of the above findings, and its summary is as follows.

[1]

A surface-treated steel sheet for fuel tanks, including:
a Zn—Ni alloy plating layer on one surface or both surfaces of a steel sheet; and
a trivalent chromate covering layer or a chromate-free covering layer on the Zn—Ni alloy plating layer,
in which the steel sheet consists of, in mass %,
C: 0.0005 to 0.0050%,
Si: 0.01 to 1.00%,
Mn: 0.70 to 2.00%,
P: less than or equal to 0.060%,
S: less than or equal to 0.010%,
Al: 0.01 to 0.30%,
N: 0.001 to 0.010%,
Ti: 0.010 to 0.050%,
Nb: 0.010 to 0.040%,
B: 0.0005 to 0.0030%, and
the balance: Fe and unavoidable impurities, and
(i) in a surface outermost layer of the trivalent chromate covering layer or the chromate-free covering layer, concavities, of which a depth from an arithmetic average height of a cross-sectional curve of the surface outermost layer is more than or equal to 0.1 µm, exist in a proportion of 50 to 1000 concavities/mm$^2$ and at an area ratio of 20 to 80% to a surface area of the steel sheet.

[2]

The surface-treated steel sheet for fuel tanks according to [1],
in which, instead of the (i),
(i') in the surface outermost layer of the trivalent chromate covering layer or the chromate-free covering layer, concavities, of which a depth from an arithmetic average height of a cross-sectional curve of the surface outermost layer is more than or equal to 0.1 pun, exist in a range of $1.0 \times 10^4$ to $1.0 \times 10^6$ in terms of an outer layer form indicator Z defined by Formula (a) below, $$Z \ (\mu m^3/mm^2) = \text{a sum total of volumes (a total volume) of concavities of which the depth from the arithmetic average height of the cross-sectional curve of the surface outermost layer is more than or equal to 0.1 } \mu m/\text{a unit area of the surface outermost layer} \quad (a).$$

[3]

The surface-treated steel sheet for fuel tanks according to [1], in which, instead of the (i),
(i'') on a surface of the trivalent chromate covering layer or the chromate-free covering layer, an arithmetic average roughness (Ra) in a rectangular area with four 5-µm sides is 5 to 200 nm, and a maximum cross-sectional height (Rt) of a roughness curve is 100 to 1000 nm.

[4]

The surface-treated steel sheet for fuel tanks according to any one of [1] to [3],
in which the Zn—Ni alloy plating layer is an alloy plating layer containing Zn as a main component and 5 to 15 mass % Ni,
the adhesion amount of the Zn—Ni alloy plating layer is 3 to 50 g/m$^2$, and the amount of Ni of an outer layer of ¹⁄₁₀ of a layer thickness of the Zn—Ni alloy plating layer is more than or equal to 120% of the average amount of Ni of the Zn—Ni alloy plating layer.

[5]

The surface-treated steel sheet for fuel tanks according to any one of [1] to [4],
in which the chromate-free covering layer is
(A) a covering layer containing a silicon compound and a phosphoric acid compound and further containing one or more of compounds of Zr, V, Ti, and Co,
(B) a covering layer of a urethane-based resin, or
(C) a covering layer containing a crosslinked epoxy-urethane-based resin and at least one of a polyolefin resin and a fluorine-based resin.

[6]

The surface-treated steel sheet for fuel tanks according to any one of [1] to [4], including, on the trivalent chromate covering layer:
at least one layer of
(B) a covering layer of a urethane-based resin, and
(C) a covering layer containing a crosslinked epoxy-urethane-based resin and at least one of a polyolefin resin and a fluorine-based resin.

[7]

The surface-treated steel sheet for fuel tanks according to [5], including, on (A) the covering layer containing a silicon compound and a phosphoric acid compound and further containing one or more of compounds of Zr, V, Ti, and Co:
at least one layer of
(B) a covering layer of a urethane-based resin, and
(C) a covering layer containing a crosslinked epoxy-urethane-based resin and at least one of a polyolefin resin and a fluorine-based resin.

[8]

The surface-treated steel sheet for fuel tanks according to any one of [1] to [4], including, in the chemical conversion treatment film (B):
a resin covering layer containing a urethane group and a urea group at 0.6 to 10 mass % on a N-equivalent basis in a solid content of an entire covering film and Si at 5 to 20 mass % on a Si-equivalent basis in the entire covering film,
in which a layer thickness of the resin covering layer is 0.5 to 2.0 μm, and a coefficient of kinetic friction of a surface of the resin covering layer is 0.06 to 0.25.

[9]

The surface-treated steel sheet for fuel tanks according to any one of [1] to [4], including, on the trivalent chromate covering layer or the chromate-free covering layer:
a resin covering layer containing a urethane group and a urea group at 0.6 to 10 mass % on a N-equivalent basis in a solid content of an entire covering film and Si at 5 to 20 mass % on a Si-equivalent basis in the entire covering film,
in which a layer thickness of the resin covering layer is 0.5 to 2.0 μm, and a coefficient of kinetic friction of a surface of the resin covering layer is 0.06 to 0.25.

[10]

The surface-treated steel sheet for fuel tanks according to any one of [1] to [4], including, on the trivalent chromate covering layer or the chromate-free covering layer:
an organic covering layer containing a resin having a urethane bond, one or two of a polyolefin resin and a fluorine resin, and an electrically conductive pigment, with a film thickness of 3 to 20 μm,
in which (iii) the resin having a urethane bond is an organic resin obtained from a film-forming resin source material containing (I) a polyester polyol having at least three functional groups, and (II) a blocked product of an organic polyisocyanate, or a blocked product of a prepolymer having an NCO group at a terminal obtained by a reaction between an organic polyisocyanate and an active hydrogen compound.

[11]

The surface-treated steel sheet for fuel tanks according to [10],
in which the electrically conductive pigment is made of one or more of stainless steel, Zn, Al, Ni, ferrosilicon, and iron phosphide, and a content ratio of the electrically conductive pigment is 5 to 50 volume % on a solid content basis.

[12]

The surface-treated steel sheet for fuel tanks according to [10] or [11],
in which the organic covering layer further contains an antirust pigment at 1 to 40 volume % on a solid content basis, and contains the antirust pigment at 5 to 70 volume % in total on a solid content basis.

[13]

The surface-treated steel sheet for fuel tanks according to any one of [1] to [4], including:
the Zn—Ni alloy plating layer on one surface or both surfaces of the steel sheet;
the trivalent chromate covering layer on the Zn—Ni alloy plating layer; and
a chemical conversion treatment film (C) and a second resin covering layer containing a crosslinked epoxy-urethane-based resin and at least one of a polyolefin resin and a fluorine-based resin on the trivalent chromate covering layer,
in which
(iv) the amount of Cr of the trivalent chromate covering film is 5 to 200 mg/m$^2$ on a Cr-equivalent basis, and
(v) a layer thickness of the second resin covering layer is 0.3 to 2.0 μm, and a coefficient of kinetic friction of a surface of the second resin covering layer is 0.06 to 0.25.

Advantageous Effects of Invention

According to the present invention, a surface-treated steel sheet having excellent press processability, material strength, corrosion resistance, and resistance weldability as a material of fuel tanks of automobiles and motorcycles can be provided.

DESCRIPTION OF EMBODIMENTS

Figure 1:
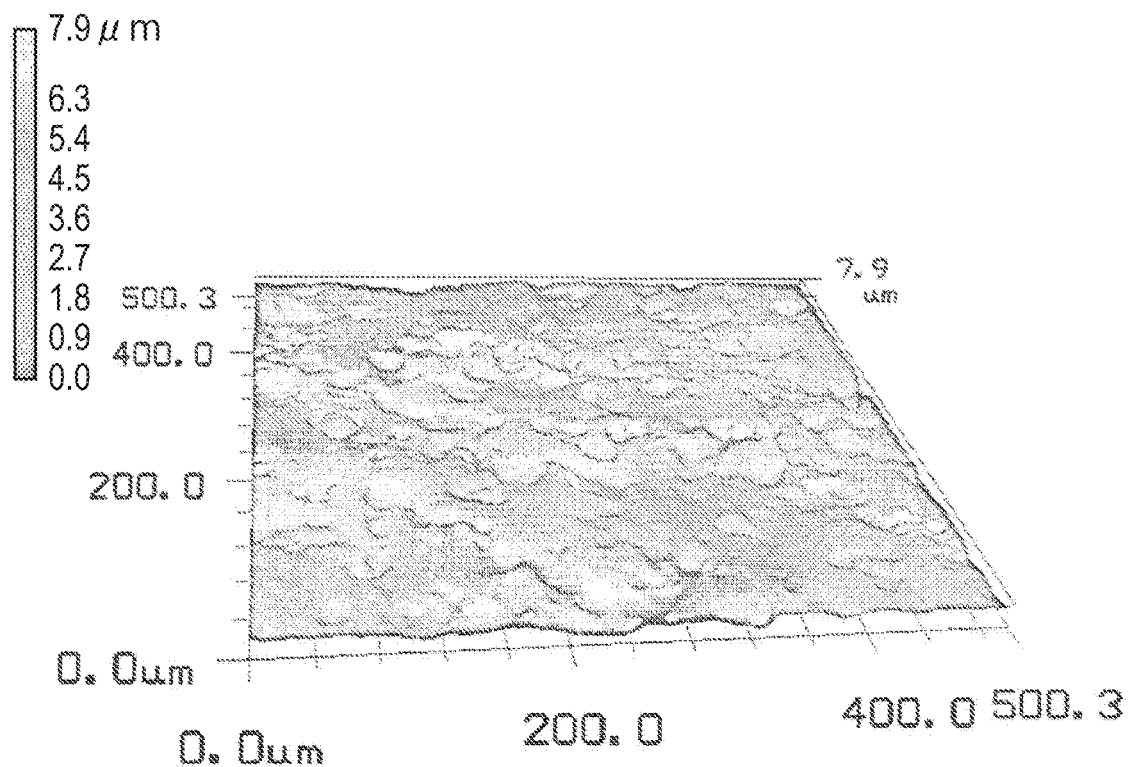
FIG. 1 shows an aspect of concavities with depths of more than or equal to 0.1 μm in a surface outermost layer of a surface-treated steel sheet. (a) shows a three-dimensional image of the surface outermost layer of the surface-treated steel sheet observed with a laser microscope, and (b) shows an image obtained by binarizing the three-dimensional image of (a).
Figure 1:
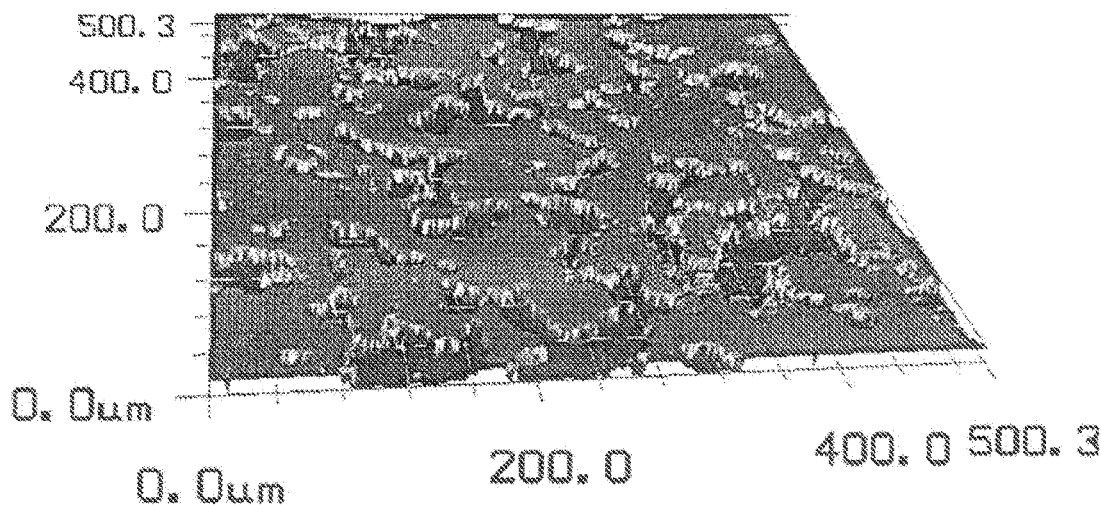

A surface-treated steel sheet for fuel tanks of the present invention (hereinafter referred to as the "present invention steel sheet" in some cases) is a surface-treated steel sheet for fuel tanks, including:
a Zn—Ni alloy plating layer on one surface or both surfaces of a steel sheet; and
a trivalent chromate covering layer or a chromate-free covering layer on the Zn—Ni alloy plating layer,
in which the steel sheet consists of, in mass %,
C: 0.0005 to 0.0050%,
Si: 0.01 to 1.00%,
Mn: 0.70 to 2.00%,
P: less than or equal to 0.060%,
S: less than or equal to 0.010%,
Al: 0.01 to 0.30%,
N: 0.001 to 0.010%,
Ti: 0.010 to 0.050%, Nb: 0.010 to 0.040%,
B: 0.0005 to 0.0030%, and
the balance: Fe and unavoidable impurities, and
(i) in a surface outermost layer of the trivalent chromate covering layer or the chromate-free covering layer, concavities, of which a depth from an arithmetic average height of a cross-sectional curve of the surface outermost layer is more than or equal to 0.1 μm, exist in a proportion of 50 to 1000 concavities/mm$^2$ and at an area ratio of 20 to 80% to a surface area of the steel sheet.

The present invention steel sheet is a surface-treated steel sheet excellent in press moldability, material strength, and corrosion resistance in which a Zn—Ni alloy plating layer is formed on a surface of a steel sheet of a prescribed component composition and an appropriate covering layer is formed on the Zn—Ni alloy plating layer. Further, the present invention steel sheet is a surface-treated steel sheet in which various characteristics as a material of fuel tanks are improved by setting the amount of Ni of an outer layer of the Zn—Ni alloy plating layer to higher than the average amount of Ni.

First, reasons for limiting the component composition of the present invention steel sheet are described. Hereinafter, % for the component composition refers to mass %.

The component composition consists of, in mass %, C: 0.0005 to 0.0050%, Si: 0.01 to 1.00%, Mn: 0.70 to 2.00%, P: less than or equal to 0.060%, S: less than or equal to 0.010%, Al: 0.01 to 0.30%, N: 0.001 to 0.010%, Ti: 0.010 to 0.050%, Nb: 0.010 to 0.040%, B: 0.0005 to 0.0030%, and the balance: Fe and unavoidable impurities.

C: 0.0005 to 0.0050%

C is an element that binds to Nb and Ti to form a carbide and is very effective for the achievement of high strength. Even when the amount of C is small, strength can be supplemented by another method; but if the amount of C is less than 0.0005%, decarburization cost during steel making is greatly increased, and ensuring strength is difficult even when another method is used; thus, the amount of C is set to more than or equal to 0.0005%. It is preferably more than or equal to 0.0010%.

On the other hand, if the amount of C is more than 0.0050%, the amounts of Ti and Nb necessary for the fixation of C are increased, and processability is reduced and weld toughness is reduced; thus, the amount of C is set to less than or equal to 0.0050%. In the case where very high processability and weld toughness are required, the amount of C is preferably less than or equal to 0.0030%.

Si: 0.01 to 1.00%

Si is an element contributing to improvement in the strength of the steel sheet by solid solution strengthening. If the amount of Si is less than 0.01%, addition effect is not sufficiently obtained; thus, the amount of Si is set to more than or equal to 0.01%. It is preferably more than or equal to 0.10%.

On the other hand, if the amount of Si is more than 1.00%, processability is reduced; thus, the amount of Si is set to less than or equal to 1.00%. In terms of suppressing, during hot rolling, the production of Si scale, which is a cause of scale defects, the amount of Si is preferably less than or equal to 0.80%, and more preferably less than or equal to 0.60%.

Mn: 0.70 to 2.00%

Mn is, similarly to Si, an element contributing to improvement in the strength of the steel sheet by solid solution strengthening. If the amount of Mn is less than 0.70%, addition effect is not sufficiently obtained, and even supplementation with another element provides neither needed secondary processing brittleness resistance nor weld toughness; thus, the amount of Mn is set to more than or equal to 0.70%. In terms of the capability to ensure a needed steel sheet structure even when the hot rolling finishing temperature is less than or equal to 910° C., the amount of Mn is preferably more than or equal to 1.00%.

On the other hand, if the amount of Mn is more than 2.00%, the in-plane anisotropy of the r-value, which is an indicator of deep drawability, is increased, and press moldability is reduced; thus, the amount of Mn is set to less than or equal to 2.00%. It is preferably less than or equal to 1.70%.

P: less than or equal to 0.060%

P is an element contributing to improvement in the strength of the steel sheet by solid solution strengthening. P is at the same time an element that segregates at grain boundaries and impairs secondary processing brittleness resistance, and that solidifies and segregates in welds and impairs weld toughness.

If the amount of P is more than 0.060%, the segregation mentioned above occurs, and secondary processing brittleness resistance and weld toughness are reduced; thus, the amount of P is set to less than or equal to 0.060%. The lower limit includes 0%; but if the amount of P is reduced to less than 0.005%, production cost is greatly increased; thus, for steel sheets for practical use, 0.005% is the practical lower limit. The amount of P is preferably more than or equal to 0.020% in terms of ensuring strength.

S: less than or equal to 0.010%

S is an impurity that is unavoidably mixed in from iron raw material, and is an element that forms a precipitate with Mn and Ti and impairs processability.

If the amount of S is more than 0.010%, processability is significantly reduced; thus, the amount of S is set to less than or equal to 0.010%. It is preferably less than or equal to 0.005%. The lower limit includes 0%; but if the amount of S is reduced to less than 0.0001%, production cost is greatly increased; thus, for steel sheets for practical use, 0.0001% is the practical lower limit.

Al: 0.01 to 0.30%

Al is an element that is added as a deoxidizing material during the smelting of steel. If the amount of Al is less than 0.01%, deoxidation effect is not sufficiently obtained; thus, the amount of Al is set to more than or equal to 0.01%. It is preferably more than or equal to 0.10%. On the other hand, if the amount of Al is more than 0.30%, weld toughness and processability are reduced: thus, the amount of Al is set to less than or equal to 0.30%. It is preferably less than or equal to 0.25%.

N: 0.001 to 0.010%

N is an element that is unavoidably mixed in during the smelting of steel, and that forms a nitride with Ti, Al, and/or Nb and, although it does not adversely affect processability, impairs weld toughness.

If the amount of N is reduced to less than 0.001%, production cost is greatly increased; thus, the amount of N is set to more than or equal to 0.001%. It is preferably more than or equal to 0.003%. On the other hand, if the amount of N is more than 0.010%, weld toughness is significantly reduced; thus, the amount of N is set to less than or equal to 0.010%. It is preferably less than or equal to 0.007%.

Ti: 0.010 to 0.050%

Ti is an element that has a strong affinity with C and N, and contributes to improvement in processability by forming a carbonitride during solidification or during hot rolling and reducing the amounts of solid solution C and solid solution N.

If the amount of Ti is less than 0.010%, addition effect is not sufficiently obtained; thus, the amount of Ti is set to more than or equal to 0.010%. It is preferably more than or equal to 0.015%. On the other hand, if the amount of Ti is more than 0.050%, the strength and toughness of the weld are reduced; thus, the amount of Ti is set to less than or equal to 0.050%. It is preferably less than or equal to 0.045%.

Nb: 0.010 to 0.040%

Nb is, similarly to Ti, an element that has a strong affinity with C and N, and contributes to improvement in processability by forming a carbonitride during solidification or during hot rolling and reducing the amounts of solid solution C and solid solution N.

If the amount of Nb is less than 0.010%, addition effect is not sufficiently obtained; thus, the amount of Nb is set to more than or equal to 0.010%. It is preferably more than or equal to 0.015%. On the other hand, if the amount of Nb is more than 0.040%, the recrystallization temperature is increased, and high temperature annealing is needed and weld toughness is reduced; thus, the amount of Nb is set to less than or equal to 0.040%. It is preferably less than or equal to 0.035%.

B: 0.0005 to 0.0030%

B is an element that segregates at grain boundaries and enhances the strength of the grain boundaries, and contributes to improvement in secondary processing brittleness resistance. If the amount of B is less than 0.0005%, addition effect is not sufficiently obtained; thus, the amount of B is set to more than or equal to 0.0005%. It is preferably more than or equal to 0.0008%.

On the other hand, if the amount of B is more than 0.0030%, (a) B segregates at γ-grain boundaries during welding and suppresses ferrite transformation, the structure of the weld and the heat-affected zone becomes a low-temperature transformation structure, hence the weld and the heat-affected zone are hardened and reduced in toughness, and consequently the toughness of a seam weld in a form like putting the palms of the hands together is reduced, (b) also ferrite transformation during hot rolling is suppressed and a high-strength hot-rolled steel sheet of a low-temperature transformation structure is produced, and the load during cold rolling is increased, and (c) the recrystallization temperature is increased, hence high temperature annealing is needed, and production cost is increased, and the in-plane anisotropy of the r-value, which is an indicator of deep drawability, is increased and press moldability is reduced; thus, B is set to less than or equal to 0.0030%. It is preferably less than or equal to 0.0020%.

Next, concavities existing at a prescribed area ratio in a surface outermost layer of the present invention steel sheet are described.

In a surface outermost layer of the present invention steel sheet, a prescribed number of concavities exist at a prescribed area ratio to the surface area. The surface outermost layer is an outermost layer exposed on the surface of the surface-treated steel sheet; in the case where a trivalent chromate covering layer is provided on a Zn—Ni alloy plating layer, the surface outermost layer is an outermost layer of the trivalent chromate covering layer; in the case where a chromate-free covering layer is provided on a Zn—Ni alloy plating layer, the surface outermost layer is an outermost layer of the chromate-free covering layer. The concavities existing in the surface outermost layer are formed in the outermost layer of the trivalent chromate covering layer or the chromate-free covering layer by forming concavities on the surface of the Zn—Ni alloy plating layer before forming the trivalent chromate covering layer or the chromate-free covering layer. Alternatively, the concavities may be formed in the outermost layer of the trivalent chromate covering layer or the chromate-free covering layer by forming concavities on the surface of the steel sheet before forming the Zn—Ni alloy plating layer. Even when one or more covering layers are stacked on the Zn—Ni alloy plating layer, the concavities formed on the surface of the Zn—Ni alloy plating layer remain in the surface outermost layer of the covering layers. Similarly, even when one or more plating layers or covering layers are stacked on the steel sheet, the concavities formed on the surface of the steel sheet remain in the surface outermost layer of the covering layers.

The concavity formed in the surface outermost layer of the present invention steel sheet refers to a recess portion having a depth of more than or equal to 0.1 μm from the arithmetic average height of a cross-sectional curve of the surface outermost layer. Here, the arithmetic average height of a cross-sectional curve corresponds to Pa prescribed by JIS B 0601 (2001). The number of concavities is 50 to 1000/mm². The total area of concavities is 20 to 80% in terms of area ratio to the total area of the surface of the surface-treated steel sheet.

If the depth of the concavity is less than 0.1 μm, it is likely that the running out of lubrication of processing oil applied to the surface of the steel sheet occurs during deep drawing processing; thus, the depth of the concavity is set to more than or equal to 0.1 μm. It is preferably more than or equal to 0.3 μm. The concavity is formed by cell cutting in the formation process of the Zn—Ni alloy plating layer, as described later; alternatively, the concavity may be formed on the surface of the steel sheet by performing, in addition to the above process, skin pass rolling with a roll having a specific roughness, the etching of the surface by pickling, and brushing in a degreasing and pickling process in the production process of the steel sheet. By forming prescribed concavities on the surface of the Zn—Ni alloy plating layer or the surface of the steel sheet, the concavities are taken over, and the concavities remain and appear in the outermost layer of the surface of the surface-treated steel sheet. The upper limit of the depth of the concavity is not particularly limited.

If the number of concavities is less than 50/mm² or the total area of concavities is less than 20% in terms of area ratio, similarly it is likely that the running out of lubrication of processing oil occurs particularly during deep drawing processing of press processing; thus, the number of concavities is set to more than or equal to 50/mm², and the total area of concavities is set to more than or equal to 20% in terms of area ratio. The number of concavities is preferably more than or equal to 100/mm², and the total area of concavities is preferably more than or equal to 30% in terms of area ratio. The number of concavities is more preferably more than or equal to 120/mm², and the total area of concavities is more preferably more than or equal to 40% in terms of area ratio.

On the other hand, if the number of concavities is more than 1000/mm² or the total area of concavities is more than 80% in terms of area ratio, there is a concern that the frictional resistance of the surface of the steel sheet may be increased particularly during deep drawing processing of press processing and moldability may be reduced; thus, the number of concavities is set to less than or equal to 1000/mm², and the total area of concavities is set to less than or equal to 80% in terms of area ratio. The number of concavities is preferably less than or equal to 700/mm², and the total area of concavities is preferably less than or equal to 70% in terms of area ratio. The number of concavities is more preferably less than or equal to 400/mm², and the total area of concavities is more preferably less than or equal to 60% in terms of area ratio.

The number and area (or volume) of concavities can be measured in the following manner. That is, using a laser microscope, VK-9710, manufactured by KEYENCE Corporation, roughness information is acquired in a visual field of 500 μm×500 μm on a surface of a surface-treated steel sheet; on the basis of the roughness information, the arithmetic average height of a cross-sectional curve in the measurement visual field is calculated; the depths of concavities with depths of more than or equal to 0.1 μm from the calculated arithmetic average height are binarized; and a binarized image is analyzed to calculate the number and area (volume) of concavities. Further, the volume of concavities is calculated using an analysis software application, VK Analyzer, produced by KEYENCE Corporation.

FIG. 1 shows an aspect of concavities with depths of more than or equal to 0.1 μm in a surface outermost layer of a surface-treated steel sheet. FIG. 1(a) shows a three-dimensional image of the surface outermost layer of the steel sheet observed with a laser microscope, and FIG. 1(b) shows an image obtained by binarizing the three-dimensional image of FIG. 1(a).

The area ratio (%) of concavities is calculated by {the total area of concavities (x)/(the total area of concavities (x)+the total area of smooth surface portions (y))}×100.

In the surface outermost layer of the present invention steel sheet, in the surface outermost layer of the trivalent chromate covering layer mentioned above or the chromate-free covering layer mentioned above, concavities, of which the depth from the arithmetic average height of a cross-sectional curve of the surface outermost layer is more than or equal to 0.1 μm, exist in the range of $1.0 \times 10^4$ to $1.0 \times 10^6$ in terms of an outer layer form indicator Z defined by Formula (a) below.

$$Z\ (\mu m^3/mm^2) = \text{the sum total of the volumes (the total volume) of concavities of which the depth from the arithmetic average height of a cross-sectional curve of the surface outermost layer is more than or equal to 0.1 μm/a unit area of the surface outermost layer} \quad (a)$$

The outer layer form indicator Z is a new indicator that the present inventors have introduced in order to significantly enhance and evaluate press processability in a surface-treated steel sheet in which a prescribed resin covering layer is formed on a Zn—Ni alloy plating layer.

When pressing the surface-treated steel sheet, processing oil is applied to the surface of the steel sheet; the applied processing oil is retained by the concavities existing in the surface outermost layer of the steel sheet, and functions as a lubricant during processing. The present inventors have thought up an idea that, since the retention amount of processing oil in the surface outermost layer of the surface-treated steel sheet depends on the sum total of the volumes of concavities in the surface outermost layer, press processability and deep drawability will be significantly improved when the sum total is adjusted to an appropriate range; and have introduced the outer layer form indicator Z defined by Formula (a) above, and conducted extensive investigations on relevance to press processability and deep drawability.

Figure 2:
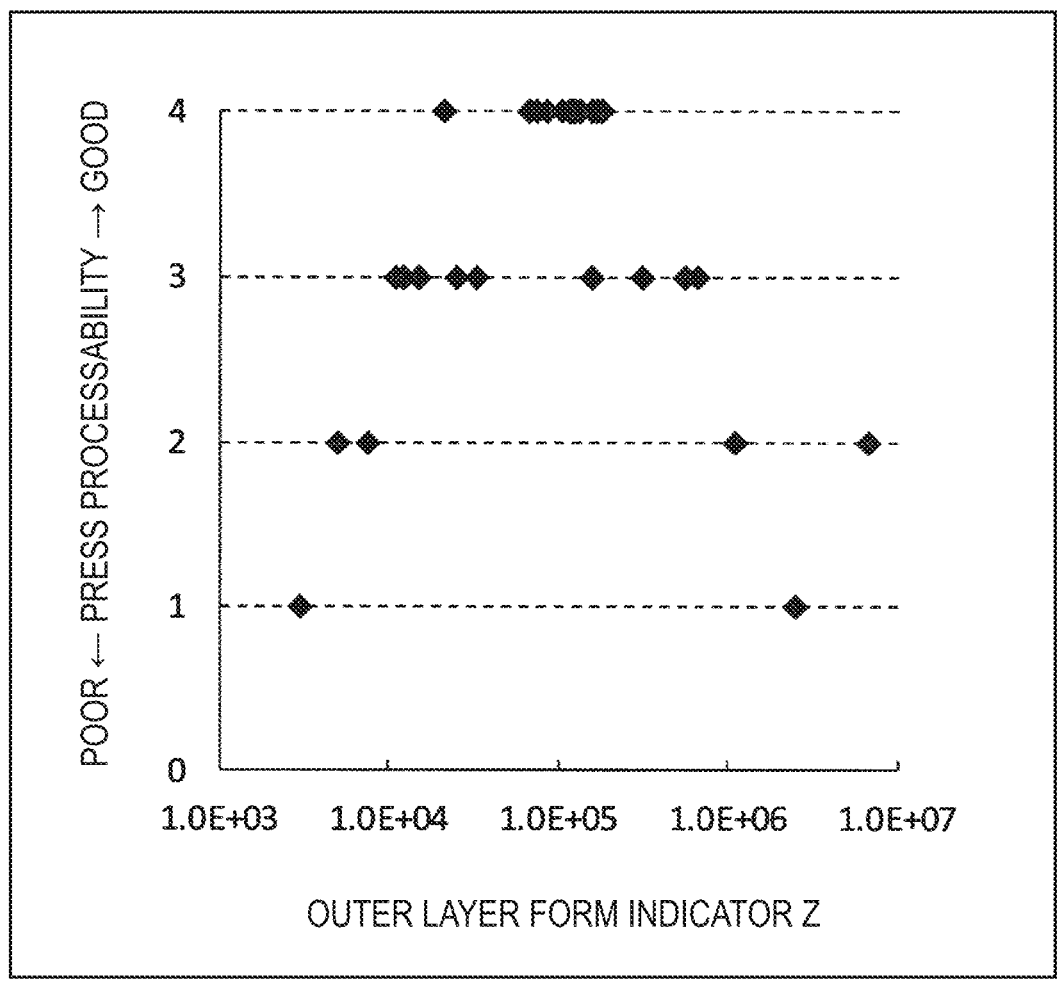
FIG. 2 is a diagram showing an example of result of an investigation of a relationship between a surface form indicator and press processability.

FIG. 2 shows an example of result of an investigation of a relationship between the surface form indicator Z and press processability. On the basis of the result shown in FIG. 2, the present inventors set the outer layer form indicator Z ($nm^3/mm^2$) to $1.0 \times 10^4$ to $1.0 \times 10^6$.

A concavity with a depth of less than 0.1 μm has small capacity to retain processing oil, and was therefore excluded from the relevant concavity for calculating the total volume of concavities. A concavity with a depth of more than or equal to 0.1 μm is taken as the relevant concavity for calculating the surface form indicator Z. The relevant concavity is preferably a concavity of more than or equal to 0.3 μm.

If the outer layer form indicator Z is less than $1.0 \times 10^4$, it is likely that the running out of lubrication of processing oil occurs during press processing; thus, the surface form indicator Z ($\mu m^3/mm^2$) is set to more than or equal to $1.0 \times 10^4$. It is preferably more than or equal to $3.0 \times 10^4$, and more preferably more than or equal to $5.0 \times 10^4$. On the other hand, if the surface form indicator Z ($\mu m^3/mm^2$) is more than $1.0 \times 10^6$, there is a concern that the frictional resistance of the surface of the steel sheet may be increased during press processing and press processability may be reduced; thus, the surface form indicator Z ($\mu m^3/mm^2$) is set to less than or equal to $1.0 \times 10^6$. It is preferably less than or equal to $0.7 \times 10^6$, and more preferably less than or equal to $0.5 \times 10^6$.

Figure 3:
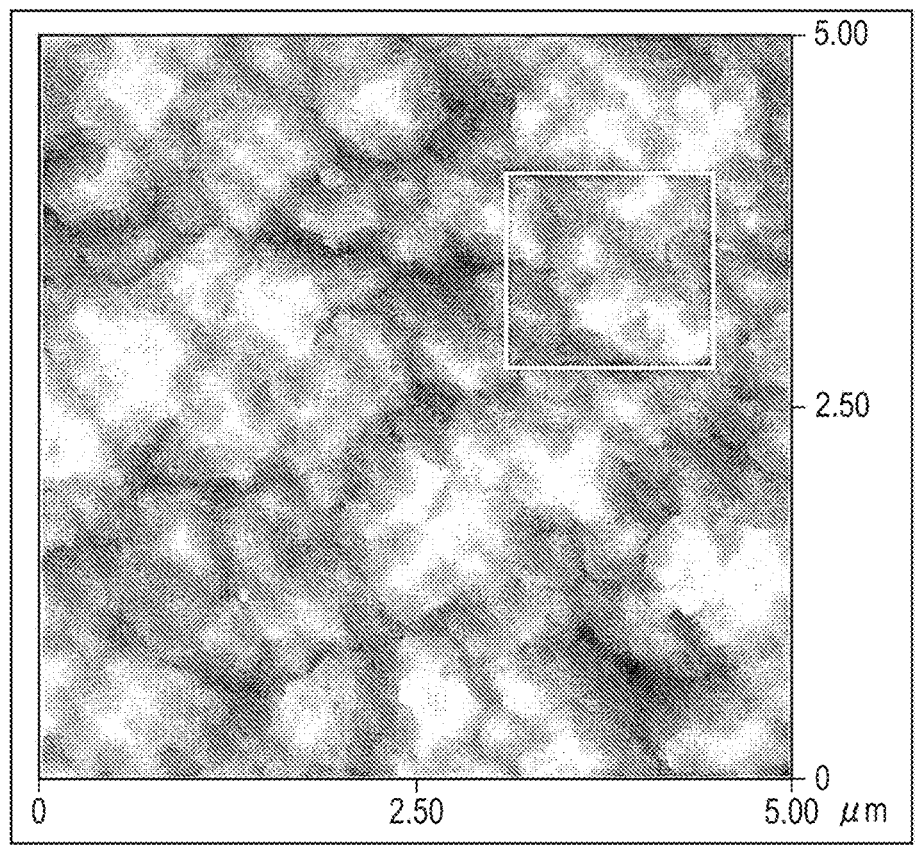
FIG. 3 shows an AFM image of a part of a three-dimensional image of a surface outermost layer of a surface-treated steel sheet.

FIG. 3 shows an AFM image of a part of a three-dimensional image of a surface outermost layer of a surface-treated steel sheet. The AFM image shown in FIG. 3 is an image in which an area of 5 μm×5 μm of a part of the three-dimensional image of FIG. 1(a) is observed more microscopically. From this image, it can be seen that concavities with different depths exist in an irregular state in the surface outermost layer of the surface-treated steel sheet. From the image mentioned above, the present inventors have thought up an idea that, in order to improve the press processability of the surface-treated steel sheet, it is necessary to take into account the three-dimensional surface condition of the steel sheet that greatly affects the surface condition of the surface-treated steel sheet, that is, the form of the outermost layer; and have introduced the outer layer form indicator Z.

In the present invention steel sheet, on the surface of the trivalent chromate covering layer or the chromate-free covering layer mentioned above, the arithmetic average roughness (Ra) in a rectangular area with four 5-μm sides is 5 to 200 nm, and the maximum cross-sectional height (Rt) of a roughness curve is 100 to 1000 nm.

If the arithmetic average roughness (Ra) is less than 5 nm, processing oil applied during press molding is less likely to remain on the mold pressing surface; thus, the arithmetic average roughness (Ra) is set to more than or equal to 5 nm. It is preferably more than or equal to 10 nm, and more preferably more than or equal to 15 nm.

On the other hand, if the arithmetic average roughness (Ra) is more than 200 nm, there arises a concern that the corrosion resistance of the surface-treated steel sheet may be reduced; thus, the arithmetic average roughness (Ra) is set to less than or equal to 200 nm. It is preferably less than or equal to 150 nm, and more preferably less than or equal to 120 nm.

If the maximum cross-sectional height (Rt) of a roughness curve is less than 100 nm, similarly processing oil applied during press molding is less likely to remain on the mold pressing surface; thus, the maximum cross-sectional height (Rt) of a roughness curve is set to more than or equal to 100 nm. It is preferably more than or equal to 200 nm, and more preferably more than or equal to 250 nm.

On the other hand, if the maximum cross-sectional height (Rt) of a roughness curve is more than 1000 nm, similarly there arises a concern that the corrosion resistance of the surface-treated steel sheet may be reduced; thus, the maximum cross-sectional height (Rt) of a roughness curve is set to less than or equal to 1000 nm. It is preferably less than or equal to 800 nm, and more preferably less than or equal to 700 nm.

The surface roughness of the surface-treated steel sheet usually varies with the measurement method; the arithmetic average roughness (Ra) and the maximum cross-sectional height (Rt) of a roughness curve of the present invention steel sheet are values obtained by imaging the surface of the surface-treated steel sheet with an atomic force microscope (AFM) and performing calculation on the basis of a roughness curve measured in the obtained image.

Figure 4:
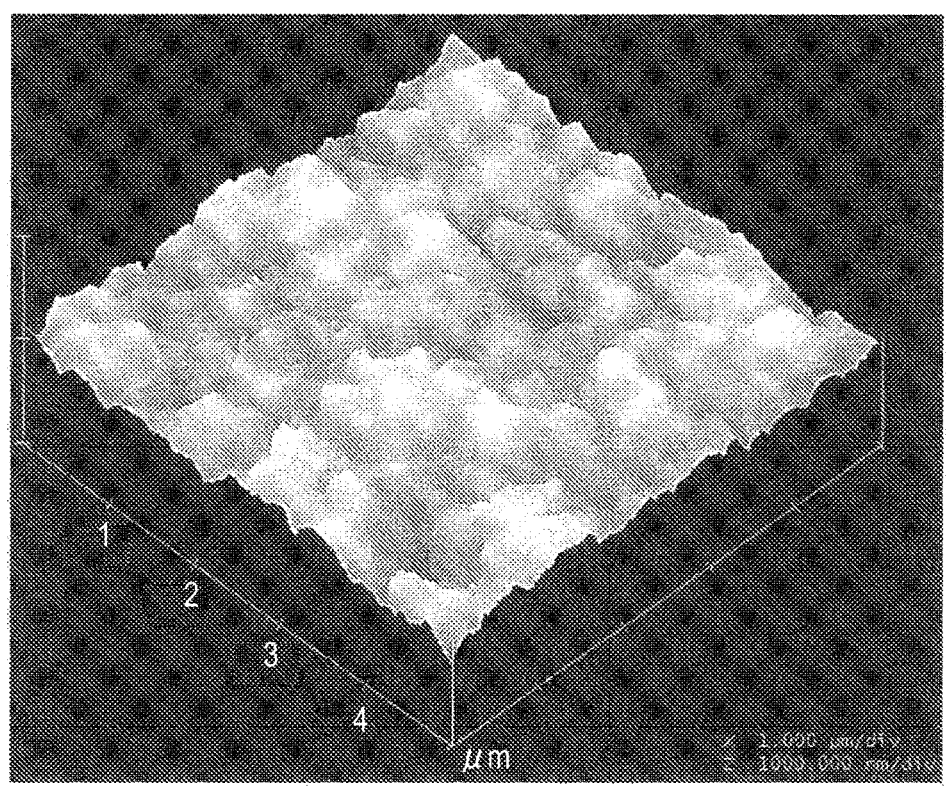
FIG. 4 is a diagram showing an example of an image of a surface of the surface-treated steel sheet captured with an atomic force microscope (AFM) at a different angle from FIG. 3.

Here, FIG. 4 shows an example of the image of the surface of the surface-treated steel sheet captured with an atomic force microscope (AFM) at a different angle from FIG. 3. The arithmetic average roughness (Ra) and the maximum cross-sectional height (Rt) of a roughness curve calculated on the basis of the image of the surface of the surface-treated steel sheet captured with an atomic force microscope (AFM) are indicators correctly describing the surface form of the surface-treated steel sheet.

A surface having an arithmetic average roughness (Ra) of 5 to 200 nm and a maximum cross-sectional height (Rt) of a roughness curve of 100 to 1000 nm, which are prescribed in the present invention, can be obtained by, for example, performing a process of stopping energization in some plating baths (cell cutting) in a continuous zinc electroplating line composed of a plurality of plating baths and dissolving part of the zinc plating layer electrodeposited up to then. Also the prescribed number of concavities and the prescribed outer layer form indicator Z described above can be similarly obtained by cell cutting.

As an example, a case of zinc electroplating using an acidic aqueous solution progresses by Reaction Formulae (1-1) and (1-2) below.

$$Zn^{2+} + 2e^- \rightarrow Zn \quad (1\text{-}1)$$

$$2H^+ + 2e^- \rightarrow H_2 \quad (1\text{-}2)$$

When a matrix and an electrode are immersed in a plating solution and electrolysis (cathodic electrolysis) is performed so that zinc is electrodeposited, the reaction progresses as shown in Formula (1-1) and Formula (1-2). On the other hand, when energization is stopped (cell cutting) to stop electrolysis while immersion is being performed, the corrosion reaction of Zn progresses by Formula (1-2) and Formula (1-3) (Formula (1-4)).

$$Zn \rightarrow Zn^{2+} + 2e^- \quad (1\text{-}3)$$

$$Zn + 2H^+ \rightarrow Zn^{2+} + H_2 \quad (1\text{-}4)$$

Also in the case of zinc-nickel electroplating, when electrolysis is stopped while immersion is being performed, zinc dissolving-out progresses. This is because nickel has a higher standard electrode potential than zinc. In other words, the control of the amount of zinc plating is enabled by immersion conditions after electrolysis. Further, also the surface roughness changes in association with zinc dissolving-out; hence, also the control of the surface roughness is possible. By adjusting the surface roughness by this zinc dissolving-out, the arithmetic average roughness (Ra) and the maximum cross-sectional height (Rt) of a roughness curve mentioned above are achieved. The formation of concavities may be performed by stopping energization (cell cutting) in the second half of a zinc plating line process, or may be performed while immersion is being performed in a process after plating. The adjustment of the surface roughness, and the prescribed arithmetic average roughness (Ra) and the prescribed maximum cross-sectional height (Rt) of a roughness curve can be prescribed by the surface Ni concentration.

Next, a plating layer and a covering layer formed on a steel sheet are described.

Zn—Ni Alloy Plating Layer

A Zn—Ni alloy plating layer (hereinafter, occasionally referred to as simply a "plating layer") is formed on one surface or both surfaces of a steel sheet. As the Zn—Ni alloy plating layer, a Zn—Ni alloy plating layer in which the amount of Ni of an outer layer is more than the average amount of Ni of the plating layer is preferable in terms of improvement in press moldability, material strength, corrosion resistance, and weldability.

The adhesion amount of Zn—Ni alloy plating is preferably 3 to 50 g/m². If the adhesion amount of Zn—Ni alloy plating is less than 3 g/m², sufficient corrosion resistance is not obtained; thus, the adhesion amount is preferably more than or equal to 3 g/mm². It is more preferably more than or equal to 5 g/m². On the other hand, if the adhesion amount mentioned above is more than 50 g/m², although corrosion resistance is improved, plating adhesiveness and weldability are reduced; thus, the adhesion amount mentioned above is preferably less than or equal to 50 g/mm². It is more preferably less than or equal to 40 g/m².

The amount of Ni of the Zn—Ni alloy plating layer is preferably 5 to 15 mass %. When Ni is alloyed with Zn, the processability and weldability of the plating layer are improved; but if the amount of Ni of the Zn—Ni alloy plating layer is less than 5 mass %, the improvement effect mentioned above is not sufficiently obtained; thus, the amount of Ni is preferably more than or equal to 5 mass %. It is more preferably more than or equal to 8 mass %.

On the other hand, if the amount of Ni mentioned above is more than 15 mass %, the hardness of the plating layer is increased, and it is likely that the plating layer will get cracked and the plating layer will peel off; thus, the amount of Ni mentioned above is preferably less than or equal to 15 mass %. It is more preferably less than or equal to 13 mass %.

The amount of Ni of an outer layer of ¹⁄₁₀ of the layer thickness of the plating layer is preferably more than or equal to 120% of the average amount of Ni of the plating layer. When the amount of Ni of the outer layer of ¹⁄₁₀ of the layer thickness of the plating layer is set to more than or equal to 120% of the average amount of Ni of the plating layer, the hardness and the corrosion resistance of the plating outer layer are improved, and therefore characteristics as a fuel tank are improved. It is more preferably more than or equal to 130%.

A plating layer in which the amount of Ni of an outer layer is high can be formed by a method of changing the composition of the electrolyte solution or electrolysis conditions in the second half of continuous electroplating, or a method of, after Zn—Ni plating, dissolving outer-layer Zn by etching. By stopping energization in some plating baths (cell cutting) in the continuous zinc electroplating line composed of a plurality of plating baths described above, outer-layer Zn is dissolved out, and the amount of Ni of the outer layer is relatively increased. The amount of Ni of the outer layer can be measured by analyzing the depth direction of the plating layer by glow discharge optical emission spectrometry, Auger electron spectroscopy, or the like.

Trivalent Chromate Covering Film and Chromate-Free Covering Layer

A trivalent chromate covering layer or a chromate-free covering layer is formed on the Zn—Ni alloy plating layer. It is possible to form either one of a trivalent chromate covering layer and a chromate-free covering layer on the Zn—Ni alloy plating layer, or to form a trivalent chromate covering layer on the Zn—Ni alloy plating layer and further form a chromate-free covering layer on the trivalent chromate covering layer.

(Trivalent Chromate Covering Film)

The trivalent chromate covering layer formed on the Zn—Ni alloy plating layer may be a single covering layer of a trivalent chromate, or may be a covering layer formed by mixing one or more of oxides of Si, Ti, Zr, P, and V with a trivalent chromate.

The adhesion amount of the trivalent chromate covering layer is preferably 5 to 200 mg/m$^2$ on a Cr-equivalent basis. If the adhesion amount of the trivalent chromate covering layer is less than 5 mg/m$^2$, sufficient corrosion resistance is not obtained, and there is a concern that corrosion may progress from a crack of the plating layer; thus, the adhesion amount of the trivalent chromate covering layer is preferably more than or equal to 5 mg/m$^2$. In terms of ensuring corrosion resistance as a fuel tank with reliability, the adhesion amount of the trivalent chromate covering layer is more preferably more than or equal to 10 mg/m$^2$, and still more preferably more than or equal to 15 mg/m$^2$.

On the other hand, if the adhesion amount of the trivalent chromate covering layer is more than 200 mg/m$^2$, although corrosion resistance is improved, it is feared that consecutive spot weldability during spot welding may be reduced; thus, the adhesion amount of the trivalent chromate covering layer is preferably less than or equal to 200 mg/m$^2$. In terms of obtaining corrosion resistance as a fuel tank and consecutive spot weldability during spot welding with reliability, the adhesion amount of the trivalent chromate covering layer is more preferably less than or equal to 100 mg/m$^2$, and still more preferably less than or equal to 70 mg/m$^2$.

Chromate treatment may be performed by an ordinary chromate treatment method using an ordinary chromate treatment liquid, and is not limited to a specific chromate treatment liquid or a specific chromate treatment method.

(Chromate-Free Covering Layer)

The chromate-free covering layer formed on the Zn—Ni alloy plating layer is preferably (A) a covering layer containing a silicon compound and a phosphoric acid compound and further containing one or more of compounds of Zr, V, Ti, and Co, (B) a covering layer of a urethane-based resin, or (C) a covering layer containing a crosslinked epoxy-urethane-based resin and at least one of a polyolefin resin and a fluorine-based resin.

The chromate-free covering layers of (A), (B), and (C) will now be described.

[(A) Covering Layer Containing Silicon Compound and Phosphoric Acid Compound and further Containing One or More of Compounds of Zr, V, Ti, and Co]

<Silicon Compound>

The silicon compound is preferably an organic silicon compound. The organic silicon compound may be used singly; but more preferred characteristics are obtained when a silane coupling agent (a) containing one amino group in a molecule and a silane coupling agent (b) containing one glycidyl group in a molecule are blended at a specific ratio.

The blending ratio between the silane coupling agent (a) and the silane coupling agent (b) is preferably 0.5 to 1.7 in terms of the solid content mass ratio of [(a)/(b)]. If the solid content mass ratio [(a)/(b)] is less than 0.5, the effect of improving processability is not sufficiently obtained; thus, the solid content mass ratio [(a)/(b)] is preferably more than or equal to 0.5. It is more preferably more than or equal to 0.7, and still more preferably more than or equal to 0.9.

On the other hand, if the solid content mass ratio [(a)/(b)] is more than 1.7, water resistance is significantly reduced, and corrosion resistance is adversely affected; thus, the solid content mass ratio [(a)/(b)] is preferably less than or equal to 1.7. It is more preferably less than or equal to 1.4, and still more preferably less than or equal to 1.1.

The silane coupling agent (a) containing one amino group in a molecule is not particularly limited to a specific silane coupling agent, and may be 3-aminopropyltriethoxysilane, 3-aminopropyltrimethoxysilane, or the like.

The silane coupling agent (b) containing one glycidyl group in a molecule is not particularly limited to a specific silane coupling agent, and may be 3-glycidoxypropyltrimethoxysilane, 3-glycidoxypropyltriethoxysilane, or the like.

<Phosphoric Acid Compound>

The phosphoric acid compound may be phosphoric acid, an ammonium salt compound of phosphoric acid, a Na salt compound of phosphoric acid, a K salt compound of phosphoric acid, or a magnesium salt compound of phosphoric acid.

Specific examples include phosphoric acid, triammonium phosphate, diammonium hydrogen phosphate, ammonium dihydrogen phosphate, potassium phosphate, potassium dihydrogen phosphate, trisodium phosphate, disodium hydrogen phosphate, sodium dihydrogen phosphate, calcium dihydrogen phosphate, magnesium hydrogen phosphate, magnesium dihydrogen phosphate, and the like.

The blending amount of the phosphoric acid compound is preferably 0.03 to 0.12 in terms of the solid content mass ratio between the phosphoric acid compound and the organic silicon compound (the phosphoric acid compound/the organic silicon compound). If the solid content mass ratio between the phosphoric acid compound and the organic silicon compound is less than 0.03, addition effect is not sufficiently obtained; thus, the solid content mass ratio is preferably more than or equal to 0.03. It is more preferably more than or equal to 0.05, and still more preferably more than or equal to 0.09.

On the other hand, if the solid content mass ratio between the phosphoric acid compound and the organic silicon compound is more than 0.12, the water solubility of the covering layer is significantly increased and this is not preferable; thus, the solid content mass ratio is preferably less than or equal to 0.12. It is more preferably less than or equal to 0.11, and still more preferably less than or equal to 0.10.

<Compounds of Zr, V, Ti, and Co>

The blending amount of the V compound is preferably 0.05 to 0.17 in terms of the solid content mass ratio between the V compound and the silicon compound [the V compound/the silicon compound]. If the solid content mass ratio [the V compound/the silicon compound] is less than 0.05, the effect of adding the V compound is not sufficiently obtained; thus, the solid content mass ratio [the V compound/the silicon compound] is preferably more than or equal to 0.05. It is more preferably more than or equal to 0.07, still more preferably more than or equal to 0.09, and most preferably more than or equal to 0.11.

On the other hand, if the solid content mass ratio [the V compound/the silicon compound] is more than 0.17, the stability of the covering layer is considerably reduced; thus, the solid content mass ratio [the V compound/the silicon compound] is preferably less than or equal to 0.17. It is more preferably less than or equal to 0.15, and still more preferably less than or equal to 0.14.

The blending amount of the Ti compound is preferably 0.02 to 0.07 in terms of the solid content mass ratio between the Ti compound and the silicon compound [the Ti compound/the silicon compound]. If the solid content mass ratio [the Ti compound/the silicon compound] is less than 0.02, the effect of adding the Ti compound is not sufficiently obtained; thus, the solid content mass ratio [the Ti compound/the silicon compound] is preferably more than or equal to 0.02. It is more preferably more than or equal to 0.03, and still more preferably more than or equal to 0.04.

On the other hand, if the solid content mass ratio [the Ti compound/the silicon compound] is more than 0.07, the electrical conductivity of the covering film is reduced; thus, the solid content mass ratio [the Ti compound/the silicon compound] is preferably less than or equal to 0.07. It is more preferably less than or equal to 0.06, and still more preferably less than or equal to 0.05.

The blending amount of the Zr compound is likewise preferably 0.02 to 0.07 in terms of the solid content mass ratio between the Zr compound and the silicon compound [the Zr compound/the silicon compound]. If the solid content mass ratio [the Zr compound/the silicon compound] is less than 0.02, the effect of adding the Zr compound is not sufficiently obtained; thus, the solid content mass ratio [the Zr compound/the silicon compound] is preferably more than or equal to 0.02. It is more preferably more than or equal to 0.03, and still more preferably more than or equal to 0.04.

On the other hand, if the solid content mass ratio [the Zr compound/the silicon compound] is more than 0.07, the electrical conductivity of the covering film is reduced; thus, the solid content mass ratio [the Zr compound/the silicon compound] is preferably less than or equal to 0.07. It is more preferably less than or equal to 0.06, and still more preferably less than or equal to 0.05.

The V compound is not particularly limited to a specific V compound, and may be vanadium pentoxide, $V_2O_5$, metavanadic acid, $HVO_3$, ammonium metavanadate, sodium metavanadate, vanadium oxytrichloride, $VOCl_3$, vanadium trioxide, $V_2O_3$, vanadium dioxide, $VO_2$, vanadium oxysulfate, $VOSO_4$, vanadium oxyacetylacetonate, $VO(OC(=CH_2)CH_2COCH_3))_2$, vanadium acetylacetonate, $V(OC(=CH_2)CH_2COCH_3))_3$, vanadium trichloride, $VCl_3$, phosphovanadomolybdic acid, or the like. It is also possible to use a V compound obtained by reducing a pentavalent vanadium compound to tetravalence to divalence with an organic compound having one or more of a hydroxyl group, a carbonyl group, a carboxyl group, a primary-tertiary amino group, an amide group, a phosphoric acid group, and a phosphonic acid group.

The Ti compound may be hexafluorotitanic acid or a salt thereof, such as an ammonium salt, a potassium salt, or a sodium salt.

The Zr compound may be hexafluorozirconic acid or a salt thereof, such as an ammonium salt, a potassium salt, or a sodium salt.

The solid content mass ratio between the V compound and the Ti compound [the V compound/the Ti compound] is preferably 1.3 to 6.0. If the solid content mass ratio [the V compound/the Ti compound] is less than 1.3, the effect of adding the V compound is not sufficiently obtained; thus, the solid content mass ratio [the V compound/the Ti compound] is preferably more than or equal to 1.3. It is more preferably more than or equal to 2.5, and still more preferably more than or equal to 2.8.

On the other hand, if the solid content mass ratio [the V compound/the Ti compound] is more than 6.0, the stability and processability of the covering layer are reduced; thus, the solid content mass ratio [the V compound/the Ti compound] is preferably less than or equal to 6.0. It is more preferably less than or equal to 4.5, and still more preferably less than or equal to 3.3.

The solid content mass ratio between the V compound and the Zr compound [the V compound/the Zr compound] is preferably 1.3 to 6.0. If the solid content mass ratio [the V compound/the Zr compound] is less than 1.3, the effect of adding the V compound is not sufficiently obtained; thus, the solid content mass ratio [the V compound/the Zr compound] is preferably more than or equal to 1.3. It is more preferably more than or equal to 2.5, and still more preferably more than or equal to 2.8.

On the other hand, if the solid content mass ratio [the V compound/the Zr compound] is more than 6.0, the stability and processability of the covering layer are reduced; thus, the solid content mass ratio [the V compound/the Zr compound] is preferably less than or equal to 6.0. It is more preferably less than or equal to 4.5, and still more preferably less than or equal to 3.3.

The solid content mass ratio between the Co compound and the silicon compound [the Co compound/the silicon compound] is preferably 0.01 to 0.10. If the solid content mass ratio [the Co compound/the silicon compound] is less than 0.01, the effect of adding the Co compound is not sufficiently obtained; thus, the solid content mass ratio [the Co compound/the silicon compound] is preferably more than or equal to 0.01. It is more preferably more than or equal to 0.02, and still more preferably more than or equal to 0.03.

On the other hand, if the solid content mass ratio [the Co compound/the silicon compound] is more than 0.10, corrosion resistance is reduced; thus, the solid content mass ratio [the Co compound/the silicon compound] is preferably less than or equal to 0.10. It is more preferably less than or equal to 0.08, and still more preferably less than or equal to 0.06.

The Co compound may be at least one cobalt compound of cobalt sulfate, cobalt nitrate, and cobalt carbonate.

The adhesion amount of (A) the covering layer containing a silicon compound and a phosphoric acid compound and further containing one or more of compounds of Zr, V, Ti, and Co is preferably 0.05 to 2.0 g/m². If the adhesion amount of the covering layer mentioned above is less than 0.05 g/m², the surface of the plated steel sheet cannot be sufficiently covered, and corrosion resistance is significantly reduced; thus, the adhesion amount mentioned above is preferably more than or equal to 0.05 g/m². It is more preferably more than or equal to 0.10 g/m², and still more preferably more than or equal to 0.30 g/m².

On the other hand, if the adhesion amount mentioned above is more than 2.0 g/m², the processability of the covering layer is reduced; thus, the adhesion amount mentioned above is preferably less than or equal to 2.0 g/m². It is more preferably less than or equal to 1.6 g/m², and still more preferably less than or equal to 1.2 g/m².

The covering layer mentioned above can be formed by applying, to the surface of the plated steel sheet, a water-based metal surface treatment agent containing the silane coupling agent (a) and the silane coupling agent (b) blended at a prescribed solid content mass ratio, a phosphoric acid compound, and one or more of compounds of Zr, V, Ti, and Co, and performing drying at a peak temperature of more than or equal to 50° C. and less than 250° C.

If the peak temperature is less than 50° C., the solvent of the water-based metal surface treatment agent is not completely volatilized, and a needed covering layer is not formed; thus, the peak temperature is preferably more than or equal to 50° C. It is more preferably more than or equal to 70° C., and still more preferably more than or equal to 100° C. On the other hand, if the peak temperature is more than or equal to 250° C., part of an organic chain contained in the covering layer is decomposed and the covering layer is degraded; thus, the peak temperature is preferably less than 250° C. It is more preferably less than or equal to 220° C., and still more preferably less than or equal to 200° C.

[(B) Covering Layer of Urethane-Based Resin]

The urethane-based resin covering layer is preferably a covering layer containing a polyurethane resin containing a silanol group, at least one of a polyester resin containing a sulfonic acid group, a phenolic resin, a polyolefin resin, and an acrylic resin, and one or more of a water-soluble isocyanate compound, a carbodiimide group-containing compound, an oxazoline group-containing compound, and an organic titanate compound as a crosslinker, and further containing a silicon oxide or a phosphoric acid-based compound.

The polyurethane resin containing a silanol group can be formed by, for example, reacting a hydrolyzable silicon group-containing compound having at least one or more active hydrogen groups in a molecule and a polyurethane prepolymer together and then dispersing or dissolving the resulting product in water to perform hydrolysis.

The hydrolyzable silicon group is a group in which a hydrolyzable group to be hydrolyzed is bonded to a silicon atom; specifically, a hydrogen atom, a halogen atom, an alkoxy group, an acyloxy group, an amino group, an amide group, an aminoxy group, a mercapto group, etc. may be given. An alkoxy group is preferable because it has relatively low hydrolyzability and is easy to handle. Usually one to three hydrolyzable groups are bonded to one silicon atom, but a group in which two to three hydrolyzable groups are bonded is preferable in terms of the reactivity of the hydrolyzable silyl group after application, water resistance, and solvent resistance.

Examples of the hydrolyzable silicon group-containing compound having at least one or more active hydrogen groups in a molecule include γ-(2-aminoethyl)aminopropyltrimethoxysilane, γ-(2-aminoethyl)aminopropyltriethoxysilane, γ-(2-aminoethyl)aminopropyldimethoxysilane, γ-(2-aminoethyl)aminopropyldiethoxysilane, γ-aminopropyltrimethoxysilane, γ-aminopropyltriethoxysilane, γ-aminopropyldimethoxysilane, γ-aminopropyldiethoxysilane, γ-mercaptopropyltrimethoxysilane, γ-mercaptopropylmethyldimethoxysilane, γ-mercaptopropyltriethoxysilane, γ-mercaptopropyldiethoxysilane, and the like. In terms of contributing to covering film formation more, it is preferable to introduce a silanol group between molecules contained in the polyurethane resin, and a hydrolyzable silicon group-containing compound having more active hydrogen groups is preferable.

The content amount of silanol groups or Si—O bonds is preferably 0.1 to 10 mass % in terms of the amount of silicon relative to the total solid content of the polyurethane resin in order to provide the polyurethane resin with excellent crosslinking reactivity and performance. If the content amount of silanol groups or Si—O bonds is less than 0.1 mass %, an appropriate contribution to the crosslinking reaction is not made, and addition effect is not sufficiently obtained; thus, the content amount mentioned above is preferably more than or equal to 0.1 mass %. It is more preferably more than or equal to 0.5 mass %.

On the other hand, if the content amount of silanol groups or Si—O bonds is more than 10 mass %, addition effect is saturated, and the stability of the treatment liquid is reduced; thus, the content amount mentioned above is preferably less than or equal to 10 mass %. It is more preferably less than or equal to 5 mass %.

Examples of the polyurethane prepolymer include a polycarbonate polyol, a polyester polyol, a polyether polyol, a polyester amide polyol, an acrylic polyol, and a polyurethane polyol, and a mixture of them. Among these, a polycarbonate polyol, a polyester polyol, and a polyether polyol are preferable in terms of ensuring processability and ensuring a high elastic modulus.

The polyurethane prepolymer can be obtained by reacting a compound having two active hydrogen groups per molecule and a polyisocyanate compound having two isocyanates per molecule together and dissolving or dispersing the resulting product in water.

Examples of the compound having at least two active hydrogen groups per molecule contained in the polyurethane prepolymer include, as a compound having an active hydrogen group, a compound having an amino group, a hydroxyl group, or a mercapto group; in view of reactivity with an isocyanate group, a compound having a hydroxyl group is preferable because of its high reaction rate. Examples of the compound having at least two active hydrogen groups per molecule include a polycarbonate polyol, a polyester polyol, a polyether polyol, a polyester amide polyol, an acrylic polyol, and a polyurethane polyol, and a mixture of them.

Examples of the compound having at least two isocyanate groups per molecule include aliphatic isocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethylcaproate, alicyclic diisocyanates such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,2-bis(isocyanatomethyl)cyclohexane, 1,4-bis(isocyanatomethyl)cyclohexane, and 1,3-bis(isocyanatomethyl)cyclohexane, aromatic diisocyanates such as m-xylene diisocyanate, m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, dianisidine diisocyanate, and 4,4'-diphenyl ether diisocyanate, aromatic-aliphatic diisocyanates such as ω,ω'-diisocyanato-1,3-dimethylbenzene, ω,ω'-diisocyanato-1,4-dimethylbenzene, and ω,ω'-diisocyanato-1,4-diethylbenzene, triisocyanates such as triphenylmethane-4,4'-4"-triisocyanate, 1,3,5-triisocyanatobenzene, and 2,4,6-triisocyanatotoluene, a polyisocyanate monomer such as 4,4'-diphenyldimethylmethane-2,2',5,5'-tetraisocyanate, a polyisocyanate derivative obtained from a dimer, a trimer, a biuret, an allophanate, or a carbodiimide derived from the polyisocyanate monomer mentioned above and the polyisocyanate monomer mentioned above, an adduct of a low molecular weight polyol with a molecular weight of less than 200, such as ethylene glycol, propylene glycol, or butylene glycol, to the polyisocyanate monomer mentioned above, an adduct of a polyester polyol, a polyether polyol, a polycarbonate polyol, a polyester amide polyol, an acrylic polyol, a polyurethane polyol, or the like to the polyisocyanate monomer mentioned above, and the like.

In order to disperse a polyurethane resin in water, a hydrophilic group is introduced into a polyurethane prepolymer. To introduce a hydrophilic group, for example, at least one or more compounds having at least one or more active hydrogen groups in a molecule and containing a hydrophilic group such as a carboxyl group, a sulfonic acid group, a sulfonate group, or a polyoxyethylene group may be copolymerized during the production of the polyurethane prepolymer mentioned above.

Examples of the hydrophilic group-containing compound include carboxyl group-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and a derivative of these, and a polyester polyol obtained by copolymerizing these, a carboxyl group-containing compound obtained by reacting a compound having an anhydride group such as maleic anhydride, phthalic anhydride, succinic anhydride, trimellitic anhydride, or pyromellitic anhydride and a compound having an active hydrogen group together, and a derivative of these, sulfonic acid-containing compounds such as 2-oxyethanesulfonic acid, phenolsulfonic acid, sulfobenzoic acid, sulfosuccinic acid, 5-sulfoisophthalic acid, and sulfanilic acid, and a derivative of these, and a polyester polyol obtained by copolymerizing these, and the like.

A neutralizer is used in the polyurethane resin in order to dissolve or disperse the polyurethane resin in water well. Examples of the neutralizer include basic substances such as ammonia, tertiary amines such as triethylamine, triethanolamine, triisopropanolamine, trimethylamine, and dimethylethanolamine, and hydroxides of alkali metals and alkaline earth metals such as sodium hydroxide, potassium hydroxide, and calcium hydroxide; a tertiary amine with a boiling point of more than or equal to 120° C. is preferable in terms of weldability, solvent resistance, and bad odor during welding.

A neutralizer may be used singly, or two or more neutralizers may be used in a mixture. As a method for adding a neutralizer, the neutralizer may be directly added to a polyurethane prepolymer, or may be added into water at the time of dissolving or dispersing a polyurethane prepolymer in water. The addition amount of the neutralizer is preferably 0.1 to 2.0 equivalents and more preferably 0.3 to 1.3 equivalents relative to the amount of carboxyl groups.

The polyolefin resin contained in the urethane-based covering layer is preferably an alkali metal-neutralized product of an ethylene-unsaturated carboxylic acid copolymer. Here, the polyolefin resin being an alkali metal-neutralized product of an ethylene-unsaturated carboxylic acid copolymer means that part of the carboxyl groups contained in an ethylene-unsaturated carboxylic acid copolymer are neutralized by an alkali metal supplied by a metal compound such as KOH, NaOH, or LiOH.

For the alkali metal-neutralized product of an ethylene-unsaturated carboxylic acid copolymer, it is preferable that the lower limit of the degree of neutralization be 30% and the upper limit of the degree of neutralization be 90%. The lower limit of the degree of neutralization being 30% and the upper limit of the degree of neutralization being 90% mean that 30 to 90% of the carboxyl groups contained in an ethylene-unsaturated carboxylic acid copolymer are neutralized. If the degree of neutralization is less than 30%, the adhesiveness of the resulting covering layer to an intermediate layer covering film (C) is insufficient; thus, the degree of neutralization is preferably more than or equal to 30%. It is more preferably more than or equal to 40%.

On the other hand, if the degree of neutralization is more than 90%, the adhesiveness between the covering film and the intermediate layer (C) may be reduced; thus, the degree of neutralization is preferably less than or equal to 90%. It is more preferably less than or equal to 80%.

The ethylene-unsaturated carboxylic acid copolymer is a copolymer obtained by radical-polymerizing ethylene and an unsaturated carboxylic acid such as methacrylic acid, acrylic acid, maleic acid, fumaric acid, itaconic acid, or crotonic acid under increased pressure.

The olefin resin may also be a resin obtained by neutralizing an ethylene-unsaturated carboxylic acid copolymer with an amine (for example, a water-soluble amine such as trimethylamine or ethanolamine, or the like), ammonia, or the like. An amine may be used singly, or two or more amines may be used in combination. For the olefin resin, ammonia or an amine may be used in combination with an alkali metal in the neutralization of an ethylene-unsaturated carboxylic acid copolymer.

The phenolic resin to be contained in the urethane-based resin covering layer may be a phenolic resin composition provided with water solubility, and examples include a composition obtained by reacting a phenolic resin, such as a methylolated phenolic resin obtained by performing an addition reaction between an aromatic substance such as phenol, resorcinol, a cresol, bisphenol A, or para-xylylene dimethyl ether and formaldehyde in the presence of a reaction catalyst, with an amine compound such as diethanolamine or N-methylethanolamine and performing neutralization with an organic acid or an inorganic acid, and the like.

The crosslinker to be contained in the urethane-based resin covering layer is used as a means for performing a crosslinking reaction at a lower baking temperature with good efficiency, and for providing the covering film with characteristics possessed by the crosslinker itself. Any water-soluble or water-dispersible crosslinker may be used as the crosslinker; among them, one or more selected from a water-soluble isocyanate compound, a carbodiimide group-containing compound, an oxazoline group-containing compound, and an organic titanate compound are preferable.

The water-soluble isocyanate compound may be a polyisocyanate compound provided with water dispersibility; the water-soluble isocyanate compound reacts mainly with a hydroxyl group of a silanol group to form a crosslinking structure. Examples include BURNOCK 5000 (produced by DIC, Inc.) and the like.

The carbodiimide group-containing compound may be an aromatic carbodiimide compound, an aliphatic carbodiimide compound, and the like; the carbodiimide group-containing compound forms a crosslinking structure mainly with an active hydrogen group such as a carboxyl group or a hydroxyl group. Examples include CARBODILITE V-02, CARBODILITE V-02-L2, CARBODILITE E-01, CARBODILITE E-02, CARBODILITE E-03A, and CARBODILITE E-04 (all of these produced by Nisshinbo Industries, Inc.).

Examples of the oxazoline group-containing compound include Epocros K-2010E, Epocros K-2020E, Epocros K-2030E, Epocros WS-500, and Epocros WS-700 (all of these produced by Nippon Shokubai Co., Ltd.). The oxazoline group-containing compound reacts mainly with a carboxyl group to form a crosslinking structure.

Examples of the organic titanate compound include ORGATIX TC-300 (dihydroxybis(ammonium lactato)titanium, produced by Matsumoto Pharmaceutical Industry Co., Ltd), TC-400 (diisopropoxytitanium bis(triethanolaminate), produced by Matsumoto Pharmaceutical Industry Co., Ltd), and the like. The organic titanate compound forms a crosslinking structure mainly with an active hydrogen group such as a carboxyl group or a hydroxyl group.

A preferred addition amount of the crosslinker is, depending on the acid value of the resin, 5 to 50 mass in terms of the solid content ratio of the total amount of the crosslinker to the main resin, from the viewpoint of the balance in property terms between the hardenability, elongation, hardness, etc. of the covering layer.

Examples of the phosphoric acid-based compound to be contained in the urethane-based resin covering layer include triammonium phosphate, diammonium hydrogen phosphate, ammonium dihydrogen phosphate, potassium phosphate, potassium dihydrogen phosphate, trisodium phosphate, disodium hydrogen phosphate, sodium dihydrogen phosphate, calcium dihydrogen phosphate, magnesium hydrogen phosphate, magnesium dihydrogen phosphate, and the like.

Among them, at least one compound of ammonium phosphate-based compounds of triammonium phosphate, diammonium hydrogen phosphate, and ammonium dihydrogen phosphate, sodium phosphate-based compounds of trisodium phosphate, disodium hydrogen phosphate, and sodium dihydrogen phosphate, calcium phosphate-based compounds such as calcium dihydrogen phosphate, and magnesium phosphate-based compounds such as magnesium hydrogen phosphate and magnesium dihydrogen phosphate is preferable because the effect of improving solvent resistance and corrosion resistance is significantly exhibited.

Any of these compounds may be used in accordance with the pH of the treatment bath to the extent that it is soluble in water or soluble in acid or alkali, and any of a pure compound, a hydrate, and the like may be used.

The content amount of the phosphoric acid-based compound is preferably 0.1 to 10 mass % in terms of the amount of phosphorus relative to the solid content of the covering film. If the content amount of the phosphoric acid-based compound is less than 0.1 mass %, addition effect is not sufficiently obtained; thus, the content amount of the phosphoric acid-based compound is preferably more than or equal to 0.1 mass %. On the other hand, if the content amount of the phosphoric acid-based compound is more than 10 mass %, hydration properties to the covering film may be increased and corrosion resistance may be reduced; thus, the content amount of the phosphoric acid-based compound is preferably less than or equal to 10 mass %.

Examples of the silicon oxide to be contained in the urethane-based resin covering layer include silicon dioxide and the like. The silicon oxide may be any compound that is stably dispersed in water and does not settle; in particular, colloidal silica is preferable because the effect of improving solvent resistance and corrosion resistance is significantly exhibited.

For example, commercially available colloidal silica particles such as "SNOWTEX O," "SNOWTEX OS," "SNOWTEX OXS," "SNOWTEX N," "SNOWTEX NS," and "SNOWTEX NXS" (all of these produced by Nissan Chemical Industries, Ltd.), fibrous colloidal silica such as "SNOWTEX UP" and "SNOWTEX PS" (produced by Nissan Chemical Industries, Ltd.), and the like may be used in accordance with the pH of the treatment liquid.

The content amount of the silicon oxide is preferably 2 to 20 mass % in terms of the amount of silicon relative to the solid content of the covering film. If the content amount of the silicon oxide is less than 2 mass/%, addition effect is not sufficiently obtained; thus, the content amount of the silicon oxide is preferably more than or equal to 2 mass %. On the other hand, if the content amount of the silicon oxide is more than 20 mass %, addition effect may be saturated, and processability and corrosion resistance may be reduced; thus, the content amount of the silicon oxide is preferably less than or equal to 20 mass %.

In order to improve corrosion resistance, it is preferable to further add an inorganic antirust agent of a niobium compound or a zirconium compound or an organic antirust agent such as a guanidino group-containing compound, a biguanidino group-containing compound, or a thiocarbonyl group-containing compound, as appropriate. It is preferable that the addition amount of the antirust agent be 1.0 to 15 mass % in total in the case of inorganic antirust agents, and be 0.1 to 10 mass % in total in the case of organic antirust agents, relative to the solid content of the covering layer of 100%.

If the amount of the inorganic antirust agent is less than 1.0 mass % or the amount of the organic antirust agent is less than 0.1 mass %, addition effect is not sufficiently obtained; thus, the amount of the inorganic antirust agent is preferably more than or equal to 1.0 mass %, and the amount of the organic antirust agent is preferably more than or equal to 0.1 mass %. On the other hand, if the amount of the inorganic antirust agent is more than 15 mass % or the amount of the organic antirust agent is more than 10 mass %, addition effect may be saturated, and processability and corrosion resistance may be reduced; thus, the amount of the inorganic antirust agent is preferably less than or equal to 15 mass %, and the amount of the organic antirust agent is preferably less than or equal to 10 mass %.

The urethane resin is preferably a polyurethane resin containing a silanol group in terms of accelerating the crosslinking reaction. In order to enhance the strength of the covering layer, it is preferable to blend a silicon oxide. The content amount of silanol groups and Si compounds is preferably 5 to 20 mass % on a silicon-equivalent basis relative to the solid content of the covering layer. If the content amount of silanol groups and Si compounds is less than 5 mass %, addition effect is not sufficiently obtained; thus, the content amount mentioned above is preferably more than or equal to 5 mass %.

On the other hand, if the content amount of silanol groups and Si compounds is more than 20 mass %, addition effect may be saturated, and processability and corrosion resistance may be reduced; thus, the content amount mentioned above is preferably less than or equal to 20 mass %.

A resin covering layer containing a urethane bond+a urea bond and Si is formed by dispersing or dissolving in water a polyurethane resin (containing a urethane group and a urea group) in which a silanol group is bonded to a resin framework, further mixing a silicon oxide to prepare a surface treatment agent, applying the surface treatment agent to a surface of a steel sheet, and then performing baking drying or natural drying. Alternatively, the formation is performed by preparing a solution in which a polyurethane resin in which a silanol group is bonded to a resin framework and another resin are mixed, further mixing a silicon oxide to prepare a surface treatment agent, applying the surface treatment agent to a surface of a steel sheet, and then performing baking drying.

A lubricity imparting agent may be added to the resin covering layer mentioned above as appropriate, and thereby a surface-treated steel sheet excellent in processability that has a low coefficient of kinetic friction of the surface while maintaining good performance can be obtained. Typical examples of the lubricity imparting agent include a water-dispersible polyethylene resin, a tetrafluoroethylene resin, a stearic acid compound, natural paraffin wax, and the like. Among these, a polyethylene resin and a tetrafluoroethylene resin are preferable because lubricity reduction effect is significantly exhibited.

The addition amount of the lubricity imparting agent is preferably 1 to 40 mass % on the solid content basis of the resin covering layer. If the addition amount of the lubricity imparting material is less than 1 mass %, addition effect is not sufficiently obtained; thus, the addition amount mentioned above is preferably more than or equal to 1 mass %. On the other hand, if the addition amount of the lubricity imparting material is more than 40 mass %, the effect of reducing the coefficient of kinetic friction may be saturated, and covering film formation capability may be reduced and corrosion resistance may be reduced; thus, the addition amount mentioned above is preferably less than or equal to 40 mass %.

[(C) Covering Layer Containing Crosslinked Epoxy-Urethane-Based Resin and at Least One of Polyolefin Resin and Fluorine-Based Resin]

The covering layer containing a crosslinked epoxy-urethane-based resin and at least one of a polyolefin resin and a fluorine-based resin will now be described.

A covering layer of an upper layer of the present invention steel sheet is a covering layer containing a crosslinked epoxy-urethane-based resin and at least one of a polyolefin resin and a fluorine-based resin. A covering layer excellent in gasoline resistance can be formed by crosslinking a specific resin.

<Crosslinked Epoxy-Urethane-Based Resin>

The crosslinked epoxy-urethane-based resin is an organic solvent-soluble resin that is made of a binder resin and a crosslinker (b), has good gasoline resistance, water resistance, and alkali resistance, and is excellent particularly in adhesiveness with a ground material and adhesiveness with an over-coating film. The binder resin is preferably a bisphenol-type epoxy resin (a) with a number average molecular weight of 300 to 100,000.

For example, a resin represented by Formula (1) below may be used.

epoxy resin is more than 100,000, the crosslinking reaction does not progress sufficiently, and the solvent resistance of the covering layer is reduced and sufficient corrosion resistance is not obtained; thus, the number average molecular weight mentioned above is preferably less than or equal to 100,000.

The blending amount of the bisphenol-type epoxy resin (a) is preferably more than or equal to 30 mass % in the solid content of the coating material. If the blending amount of the bisphenol-type epoxy resin is less than 30 mass %, the covering layer is embrittled, and covering adhesiveness during processing is reduced; thus, the blending amount mentioned above is preferably more than or equal to 30 mass %.

The hardening agent (b) is made of a polyisocyanate compound and/or a blocked polyisocyanate compound. Examples of the polyisocyanate compound include aliphatic or alicyclic diisocyanate compounds (hexamethylene diisocyanate, isophorone diisocyanate, hydrogenated diphenylmethane diisocyanate, and the like), aromatic diisocyanate compounds (tolylene diisocyanate, diphenylmethane-4,4'-diisocyanate, and the like), triisocyanate compounds (an adduct of 1 mol of trimethylolpropane and 3 mol of the diisocyanate mentioned above, a trimer of a diisocyanate such as hexamethylene diisocyanate or tolylene diisocyanate, and the like), and the like; and one or more of these may be used.

The blocked polyisocyanate compound is, for example, a compound in which an isocyanate is blocked with a blocking agent. For the blocking agent, it is necessary that an adduct produced by adding the blocking agent to an isocyanate group be stable at normal temperature, and be dissociated during the baking of the covering film and cause a free isocyanate radical to be reproduced.

Examples of the blocking agent include lactam-based blocking agents (ε-caprolactam, γ-butyrolactam, and the like), oxime-based blocking agents (methyl ethyl ketoxime, cyclohexanone oxime, and the like), alcohol-based blocking agents (methanol, ethanol, isobutyl alcohol, and the like), phenol-based blocking agents (phenol, para-tert-butylphenol, a cresol, and the like), and ester-based blocking agents (ethyl acetoacetate, methyl acetoacetate, and the like). In particular, methyl ethyl ketoxime, ethyl acetoacetate, and the

[Math. 1]

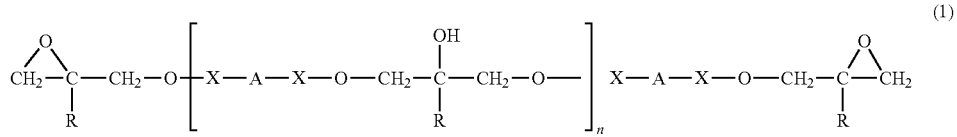

Math. 1

In the above formula, R represents H or $CH_3$, A represents $C(CH_3)_2$, $CH_2$, O, $SO_2$, or S, and X represents a p-phenylene group. As n in Formula (1) above, 2 to 9 are preferable. A particularly favorable result can be obtained in the case where A is $C(CH_3)_2$.

If the number average molecular weight of the bisphenol-type epoxy resin (a) is less than 300, the polymerization reaction does not progress sufficiently, and the anticorrosion capacity of the covering layer is insufficient; thus, the number average molecular weight mentioned above is preferably more than or equal to 300. On the other hand, if the number average molecular weight of the bisphenol-type like, which are dissociated at low temperature and are stable in the state of coating material storage, are preferable.

The blending amount of the hardening agent (b) is preferably 10/1 to 1/1 in terms of the mass ratio of (a)/(b) with respect to the solid content of the bisphenol-type epoxy resin (a).

The bisphenol-type epoxy resin (a) and the hardening agent (b) at the mass ratio mentioned above can form a favorable resin covering layer by sufficient progress of reaction under baking conditions of low temperature and short time, for example baking conditions of a maximum peak temperature of less than or equal to 160° C. and a baking time of 5 to 60 seconds.

If the mass ratio (a)/(b) mentioned above is more than 10/1, the progress of the crosslinking reaction is insufficient, and the corrosion resistance of the covering layer is insufficient; thus, the mass ratio (a)/(b) mentioned above is preferably less than or equal to 10/1. It is more preferably less than or equal to 7/1. On the other hand, if the mass ratio (a)/(b) mentioned above is less than 1/1, the water resistance and the alkali resistance of the covering layer are reduced, and covering adhesiveness during processing is reduced; thus, the mass ratio (a)/(b) mentioned above is preferably more than or equal to 1/1. It is more preferably more than or equal to 3/1.

<Polyolefin Resin and Fluorine Resin>

The at least one resin of a polyolefin resin and a fluorine resin is a resin component that provides the covering layer with processability and lubricity. The polyolefin resin may be polyethylene, polypropylene, and the like, and the fluorine resin may be polytetrafluoroethylene, polychlorotrifluoroethylene, polyvinylidene fluoride, polyvinyl fluoride, and the like. A resin containing one or more of them is preferable.

The polyolefin resin and/or the fluorine resin is a resin that has actions of reducing the coefficient of kinetic friction of the surface of the covering layer to provide the covering layer with lubricity, preventing galling or the like during processing to contribute to improvement in the press processability and the ironing processability of the covering layer, and being composited with a crosslinked epoxy-urethane resin covering film to maintain the flexibility of the entire covering layer.

The blending amount of the at least one resin of a polyolefin resin and a fluorine resin is preferably 0.5 to 15 amount % relative to the mass of all the resin components including the crosslinked epoxy-urethane-based resin. If the blending amount of the at least one resin of a polyolefin resin and a fluorine resin is less than 0.5 mass %, the effect of providing the covering layer with lubricity is not sufficiently obtained; thus, the blending amount mentioned above is preferably more than or equal to 0.5 mass %. It is more preferably more than or equal to 3 mass %.

On the other hand, if the blending amount of the at least one resin of a polyolefin resin and a fluorine resin is more than 15 mass/%, the continuity and uniformity of the covering layer are lost and adhesiveness with an underlying covering film is reduced, and storage stability as a coating material composition is reduced; thus, the blending amount mentioned above is preferably less than or equal to 15 mass %. It is more preferably less than or equal to 10 mass %.

<Silica Particles>

The covering layer of the present invention steel sheet may contain silica particles (fumed silica) with an average particle size of 0.10 to 100 µm at 5 to 50 mass % in the solid content of the coating material in order to ensure excellent corrosion resistance without dissolving out harmful substances to a degreasing bath or a covering film formation bath.

If the average particle size of silica particles is less than 0.10 µm, alkali resistance and adhesiveness with an overcoating film are reduced; thus, the average particle size mentioned above is preferably more than or equal to 0.10 µm. On the other hand, if the average particle size of silica particles is more than 100 µm, the corrosion resistance of the covering layer is reduced; thus, the average particle size mentioned above is preferably less than or equal to 100 µm.

The blending amount of silica particles (fumed silica) is preferably 5 to 50 mass % relative to the solid content of the coating material. If the blending amount of silica particles (fumed silica) is less than or equal to 5 mass %, the anticorrosion capacity of the covering layer is insufficient; thus, the blending amount mentioned above is preferably more than or equal to 5 mass %. It is more preferably more than or equal to 10 mass %.

On the other hand, if the blending amount of silica particles (fumed silica) is more than 50 mass %, covering adhesiveness during processing is reduced; thus, the blending amount mentioned above is preferably less than or equal to 50 mass %. It is more preferably less than or equal to 30 mass %.

In order to blend a large amount of silica particles (fumed silica) in the covering layer, it is preferable to use a ketone-based organic solvent. A large amount of silica particles (fumed silica) may increase the viscosity of the coating material for covering layer formation and make it difficult to apply the coating material uniformly; but when silica particles are dispersed with a ketone-based organic solvent, it becomes possible to apply the coating material mentioned above thinly and uniformly.

A uniform thin film can be easily formed by incorporating a ketone-based organic solvent at more than or equal to 40 mass % of the mass of the coating material and adjusting the solid content concentration of the coating material to 10 to 50 mass %. If the solid content concentration of the coating material is less than 10 mass %, the solvent content is too large and this is not economical; thus, the solid content concentration of the coating material is preferably more than or equal to 10 mass %.

On the other hand, if the solid content concentration of the coating material is more than 50 mass %, coating workability is reduced, and it is difficult to form a thin film uniformly; thus, the solid content concentration of the coating material is preferably less than or equal to 50 mass %.

Particularly preferred examples of the ketone-based organic solvent include methyl isobutyl ketone, acetone, cyclohexanone, isophorone, and the like. Although other solvents may be used, it is necessary to avoid using solvents that react with a polyisocyanate compound, such as water or alcohols.

As a baking condition of the coating material composition that forms the covering layer, the peak temperature of the steel sheet is preferably 120 to 250° C. If the peak temperature of the steel sheet is less than 120° C., it is difficult for the crosslinking reaction to progress and cause hardening in a short time, and gasoline resistance is reduced; thus, the peak temperature of the steel sheet is preferably more than or equal to 120° C. It is more preferably more than or equal to 140° C.

On the other hand, if the peak temperature of the steel sheet is more than 250° C., the covering layer begins to thermally decompose, and covering film performance is reduced; thus, the peak temperature of the steel sheet is preferably less than or equal to 250° C. It is more preferably less than or equal to 200° C.

As the coating method, known methods such as the roll coating method and the curtain flow coating method may be used; also as the baking method, known methods such as hot-air drying, high-frequency induction heating, and near infrared heating may be used.

In the present invention steel sheet, the layer thickness of the entire covering layer is preferably 0.3 to 2.0 µm, and the coefficient of kinetic friction of the surface of the covering layer is preferably 0.07 to 0.15. If the film thickness of the covering layer is less than 0.3 μm, antirust effect is not sufficiently obtained depending on the combination between the surface-treated steel sheet and an underlayer treatment covering film; thus, the film thickness of the covering layer is preferably more than or equal to 0.3 μm. It is more preferably more than or equal to 0.5 μm in terms of obtaining stable corrosion resistance, processability, and weldability.

On the other hand, if the film thickness of the covering layer is more than 2.0 μm, film thickness effect is saturated, and weldability is reduced; thus, the film thickness of the covering layer is preferably less than or equal to 2.0 μm. It is more preferably less than or equal to 1.5 μm in terms of obtaining stable corrosion resistance, processability, and weldability.

The coefficient of kinetic friction of the surface of the covering layer is preferably 0.07 to 0.25 in a state of no lubrication. If the coefficient of kinetic friction of the surface of the covering layer is less than 0.07, the coefficient of kinetic friction is too low and the effect of reducing the coefficient of friction is saturated, and there is a concern that wrinkles are likely to occur during press molding; thus, the coefficient of kinetic friction mentioned above is preferably more than or equal to 0.07. It is more preferably more than or equal to 0.08 in terms of obtaining stable processability.

On the other hand, if the coefficient of kinetic friction mentioned above is more than 0.25, there is a concern that processability may be reduced in the course of processing, depending on the state of lubrication or the state of a mold; thus, the coefficient of kinetic friction mentioned above is preferably less than or equal to 0.25. It is more preferably less than or equal to 0.20 in terms of obtaining stable processability.

The present invention steel sheet may include, in place of the trivalent chromate covering layer or the chromate-free covering layer, a resin covering layer containing urethane groups and urea groups at 0.6 to 10 mass % on a N-equivalent basis in the solid content of the entire covering film and Si at 5 to 20 mass % on a Si-equivalent basis in the entire covering film. In this case, for example, the layer thickness of the resin covering layer is 0.5 to 2.0 μm, and the coefficient of kinetic friction of the surface is 0.06 to 0.25.

Further, the present invention steel sheet may include, on the trivalent chromate covering layer or the chromate-free covering layer, a resin covering layer containing urethane groups and urea groups at 0.6 to 10 mass % on a N-equivalent basis in the solid content of the entire covering film and Si at 5 to 20 mass % on a Si-equivalent basis in the entire covering film. In this case, for example, the layer thickness of the resin covering layer is 0.5 to 2.0 μm, and the coefficient of kinetic friction of the surface is 0.06 to 0.25.

Further, the present invention steel sheet may include, on the trivalent chromate covering layer or the chromate-free covering layer, an organic covering layer containing a resin having a urethane bond, one or two of a polyolefin resin and a fluorine resin, and an electrically conductive pigment, with a film thickness of 3 to 20 μm. In this case, for example, (iii) the resin having a urethane bond mentioned above is an organic resin obtained from a film-forming resin source material containing (I) a polyester polyol having at least three functional groups, and (II) a blocked product of an organic polyisocyanate, or a blocked product of a prepolymer having an NCO group at a terminal obtained by a reaction between an organic polyisocyanate and an active hydrogen compound.

The electrically conductive pigment in the organic covering layer is made of one or more of stainless steel, Zn, Al, Ni, ferrosilicon, and iron phosphide, and the content ratio of the electrically conductive pigment is 5 to 50 volume % on a solid content basis, for example.

The organic covering layer further contains an antirust pigment at 1 to 40 volume % on a solid content basis, and contains the electrically conductive pigment and the antirust pigment at 5 to 70 volume % in total on a solid content basis, for example.

Further, the present invention steel sheet may include a Zn—Ni alloy plating layer on one surface or both surfaces of a steel sheet, a trivalent chromate covering layer on the Zn—Ni alloy plating layer, and a second resin covering layer containing a crosslinked epoxy-urethane-based resin and at least one of a polyolefin resin and a fluorine-based resin on the trivalent chromate covering layer, in which (iv) the amount of Cr of the trivalent chromate covering film mentioned above is 5 to 200 mg/m² on a Cr-equivalent basis, and (v) the layer thickness of the second resin covering layer mentioned above is 0.3 to 2.0 μm and the coefficient of kinetic friction of the surface is 0.06 to 0.25.

Examples

Next, Examples of the present invention are described; the conditions in Examples are examples of conditions employed to verify the feasibility and effects of the present invention, and the present invention is not limited to these examples of conditions. The present invention may employ various conditions without departing from the gist of the present invention to the extent that the object of the present invention is achieved.

Each of pieces of steel of the component compositions shown in Table 1 was smelted and was heated to and held at 1240° C., was then hot rolled at a hot rolling finishing temperature of 860 to 910° C. and a winding temperature of 630 to 670° C., and was made into a hot rolled sheet with a sheet thickness of 3.7 mm. Next, the hot rolled sheet was pickled, was cold rolled after the pickling, and was made into a cold rolled sheet with a sheet thickness of 1.0 mm.

TABLE 1

| | Steel No | C | Si | Mn | P | S | Al | Ti | Nb | B | (mass %) N |
|---|---|---|---|---|---|---|---|---|---|---|---|
| Invention | 1 | 0.0024 | 0.66 | 1.25 | 0.041 | 0.003 | 0.030 | 0.019 | 0.031 | 0.0014 | 0.0022 |
| Example | 2 | 0.0007 | 0.81 | 1.44 | 0.055 | 0.002 | 0.040 | 0.016 | 0.022 | 0.0022 | 0.0024 |
| | 3 | 0.0021 | 0.63 | 1.05 | 0.034 | 0.004 | 0.051 | 0.026 | 0.019 | 0.0009 | 0.0022 |
| | 4 | 0.0021 | 0.65 | 1.36 | 0.010 | 0.002 | 0.055 | 0.015 | 0.015 | 0.0008 | 0.0025 |
| | 5 | 0.0028 | 0.33 | 1.55 | 0.040 | 0.005 | 0.030 | 0.026 | 0.036 | 0.0015 | 0.0036 |
| | 6 | 0.0021 | 0.72 | 1.42 | 0.033 | 0.002 | 0.045 | 0.020 | 0.029 | 0.0015 | 0.0021 |
| | 7 | 0.0014 | 0.91 | 1.22 | 0.018 | 0.003 | 0.034 | 0.013 | 0.039 | 0.0023 | 0.0020 |
| | 8 | 0.0024 | 0.51 | 1.13 | 0.033 | 0.004 | 0.049 | 0.022 | 0.026 | 0.0019 | 0.0012 |
| | 9 | 0.0011 | 0.91 | 0.75 | 0.028 | 0.003 | 0.030 | 0.016 | 0.025 | 0.0011 | 0.0012 |
| | 10 | 0.0031 | 0.78 | 1.42 | 0.016 | 0.003 | 0.150 | 0.024 | 0.034 | 0.0015 | 0.0040 |

TABLE 1-continued

|  | Steel No | C | Si | Mn | P | S | Al | Ti | Nb | B | (mass %) N |
|---|---|---|---|---|---|---|---|---|---|---|---|
|  | 11 | 0.0022 | 0.72 | 1.33 | 0.032 | 0.003 | 0.047 | 0.024 | 0.030 | 0.0013 | 0.0022 |
|  | 12 | 0.0021 | 0.55 | 1.20 | 0.028 | 0.005 | 0.062 | 0.011 | 0.016 | 0.0023 | 0.0020 |
|  | 13 | 0.0013 | 0.70 | 1.52 | 0.010 | 0.002 | 0.053 | 0.021 | 0.038 | 0.0005 | 0.0040 |
|  | 14 | 0.0029 | 0.44 | 2.00 | 0.011 | 0.001 | 0.072 | 0.012 | 0.025 | 0.0028 | 0.0035 |
|  | 15 | 0.0045 | 1.00 | 0.82 | 0.030 | 0.006 | 0.041 | 0.016 | 0.030 | 0.0007 | 0.0036 |
|  | 16 | 0.0035 | 0.66 | 1.35 | 0.011 | 0.004 | 0.035 | 0.029 | 0.030 | 0.0008 | 0.0006 |
|  | 17 | 0.0035 | 0.62 | 1.03 | 0.021 | 0.002 | 0.050 | 0.023 | 0.020 | 0.0006 | 0.0033 |
|  | 18 | 0.0017 | 0.75 | 1.56 | 0.015 | 0.004 | 0.046 | 0.010 | 0.024 | 0.0023 | 0.0022 |
|  | 19 | 0.0033 | 0.50 | 1.12 | 0.031 | 0.002 | 0.049 | 0.015 | 0.016 | 0.0018 | 0.0027 |
|  | 20 | 0.0021 | 0.71 | 0.89 | 0.023 | 0.001 | 0.036 | 0.019 | 0.025 | 0.0014 | 0.0018 |
| Comparative | 21 | <u>0.0068</u> | 0.51 | 1.32 | 0.046 | 0.003 | 0.030 | 0.021 | 0.035 | 0.0020 | 0.0025 |
| Example | 22 | 0.0015 | <u>1.38</u> | 0.72 | 0.050 | 0.002 | 0.044 | 0.010 | 0.019 | 0.0029 | 0.0030 |
|  | 23 | 0.0012 | 0.42 | <u>2.33</u> | 0.033 | 0.004 | 0.065 | 0.022 | 0.022 | 0.0012 | 0.0028 |
|  | 24 | 0.0036 | 0.32 | 0.85 | <u>0.085</u> | 0.005 | 0.025 | 0.024 | 0.021 | 0.0008 | 0.0027 |
|  | 25 | 0.0023 | 0.85 | 1.03 | 0.015 | 0.003 | 0.066 | <u>0.004</u> | 0.033 | 0.0026 | 0.0024 |
|  | 26 | 0.0033 | 0.95 | 0.71 | 0.036 | 0.004 | 0.025 | <u>0.088</u> | 0.032 | 0.0022 | 0.0030 |
|  | 27 | 0.0022 | 0.44 | 1.56 | 0.033 | 0.002 | 0.041 | 0.026 | <u>0.003</u> | 0.0015 | 0.0040 |
|  | 28 | 0.0023 | 0.68 | 1.55 | 0.023 | 0.005 | 0.033 | 0.019 | 0.016 | <u>0.0003</u> | 0.0032 |
|  | 29 | 0.0025 | 0.88 | 1.41 | 0.025 | 0.004 | 0.029 | 0.018 | 0.012 | <u>0.0060</u> | 0.0021 |

The underline means outside the scope of the present invention.

The cold rolled sheet was subjected to cycle annealing of holding at 760 to 820° C. for 60 seconds. Some of the annealed steel sheets were subjected to skin pass rolling with a roll having a large number of convexities, and concavities were formed on the surface of the steel sheet. The steel sheet was degreased and pickled, and was then subjected to Zn-11% Ni alloy plating by the electroplating method. Some steel sheets were subjected to Zn-11-20% Ni alloy plating in an amount of 100 mg/m², and were then held in a state of being immersed in the plating solution as they were (cell cutting); thereby, plated steel sheets with an increased Ni content ratio of the surface were produced. After that, the plated steel sheet was subjected to covering treatment using any of the surface treatment agents shown in Table 2 to Table 5, and was used as a test material. The covering treatment was performed so as to obtain one layer of a covering film 1 or two layers of covering films 1 and 2. The reference sign of the type of the covering films 1 and 2 in Tables 6 to 17 represents covering treatment, and the small letter of c represents trivalent chromate treatment.

Table 2 shows aspects of trivalent chromate treatment. Table 3 shows surface treatment agents (A), and Table 4 shows surface treatment agents (B). Table 5 shows surface treatment agents (C).

TABLE 2

| Trivalent chromate treatment | | | | |
|---|---|---|---|---|
| Reference sign | Category | Components | Cr ratio | Notes |
| a | Application type | $Cr_2O_3 + SiO_2$ | Cr:Si = 5:1 | |
| b | Application type | $Cr_2O_3 + PO_4 + SiO_2$ | Cr:P = 8:1 | |
| c | Electrolysis type | $Cr_2O_3$ | | |

TABLE 3

| | Silicon compound | | | | Phosphoric acid compound | | Zr compound | | Ti compound | |
|---|---|---|---|---|---|---|---|---|---|---|
| Reference sign | Type (a) | (b) | Ratio (a)/(b) | Molecular weight 1500 | Type | Ratio Phosphoric acid compound/ Silicon compound | Type | Ratio Zr compound/ Silicon compound | Type | Ratio Ti compound/ Silicon compound |
| A1 | a1 | b1 | 1.0 | 1500 | c1 | 0.06 | d1 | 0.03 | | |
| A2 | a1 | b1 | 1.0 | 3000 | c1 | 0.06 | | | e1 | 0.05 |
| A3 | a2 | b2 | 1.0 | 3000 | c1 | 0.07 | | | e1 | 0.05 |

TABLE 3-continued

| | | V compound | | | Co compound | | |
|---|---|---|---|---|---|---|---|
| Reference sign | Type | Ratio Vcompound/ Silicon compound | Ratio V compound/ Zr compound | Ratio V compound/ Ti compound | Type | Ratio Co compound/ Silicon compound | Notes |
| A1 | f1 | 0.07 | 2.3 | | | | Invention Example |
| A2 | f1 | 0.12 | | 2.4 | | | Invention Example |
| A3 | f1 | 0.07 | | 1.4 | g1 | 0.04 | Invention Example | a1: 3-aminopropyltrimethoxysilane
a2: 3-aminopropyltriethoxysilane
b1: 3-glycidoxypropyltrimethoxysilane
b2: 3-glycidoxypropyltriethoxysilane
c1: phosphoric acid
d1: ammonium hexafluorozirconate
e1: ammonium hexafluorotitanate
f1: vanadium oxysulfate

TABLE 4

Surface treatment agent composition B; numerical values in "( )" are by mass % relative to the total solid content in the treatment agent

| Reference sign | Resin 1 (polyurethane resin) | Resin 2 | Amount of urethane groups + urea groups in resin (nitrogen-equivalent mass %) | Additive 1 | Additive 2 |
|---|---|---|---|---|---|
| B1 | Polyurethane resin (72) | — | 3.3 | Diammonium hydrogen phosphate (3) | Colloidal silica (20) |
| B2 | Polyurethane resin (34) | Epoxy resin (34) | 1.7 | Triammonium phosphate (2) + disodium hydrogen phosphate (1) | Colloidal silica (20) |
| B3 | Polyurethane resin (34) | Polyolefin resin (34) | 1.7 | Triammonium phosphate (2) + disodium hydrogen phosphate (1) | Colloidal silica (20) |
| B4 | Polyurethane resin (34) | Acrylic resin (34) | 1.7 | Triammonium phosphate (2) + disodium hydrogen phosphate (1) | Colloidal silica (20) |

| Reference sign | Additive 3 | Additive 4 | Amount of Si compounds in covering film (Si-equivalent mass %) | Notes |
|---|---|---|---|---|
| B1 | Titanium compound (5) | — | 10.1 | Present Invention Example |
| B2 | Titanium compound (8) | Polyethylene (1) | 9.7 | |
| B3 | Titanium compound (8) | Polyethylene (1) | 9.7 | |
| B4 | Titanium compound (8) | Polyethylene (1) | 9.7 | |

The content of the additive in Table 4 is as follows.
Colloidal silica: SNOWTEX NX (produced by Nissan Chemical Industries, Ltd.)
Titanium compound: ORGATIX TC-400(produced by Matsumoto Pharmaceutical Industry Co., Ltd)

TABLE 5

Surface treatment agent composition C; Numerical values in "( )" are by mass % relative to the total solid content in the treatment agent

| | Resin 1(main resin) | | Resin 2 (hardening agent) | | Resin 3 | |
|---|---|---|---|---|---|---|
| Reference sign | Type | Solid content concentration in treatment agent (weight %) | Type | Solid content concentration in treatment agent (weight %) | Type | Solid content concentration in treatment agent (weight %) |
| C1 | Epoxy resin A | 20 | Hexamethylene diisocyanate A | 8 | Polyethylene resin | 2 |
| C2 | Epoxy resin A | 20 | Hexamethylene diisocyanate B | 8 | Polyethylene resin | 2 |

TABLE 5-continued

Surface treatment agent composition C; Numerical values in "( )" are by mass % relative to the total solid content in the treatment agent

| C3 | Epoxy resin A | 19 | Hexamethylene diisocyanate A | 7 | Polytetrafluoroethylene resin | 2 |

| | Additive 1 (fumed silica) | | | | |
|---|---|---|---|---|---|
| | | Solid content | Organic solvent | | |
| Reference sign | Type | concentration in treatment agent (weight %) | Type | Concentration in treatment agent (weight %) | Notes |
| C1 | Fumed silica A | 10 | Cyclohexanone | 60 | Present |
| C2 | Fumed silica A | 10 | Cyclohexanone | 60 | Invention |
| C3 | Fumed silica A | 12 | Cyclohexanone | 60 | Example |

The content of each compound in Table 5 is as follows.
Epoxy resin A: bisphenol-type epoxy resin, molecular weight: 3000
Hexamethylene diisocyanate A: ethyl acetoacetate-blocked hexamethylene diisocyanate
Hexamethylene diisocyanate B: ε-caprolactam-blocked hexamethylene diisocyanate
Fumed silica A: AEROSIL 300 (particle size: 8 μm)

Next, the corrosion resistance, press processability, weldability, secondary processability, and coatability of the test material were evaluated. When performing a press molding test and a weldability test, the tests were performed in a state where lubricant antirust oil was applied.

(1) Evaluation of Corrosion Resistance 1

Corrosion resistance to gasoline was evaluated. A test liquid was put into a sample that had been subjected to flat-bottomed cylindrical deep drawing with a flange width of 20 mm, a diameter of 50 mm, and a depth of 25 mm by a hydraulic molding test machine, and the sample was closed with glass via a silicon rubber ring. The corrosion condition after this test was observed visually.

(Test Conditions)

Test liquid: gasoline+10% distilled water+100 ppm formic acid

Test period: allowed to stand at 40° C. for three months (Evaluation Criteria)

4: no change occurred

3: white rust occurred at less than or equal to 0.1%

2: red rust occurred at less than or equal to 5%, or white rust occurred at 0.1 to 50%

1: red rust occurred at more than 5%, or white rust occurred significantly (2) Evaluation of Corrosion Resistance 2

A salt spray test was performed as an accelerated test simulating the outer surface side, and corrosion resistance to salt water was evaluated. A 70×150 mm test piece was tested in accordance with JIS Z 2371, and evaluation was made by the incidence of rust after 5% salt water was sprayed for 120 hours.

(Evaluation Criteria)

4: rust occurred at less than 3%

3: rust occurred at more than or equal to 3% and less than 10%

2: rust occurred at more than or equal to 10% and less than 30%

1: rust occurred at more than or equal to 30%

(3) Evaluation of Press Processability

A molding test of a drawing ratio of 2.2 was performed by a hydraulic molding test machine using a cylindrical punch with a diameter of 50 mm. Moldability was evaluated, with the blank holder pressure set to 1000 kg.

(Evaluation Criteria)

4: molding was possible, and the plating layer did not have a defect

3: molding was possible, and the plating layer was slightly flawed

2: molding was possible, and the plating layer experienced peeling-off

1: molding was impossible (4) Evaluation of Weldability

For weldability, spot welding consecutive spot weldability and seam weldability were evaluated.

(Spot Welding Consecutive Spot Weldability)

Spot welding was performed using an electrode with a diameter of 6 mm, at a welding current of 10 kA, at a welding pressure of 200 kg, and for a welding time of 12 cycles; and evaluation was made by the number of consecutive spot welds up to the time point when the nugget diameter became less than $4\sqrt{t}$.

(Evaluation Criteria)

5: the number of consecutive spot welds was more than or equal to 1500

4: the number of consecutive spot welds was more than or equal to 1000 and less than 1500

3: the number of consecutive spot welds was more than or equal to 500 and less than 1000

2: the number of consecutive spot welds was more than or equal to 250 and less than 500

1: the number of consecutive spot welds was less than 250

(Seam Weldability)

Figure 5:
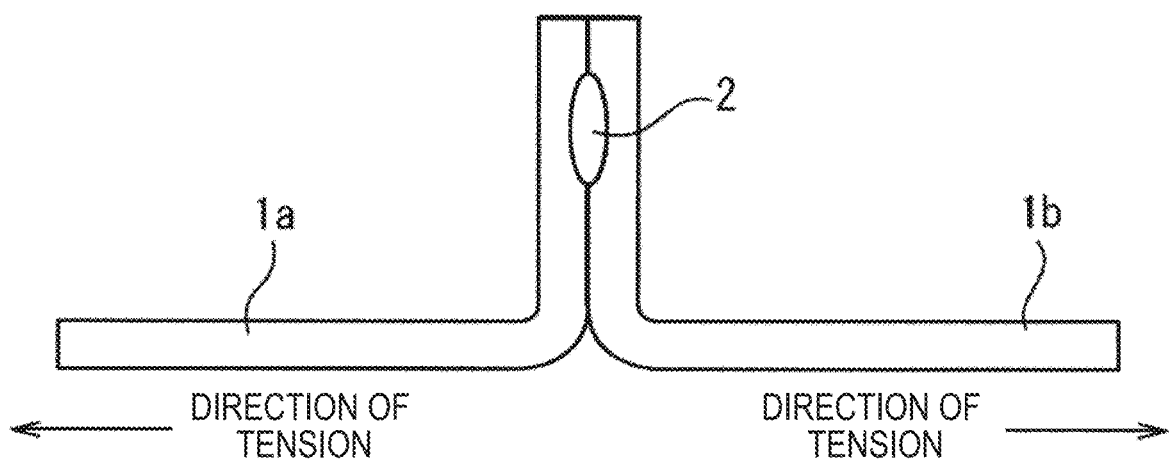
FIG. 5 is a diagram showing a shape of a test piece for testing a seam weld.

Seam welding was performed using an electrode wheel with a curvature radius of 6 mm and a diameter of 250 mm, at a welding current of 13 kA, at a welding pressure of 400 kg, and with energization of 2 on-2 off, and bending processing was performed to form a flange portion; thus, the test piece shown in FIG. 5 was produced. Horizontal portions 1a and 1b of the test piece were fixed with a chuck, and a tensile test was performed at a speed of 200 mm/minute at various temperatures; a fracture surface after breaking was investigated, and a temperature at which the brittle fracture surface and the ductile fracture surface were 50%-50% was found as a ductile-brittle transition temperature. Ductile-brittle transition temperatures of less than or equal to −40° C. were classified as passed (passing=a grade of 5, failure=a grade of 1).

(5) Evaluation of Secondary Processing Brittleness Resistance

The test material was blanked into a diameter of 95 mm, then cylindrical drawing was performed using a punch with an outer diameter of 50 mm, the drawn cup was mounted on a truncated cone of 30°, and a 5-kg weight was dropped from a position at a height of 1 m under various temperature conditions; and the lowest temperature among temperatures at which a crack did not occur in the cup (secondary processing brittleness resistance temperature) was found.

The secondary processing brittleness resistance temperature varies with the sheet thickness of the steel sheet and the test method; in the case where the sheet thickness of the cold rolled steel sheet was 1.2 mm, temperatures of less than or equal to −50° C. were classified as passed (passing=a grade of 5, failure=a grade of 1).

(6) Evaluation of Coatability

A melamine-alkyd-based coating material was applied by bar coating and baked at 120° C. for 20 minutes so that the film thickness after baking and drying might be 25 μm, and was then cut into 1-mm grid squares; and the evaluation of adhesiveness was made by the ratio of the number of remaining squares (the number of remaining squares/the number of cut squares: 100).

(Evaluation Criteria)
4: 100%
3: more than or equal to 95%
2: more than or equal to 90% and less than 95%
1: less than 90%

The results of the above evaluations are shown in Tables 6 to 8 (Examples of the present invention) and Table 9 (Comparative Examples), Tables 10 to 12 (Examples of the present invention) and Table 13 (Comparative Examples), and Tables 14 to 16 (Examples of the present invention) and Table 17 (Comparative Examples). In Tables 6 to 8 (Examples of the present invention) and Table 9 (Comparative Examples), the steel composition and the prescriptions of the number of concavities of 50 to 1000/mm² and the area ratio to the surface area of the surface-treated steel sheet of 20 to 80% are shown by comparison. In Tables 10 to 12 (Examples of the present invention) and Table 13 (Comparative Examples), the steel composition and the prescription of the range of $1.0 \times 10^4$ to $1.0 \times 10^6$ in terms of the outer layer form indicator Z defined by Formula (a) are shown by comparison. In Tables 14 to 16 (Examples of the present invention) and Table 17 (Comparative Examples), the steel composition and the prescriptions of the arithmetic average roughness (Ra) in a rectangular area with four 5-μm sides of 5 to 200 nm and the maximum cross-sectional height (Rt) of a roughness curve of 100 to 1000 nm are shown by comparison.

TABLE 6

| No | Underlying steel sheet | Number of concavities (concavities/mm²)✻ Front | Number of concavities (concavities/mm²)✻ Back | Area of concavities (%)✻ Front | Area of concavities (%)✻ Back | Plating Type | Plating Adhesion amount (g/m²) | Plating Percentage of outer layer Ni (%)✻2 | Covering film 1 Type | Covering film 1 Adhesion amount (mg/m²) | Covering film 1 Baking temperature (° C.) |
|---|---|---|---|---|---|---|---|---|---|---|---|
| Example 1 | 1 | 561 | 660 | 55 | 60 | Zn—11Ni | 3 | 130 | c | 3 | — |
| Example 2 | 2 | 495 | 582 | 45 | 56 | Zn—11Ni | 5 | 130 | c | 10 | — |
| Example 3 | 3 | 486 | 464 | 54 | 58 | Zn—11Ni | 10 | 120 | c | 30 | — |
| Example 4 | 4 | 585 | 560 | 65 | 70 | Zn—11Ni | 20 | 120 | c | 30 | — |
| Example 5 | 5 | 608 | 641 | 64 | 72 | Zn—11Ni | 20 | 120 | c | 30 | — |
| Example 6 | 6 | 745 | 980 | 73 | 80 | Zn—11Ni | 20 | 120 | c | 30 | — |
| Example 7 | 7 | 150 | 236 | 36 | 45 | Zn—11Ni | 20 | 120 | c | 30 | — |
| Example 8 | 8 | 504 | 472 | 56 | 59 | Zn—11Ni | 20 | 120 | c | 30 | — |
| Example 9 | 9 | 328 | 521 | 44 | 54 | Zn—11Ni | 20 | 120 | c | 30 | — |
| Example 10 | 10 | 608 | 587 | 64 | 66 | Zn—11Ni | 20 | 120 | c | 30 | — |
| Example 11 | 11 | 561 | 605 | 55 | 55 | Zn—11Ni | 20 | 120 | c | 30 | — |
| Example 12 | 12 | 561 | 562 | 51 | 54 | Zn—11Ni | 20 | 120 | c | 30 | — |
| Example 13 | 13 | 477 | 448 | 53 | 56 | Zn—11Ni | 20 | 120 | c | 30 | — |
| Example 14 | 14 | 636 | 667 | 53 | 58 | Zn—11Ni | 20 | 120 | c | 30 | — |
| Example 15 | 15 | 580 | 596 | 61 | 67 | Zn—11Ni | 20 | 120 | c | 30 | — |
| Example 16 | 16 | 602 | 670 | 59 | 70 | Zn—11Ni | 20 | 120 | c | 30 | — |
| Example 17 | 17 | 240 | 237 | 40 | 42 | Zn—11Ni | 20 | 120 | c | 30 | — |
| Example 18 | 18 | 540 | 496 | 60 | 62 | Zn—11Ni | 20 | 120 | c | 30 | — |
| Example 19 | 19 | 600 | 644 | 50 | 56 | Zn—11Ni | 20 | 120 | c | 30 | — |
| Example 20 | 20 | 456 | 436 | 48 | 49 | Zn—11Ni | 20 | 120 | c | 30 | — |
| Example 21 | 1 | 126 | 185 | 32 | 35 | Zn—11Ni | 20 | 100 | c | 30 | — |
| Example 22 | 1 | 858 | 880 | 78 | 75 | Zn—11Ni | 20 | 100 | c | 30 | — |

| No | Covering film 2 Type | Covering film 2 Covering thickness (μm) | Covering film 2 Baking temperature (° C.) | Covering film performance Corrosion resistance 1 (gasoline resistance) | Covering film performance Corrosion resistance 2 (salt water resistance) | Press process-ability | Weld-ability (spot) | Weld-ability (seam) | Secondary processing brittleness resistance | Coat-ability |
|---|---|---|---|---|---|---|---|---|---|---|
| Example 1 | B2 | 1.0 | 150 | 3 | 3 | 4 | 4 | 5 | 5 | 4 |
| Example 2 | B2 | 1.0 | 150 | 3 | 3 | 4 | 4 | 5 | 5 | 4 |
| Example 3 | B2 | 1.0 | 150 | 4 | 4 | 4 | 3 | 5 | 5 | 4 |
| Example 4 | B1 | 1.0 | 150 | 4 | 4 | 4 | 3 | 5 | 5 | 4 |
| Example 5 | B2 | 1.0 | 150 | 4 | 4 | 4 | 3 | 5 | 5 | 4 |

TABLE 6-continued

| | | | | | | | | | | |
|---|---|---|---|---|---|---|---|---|---|---|
| Example 6 | B3 | 1.0 | 150 | 4 | 4 | 3 | 3 | 5 | 5 | 4 |
| Example 7 | B4 | 1.0 | 150 | 4 | 4 | 3 | 3 | 5 | 5 | 4 |
| Example 8 | B2 | 1.0 | 150 | 4 | 4 | 4 | 3 | 5 | 5 | 4 |
| Example 9 | B2 | 1.0 | 150 | 3 | 3 | 4 | 3 | 5 | 5 | 3 |
| Example 10 | B2 | 1.0 | 150 | 3 | 3 | 4 | 3 | 5 | 5 | 3 |
| Example 11 | B2 | 1.0 | 150 | 4 | 4 | 4 | 3 | 5 | 5 | 4 |
| Example 12 | B2 | 1.0 | 150 | 4 | 4 | 4 | 3 | 5 | 5 | 4 |
| Example 13 | B2 | 1.0 | 150 | 4 | 4 | 3 | 3 | 5 | 5 | 4 |
| Example 14 | B2 | 1.0 | 150 | 4 | 4 | 3 | 3 | 5 | 5 | 4 |
| Example 15 | B2 | 1.0 | 150 | 4 | 4 | 3 | 3 | 5 | 5 | 4 |
| Example 16 | B2 | 1.0 | 150 | 4 | 4 | 3 | 3 | 5 | 5 | 4 |
| Example 17 | B2 | 1.0 | 150 | 4 | 4 | 3 | 3 | 5 | 5 | 4 |
| Example 18 | B2 | 1.0 | 150 | 4 | 4 | 3 | 3 | 5 | 5 | 4 |
| Example 19 | B2 | 1.0 | 150 | 4 | 4 | 3 | 3 | 5 | 5 | 4 |
| Example 20 | B2 | 1.0 | 150 | 4 | 4 | 4 | 3 | 5 | 5 | 4 |
| Example 21 | B2 | 1.0 | 150 | 3 | 3 | 3 | 3 | 5 | 5 | 4 |
| Example 22 | B2 | 1.0 | 150 | 3 | 3 | 3 | 3 | 5 | 5 | 4 |

※The number and area of concavities of the surface of the surface-treated steel sheet were measured by image analysis using a laser microscope.

※2The content amount of Ni of the outer layer was found from the area ratio between Zn and Ni in an area of $1/10$ of the outer layer of a profile measured by glow discharge optical emission spectrometry.

TABLE 7

| No | Underlying steel sheet | Number of concavities (concavities/mm²)※ Front | Number of concavities (concavities/mm²)※ Back | Area of concavities (%)※ Front | Area of concavities (%)※ Back | Plating Type | Plating Adhesion amount (g/m²) | Plating Percentage of outer layer Ni (%)※2 | Covering film 1 (Compositions of Table 2 and Table 3) Type | Covering film 1 Adhesion amount (mg/m²) | Covering film 1 Baking temperature (° C.) |
|---|---|---|---|---|---|---|---|---|---|---|---|
| Example 23 | 1 | 561 | 660 | 55 | 60 | Zn—11Ni | 30 | 120 | c | 100 | — |
| Example 24 | 1 | 561 | 660 | 55 | 60 | Zn—11Ni | 50 | 120 | c | 200 | — |
| Example 25 | 1 | 561 | 660 | 55 | 60 | Zn—11Ni | 20 | 120 | a | 30 | 80 |
| Example 26 | 1 | 561 | 660 | 55 | 60 | Zn—11Ni | 20 | 120 | b | 30 | 80 |
| Example 27 | 4 | 585 | 560 | 65 | 70 | Zn—11Ni | 20 | 130 | c | 30 | — |
| Example 28 | 4 | 585 | 560 | 65 | 70 | Zn—11Ni | 20 | 200 | c | 30 | — |
| Example 29 | 4 | 156 | 191 | 38 | 34 | Zn—11Ni | 20 | 120 | c | 30 | — |
| Example 30 | 4 | 765 | 741 | 70 | 72 | Zn—11Ni | 20 | 120 | c | 30 | — |
| Example 31 | 1 | 561 | 660 | 55 | 60 | Zn—11Ni | 20 | 120 | c | 30 | — |
| Example 32 | 1 | 561 | 660 | 55 | 60 | Zn—11Ni | 20 | 120 | c | 30 | — |
| Example 33 | 1 | 561 | 660 | 55 | 60 | Zn—11Ni | 20 | 120 | c | 30 | — |
| Example 34 | 1 | 561 | 660 | 55 | 60 | Zn—11Ni | 20 | 120 | c | 30 | — |
| Example 35 | 1 | 561 | 660 | 55 | 60 | Zn—11Ni | 20 | 120 | c | 30 | — |
| Example 36 | 1 | 561 | 660 | 55 | 60 | Zn—11Ni | 3 | 130 | c | 3 | — |
| Example 37 | 2 | 396 | 582 | 45 | 56 | Zn—11Ni | 5 | 130 | c | 10 | — |
| Example 38 | 3 | 486 | 464 | 54 | 58 | Zn—11Ni | 10 | 120 | c | 30 | — |
| Example 39 | 4 | 585 | 560 | 65 | 70 | Zn—11Ni | 20 | 120 | c | 30 | — |
| Example 40 | 5 | 608 | 641 | 64 | 72 | Zn—11Ni | 20 | 120 | c | 30 | — |
| Example 41 | 6 | 745 | 880 | 73 | 80 | Zn—11Ni | 20 | 120 | c | 30 | — |
| Example 42 | 7 | 396 | 468 | 36 | 45 | Zn—11Ni | 20 | 120 | c | 30 | — |
| Example 43 | 8 | 504 | 472 | 56 | 59 | Zn—11Ni | 20 | 120 | c | 30 | — |
| Example 44 | 9 | 328 | 621 | 44 | 54 | Zn—11Ni | 20 | 120 | c | 30 | — |

| No | Covering film 2 (Compositions of Table 4 and Table 5) Type | Covering film 2 Covering thickness (μm) | Covering film 2 Baking temperature (° C.) | Covering film performance Corrosion resistance 1 (gasoline resistance) | Covering film performance Corrosion resistance 2 (salt water resistance) | Press processability | Weldability (spot) | Weldability (seam) | Secondary processing brittlensss resistance | Coatability |
|---|---|---|---|---|---|---|---|---|---|---|
| Example 23 | B2 | 1.0 | 150 | 4 | 4 | 4 | 3 | 5 | 5 | 4 |
| Example 24 | B2 | 1.0 | 150 | 4 | 4 | 4 | 3 | 5 | 5 | 4 |
| Example 25 | B2 | 1.0 | 150 | 4 | 4 | 4 | 3 | 5 | 5 | 4 |
| Example 26 | B2 | 1.0 | 150 | 4 | 4 | 4 | 3 | 5 | 5 | 4 |
| Example 27 | B2 | 1.0 | 150 | 3 | 3 | 4 | 3 | 5 | 5 | 4 |
| Example 28 | B2 | 1.0 | 150 | 3 | 3 | 4 | 3 | 5 | 5 | 4 |
| Example 29 | B2 | 1.0 | 150 | 4 | 4 | 3 | 3 | 5 | 5 | 4 |
| Example 30 | B2 | 1.0 | 150 | 4 | 4 | 3 | 3 | 5 | 5 | 3 |
| Example 31 | B2 | 0.5 | 150 | 3 | 3 | 3 | 4 | 5 | 5 | 4 |
| Example 32 | B2 | 1.5 | 150 | 4 | 4 | 3 | 3 | 5 | 5 | 4 |
| Example 33 | B2 | 2.0 | 150 | 4 | 4 | 3 | 3 | 5 | 5 | 4 |
| Example 34 | B3 | 1.0 | 120 | 4 | 4 | 4 | 3 | 5 | 5 | 3 |
| Example 35 | B4 | 1.0 | 200 | 4 | 4 | 3 | 3 | 5 | 5 | 3 |

TABLE 7-continued

| | | | | | | | | | | |
|---|---|---|---|---|---|---|---|---|---|---|
| Example 36 | C2 | 1.0 | 160 | 3 | 3 | 4 | 4 | 5 | 5 | 4 |
| Example 37 | C2 | 1.0 | 160 | 3 | 3 | 4 | 4 | 5 | 5 | 4 |
| Example 38 | C2 | 1.0 | 160 | 4 | 4 | 4 | 3 | 5 | 5 | 4 |
| Example 39 | C1 | 1.0 | 160 | 4 | 4 | 4 | 3 | 5 | 5 | 4 |
| Example 40 | C2 | 1.0 | 160 | 4 | 4 | 3 | 3 | 5 | 5 | 4 |
| Example 41 | C3 | 1.0 | 160 | 4 | 4 | 3 | 3 | 5 | 5 | 4 |
| Example 42 | C2 | 1.0 | 160 | 4 | 4 | 3 | 3 | 5 | 5 | 4 |
| Example 43 | C2 | 1.0 | 160 | 4 | 4 | 4 | 3 | 5 | 5 | 4 |
| Example 44 | C2 | 1.0 | 160 | 3 | 3 | 4 | 3 | 5 | 5 | 3 |

※The number and area of concavities of the surface of the surface-treated steel sheet were measured by image analysis using a laser microscope.

※2The content amount of Ni of the outer layer was found from the area ratio between Zn and Ni in an area of 1/10 of the outer layer of a profile measured by glow discharge optical emission spectrometry.

TABLE 8

| | | | | | | Plating | | | Covering film 1 (Compositions of Table 2 and Table 3) | |
|---|---|---|---|---|---|---|---|---|---|---|
| | Underlying steel | Number of concavities (concavities/mm²)※ | | Area of concavities (%)※ | | | Adhesion amount | Percentage of outer layer Ni | Adhesion amount | Baking temperature |
| No | sheet | Front | Back | Front | Back | Type | (g/m²) | (%)※2 | Type | (mg/m²) | (° C.) |
| Example 45 | 10 | 608 | 587 | 64 | 66 | Zn—11Ni | 20 | 120 | c | 30 | — |
| Example 46 | 11 | 561 | 605 | 55 | 55 | Zn—11Ni | 20 | 120 | c | 30 | — |
| Example 47 | 12 | 561 | 562 | 51 | 54 | Zn—11Ni | 20 | 120 | c | 30 | — |
| Example 48 | 13 | 477 | 448 | 53 | 56 | Zn—11Ni | 20 | 120 | c | 30 | — |
| Example 49 | 14 | 636 | 667 | 53 | 58 | Zn—11Ni | 20 | 120 | c | 30 | — |
| Example 50 | 15 | 580 | 596 | 61 | 67 | Zn—11Ni | 20 | 120 | c | 30 | — |
| Example 51 | 16 | 602 | 670 | 59 | 70 | Zn—11Ni | 20 | 120 | c | 30 | — |
| Example 52 | 17 | 407 | 437 | 37 | 42 | Zn—11Ni | 20 | 120 | c | 30 | — |
| Example 53 | 18 | 540 | 496 | 60 | 62 | Zn—11Ni | 20 | 120 | c | 30 | — |
| Example 54 | 19 | 600 | 644 | 50 | 56 | Zn—11Ni | 20 | 120 | c | 30 | — |
| Example 55 | 20 | 456 | 436 | 48 | 49 | Zn—11Ni | 20 | 120 | c | 30 | — |
| Example 56 | 1 | 561 | 660 | 55 | 60 | Zn—11Ni | 20 | 120 | c | 30 | — |
| Example 57 | 4 | 585 | 560 | 65 | 70 | Zn—11Ni | 20 | 120 | c | 30 | — |
| Example 58 | 1 | 561 | 660 | 55 | 60 | Zn—11Ni | 20 | 120 | A1 | 450 | 120 |
| Example 59 | 1 | 561 | 660 | 55 | 60 | Zn—11Ni | 20 | 120 | A2 | 450 | 120 |
| Example 60 | 1 | 561 | 660 | 55 | 60 | Zn—11Ni | 20 | 120 | A3 | 450 | 120 |
| Example 61 | 1 | 561 | 660 | 55 | 60 | Zn—11Ni | 20 | 120 | c | 30 | — |
| Example 62 | 1 | 561 | 660 | 55 | 60 | Zn—11Ni | 20 | 120 | c | 30 | — |
| Example 63 | 1 | 561 | 660 | 55 | 60 | Zn—11Ni | 20 | 120 | A1 | 450 | 120 |
| Example 64 | 1 | 561 | 660 | 55 | 60 | Zn—11Ni | 20 | 120 | A2 | 450 | 120 |
| Example 65 | 1 | 561 | 660 | 55 | 60 | Zn—11Ni | 20 | 120 | A3 | 450 | 120 |

| | Covering film 2 (Compositions of Table 4 and Table 5) | | | Covering film performance | | | | | | |
|---|---|---|---|---|---|---|---|---|---|---|
| No | Type | Covering thickness (μm) | Baking temperature (° C.) | Corrosion resistance 1 (gasoline resistance) | Corrosion resistance 2 (salt water resistance) | Press process-ability | Weld-ability (spot) | Weld-ability (seam) | Secondary processing brittleness resistance | Coat-ability |
| Example 45 | C2 | 1.0 | 160 | 3 | 3 | 4 | 3 | 5 | 5 | 3 |
| Example 46 | C2 | 1.0 | 160 | 4 | 4 | 4 | 3 | 5 | 5 | 4 |
| Example 47 | C2 | 1.0 | 160 | 4 | 4 | 4 | 3 | 5 | 5 | 4 |
| Example 48 | C2 | 1.0 | 160 | 4 | 4 | 4 | 3 | 5 | 5 | 4 |
| Example 49 | C2 | 1.0 | 160 | 4 | 4 | 4 | 3 | 5 | 5 | 4 |
| Example 50 | C2 | 1.0 | 160 | 4 | 4 | 4 | 3 | 5 | 5 | 4 |
| Example 51 | C2 | 1.0 | 160 | 4 | 4 | 4 | 3 | 5 | 5 | 4 |
| Example 52 | C2 | 1.0 | 160 | 4 | 4 | 3 | 3 | 5 | 5 | 4 |
| Example 53 | C2 | 1.0 | 160 | 4 | 4 | 4 | 3 | 5 | 5 | 4 |
| Example 54 | C2 | 1.0 | 160 | 4 | 4 | 4 | 3 | 5 | 5 | 4 |
| Example 55 | C2 | 1.0 | 160 | 4 | 4 | 4 | 3 | 5 | 5 | 4 |
| Example 56 | — | — | — | 3 | 3 | 3 | 3 | 5 | 5 | 4 |
| Example 57 | — | — | — | 3 | 3 | 3 | 3 | 5 | 5 | 4 |
| Example 58 | — | — | — | 4 | 3 | 3 | 3 | 5 | 5 | 4 |
| Example 59 | — | — | — | 4 | 3 | 3 | 3 | 5 | 5 | 4 |
| Example 60 | — | — | — | 3 | 3 | 3 | 3 | 5 | 5 | 4 |
| Example 61 | B2 | 1.0 | 150 | 4 | 4 | 4 | 3 | 5 | 5 | 4 |
| Example 62 | B2 | 1.0 | 150 | 4 | 4 | 4 | 3 | 5 | 5 | 4 |
| Example 63 | B2 | 1.0 | 150 | 4 | 4 | 4 | 3 | 5 | 5 | 4 |

TABLE 8-continued

| | | | | | | | | | | |
|---|---|---|---|---|---|---|---|---|---|---|
| Example 64 | B2 | 1.0 | 150 | 4 | 4 | 4 | 3 | 5 | 5 | 4 |
| Example 65 | B2 | 1.0 | 150 | 4 | 4 | 4 | 3 | 5 | 5 | 4 |

※The number and area of concavities of the surface of the surface-treated steel sheet were measured by image analysis using a laser microscope.

※2 The content amount of Ni of the outer layer was found from the area ratio between Zn and Ni in an area of 1/10 of the outer layer of a profile measured by glow discharge optical emission spectrometry.

TABLE 9

| | | Number of concavities (concavities/mm²)※ | | Area of concavities (%)※ | | Plating | | | Covering film 1 (Compositions of Table 2 and Table 3) | |
|---|---|---|---|---|---|---|---|---|---|---|
| | Underlying steel | | | | | | Adhesion amount | Percentage of outer layer Ni | Adhesion amount | Baking temperature |
| No | sheet | Front | Back | Front | Back | Type | (g/m²) | (%)※2 | Type | (mg/m²) | (° C.) |
| Comparative Example 1 | 21 | 479 | 594 | 47 | 54 | Zn—11Ni | 20 | 120 | c | 30 | — |
| Comparative Example 2 | 22 | 715 | 686 | 65 | 66 | Zn—11Ni | 20 | 120 | c | 30 | — |
| Comparative Example 3 | 23 | 540 | 544 | 60 | 68 | Zn—11Ni | 20 | 120 | c | 30 | — |
| Comparative Example 4 | 24 | 540 | 575 | 45 | 50 | Zn—11Ni | 20 | 120 | c | 30 | — |
| Comparative Example 5 | 25 | 570 | 579 | 60 | 65 | Zn—11Ni | 20 | 120 | c | 30 | — |
| Comparative Example 6 | 26 | 571 | 638 | 56 | 58 | Zn—11Ni | 20 | 120 | c | 30 | — |
| Comparative Example 7 | 27 | 649 | 686 | 59 | 66 | Zn—11Ni | 20 | 120 | c | 30 | — |
| Comparative Example 8 | 28 | 585 | 536 | 65 | 67 | Zn—11Ni | 20 | 120 | c | 30 | — |
| Comparative Example 9 | 29 | 780 | 748 | 65 | 65 | Zn—11Ni | 20 | 120 | c | 30 | — |
| Comparative Example 10 | 1 | 90 | 88 | 20 | 25 | Zn—11Ni | 20 | 120 | c | 30 | — |
| Comparative Example 11 | 1 | 1148 | 1189 | 89 | 90 | Zn—11Ni | 20 | 120 | c | 30 | — |

| | | Covering film 2 (Compositions of Table 4 and Table 5) | | | Covering film performance | | | | | | |
|---|---|---|---|---|---|---|---|---|---|---|---|
| | | | | | Corrosion resistance 1 | Corrosion resistance 2 | | | | Secondary | |
| No | Type | Covering thickness (μm) | Baking temperature (° C.) | | (gasoline resistance) | (salt water resistance) | Press process-ability | Weld-ability (spot) | Weld-ability (seam) | processing brittleness resistance | Coat-ability |
| Comparative Example 1 | B2 | 1.0 | 150 | | 3 | 3 | 2 | 3 | 1 | 5 | 3 |
| Comparative Example 2 | B2 | 1.0 | 150 | | 1 | 1 | 2 | 3 | 1 | 5 | 2 |
| Comparative Example 3 | B2 | 1.0 | 150 | | 3 | 3 | 2 | 3 | 1 | 5 | 3 |
| Comparative Example 4 | B2 | 1.0 | 150 | | 4 | 3 | 2 | 3 | 1 | 1 | 3 |
| Comparative Example 5 | B2 | 1.0 | 150 | | 4 | 3 | 2 | 3 | 5 | 5 | 3 |
| Comparative Example 6 | B2 | 1.0 | 150 | | 4 | 3 | 3 | 3 | 1 | 5 | 3 |
| Comparative Example 7 | B2 | 1.0 | 150 | | 4 | 3 | 2 | 3 | 5 | 5 | 3 |
| Comparative Example 8 | B2 | 1.0 | 150 | | 4 | 3 | 3 | 3 | 5 | 1 | 3 |
| Comparative Example 9 | B2 | 1.0 | 150 | | 4 | 3 | 2 | 3 | 5 | 1 | 3 |
| Comparative Example 10 | — | — | — | | 3 | 3 | 2 | 3 | 5 | 5 | 4 |
| Comparative Example 11 | — | — | — | | 3 | 3 | 2 | 3 | 5 | 5 | 4 |

※The number and area of concavities of the surface of the surface-treated steel sheet were measured by image analysis using a laser microscope.

※2 The content amount of Ni of the outer layer was found from the area ratio between Zn and Ni in an area of 1/10 of the outer layer of a profile measured by glow discharge optical emission spectrometry.

TABLE 10

| No | Underlying steel sheet | Outer layer form indicator Z ($\times 10^5$ μm$^3$/mm$^2$) ※1 Front | Outer layer form indicator Z ($\times 10^5$ μm$^3$/mm$^2$) ※1 Back | Plating Type | Plating Adhesion amount (g/m$^2$) | Percentage of outer layer Ni (%)※2 | Covering film 1 (Compositions of Table 2 and Table 3) Type | Covering film 1 Adhesion amount (mg/m$^2$) | Covering film 1 Baking temperature (° C.) |
|---|---|---|---|---|---|---|---|---|---|
| Example 1 | 1 | 1.31 | 1.88 | Zn—11Ni | 3 | 130 | c | 3 | — |
| Example 2 | 2 | 1.06 | 1.17 | Zn—11Ni | 5 | 130 | c | 10 | — |
| Example 3 | 3 | 0.68 | 0.54 | Zn—11Ni | 10 | 120 | c | 30 | — |
| Example 4 | 4 | 1.21 | 1.10 | Zn—11Ni | 20 | 120 | c | 30 | — |
| Example 5 | 5 | 1.56 | 1.71 | Zn—11Ni | 20 | 120 | c | 30 | — |
| Example 6 | 6 | 3.12 | 6.08 | Zn—11Ni | 20 | 120 | c | 30 | — |
| Example 7 | 7 | 0.12 | 0.18 | Zn—11Ni | 20 | 120 | c | 30 | — |
| Example 8 | 8 | 1.33 | 1.26 | Zn—11Ni | 20 | 120 | c | 30 | — |
| Example 9 | 9 | 0.21 | 1.22 | Zn—11Ni | 20 | 120 | c | 30 | — |
| Example 10 | 10 | 1.67 | 1.58 | Zn—11Ni | 20 | 120 | c | 30 | — |
| Example 11 | 11 | 1.23 | 1.54 | Zn—11Ni | 20 | 120 | c | 30 | — |
| Example 12 | 12 | 1.22 | 1.37 | Zn—11Ni | 20 | 120 | c | 30 | — |
| Example 13 | 13 | 0.85 | 0.56 | Zn—11Ni | 20 | 120 | c | 30 | — |
| Example 14 | 14 | 1.33 | 1.75 | Zn—11Ni | 20 | 120 | c | 30 | — |
| Example 15 | 15 | 1.59 | 1.77 | Zn—11Ni | 20 | 120 | c | 30 | — |
| Example 16 | 16 | 1.81 | 1.99 | Zn—11Ni | 20 | 120 | c | 30 | — |
| Example 17 | 17 | 0.17 | 0.16 | Zn—11Ni | 20 | 120 | c | 30 | — |
| Example 18 | 18 | 0.85 | 0.69 | Zn—11Ni | 20 | 120 | c | 30 | — |
| Example 19 | 19 | 1.17 | 1.29 | Zn—11Ni | 20 | 120 | c | 30 | — |
| Example 20 | 20 | 0.74 | 0.68 | Zn—11Ni | 20 | 120 | c | 30 | — |
| Example 21 | 1 | 0.11 | 0.17 | Zn—11Ni | 20 | 100 | c | 30 | — |
| Example 22 | 1 | 6.67 | 7.01 | Zn—11Ni | 20 | 100 | c | 30 | — |

| No | Covering film 2 Type | Covering film 2 Covering thickness (μm) | Covering film 2 Baking temperature (° C.) | Corrosion resistance 1 (gasoline resistance) | Corrosion resistance 2 (salt water resistance) | Press process-ability | Weld-ability (spot) | Weld-ability (seam) | Secondary processing brittleness resistance | Coat-ability |
|---|---|---|---|---|---|---|---|---|---|---|
| Example 1 | B2 | 1.0 | 150 | 3 | 3 | 4 | 4 | 5 | 5 | 4 |
| Example 2 | B2 | 1.0 | 150 | 3 | 3 | 4 | 4 | 5 | 5 | 4 |
| Example 3 | B2 | 1.0 | 150 | 4 | 4 | 4 | 3 | 5 | 5 | 4 |
| Example 4 | B1 | 1.0 | 150 | 4 | 4 | 4 | 3 | 5 | 5 | 4 |
| Example 5 | B2 | 1.0 | 150 | 4 | 4 | 4 | 3 | 5 | 5 | 4 |
| Example 6 | B3 | 1.0 | 150 | 4 | 4 | 3 | 3 | 5 | 5 | 4 |
| Example 7 | B4 | 1.0 | 150 | 4 | 4 | 3 | 3 | 5 | 5 | 4 |
| Example 8 | B2 | 1.0 | 150 | 4 | 4 | 4 | 3 | 5 | 5 | 4 |
| Example 9 | B2 | 1.0 | 150 | 3 | 3 | 4 | 3 | 5 | 5 | 3 |
| Example 10 | B2 | 1.0 | 150 | 3 | 3 | 4 | 3 | 5 | 5 | 3 |
| Example 11 | B2 | 1.0 | 150 | 4 | 4 | 4 | 3 | 5 | 5 | 4 |
| Example 12 | B2 | 1.0 | 150 | 4 | 4 | 4 | 3 | 5 | 5 | 4 |
| Example 13 | B2 | 1.0 | 150 | 4 | 4 | 3 | 3 | 5 | 5 | 4 |
| Example 14 | B2 | 1.0 | 150 | 4 | 4 | 3 | 3 | 5 | 5 | 4 |
| Example 15 | B2 | 1.0 | 150 | 4 | 4 | 3 | 3 | 5 | 5 | 4 |
| Example 16 | B2 | 1.0 | 150 | 4 | 4 | 3 | 3 | 5 | 5 | 4 |
| Example 17 | B2 | 1.0 | 150 | 4 | 4 | 3 | 3 | 5 | 5 | 4 |
| Example 18 | B2 | 1.0 | 150 | 4 | 4 | 3 | 3 | 5 | 5 | 4 |
| Example 19 | B2 | 1.0 | 150 | 4 | 4 | 3 | 3 | 5 | 5 | 4 |
| Example 20 | B2 | 1.0 | 150 | 4 | 4 | 4 | 3 | 5 | 5 | 4 |
| Example 21 | B2 | 1.0 | 150 | 3 | 3 | 3 | 3 | 5 | 5 | 4 |
| Example 22 | B2 | 1.0 | 150 | 3 | 3 | 3 | 3 | 5 | 5 | 4 |

※1: The number and area of concavities of the surface of the surface-treated steel sheet were measured by image analysis using a laser microscope.
※2 The content amount of Ni of the outer layer was found from the area ratio between Zn and Ni in an area of 1/10 of the outer layer of a profile measured by glow discharge optical emission spectrometry.

TABLE 11

| No | Underlying steel sheet | Outer layer form indicator Z ($\times 10^5$ μm³/mm²) ※1 Front | Outer layer form indicator Z ($\times 10^5$ μm³/mm²) ※1 Back | Plating Type | Plating Adhesion amount (g/m²) | Plating Percentage of outer layer Ni (%)※2 | Covering film 1 (Compositions of Table 2 and Table 3) Type | Covering film 1 Adhesion amount (mg/m²) | Covering film 1 Baking temperature (° C.) |
|---|---|---|---|---|---|---|---|---|---|
| Example 23 | 1 | 1.31 | 1.88 | Zn—11Ni | 30 | 120 | c | 100 | — |
| Example 24 | 1 | 1.31 | 1.88 | Zn—11Ni | 50 | 120 | c | 200 | — |
| Example 25 | 1 | 1.31 | 1.88 | Zn—11Ni | 20 | 120 | a | 30 | 80 |
| Example 26 | 1 | 1.31 | 1.88 | Zn—11Ni | 20 | 120 | b | 30 | 80 |
| Example 27 | 4 | 1.21 | 1.10 | Zn—11Ni | 20 | 130 | c | 30 | — |
| Example 28 | 4 | 1.21 | 1.10 | Zn—11Ni | 20 | 200 | c | 30 | — |
| Example 29 | 4 | 0.15 | 0.19 | Zn—11Ni | 20 | 120 | c | 30 | — |
| Example 30 | 4 | 5.54 | 5.28 | Zn—11Ni | 20 | 120 | c | 30 | — |
| Example 31 | 1 | 1.31 | 1.88 | Zn—11Ni | 20 | 120 | c | 30 | — |
| Example 32 | 1 | 1.31 | 1.88 | Zn—11Ni | 20 | 120 | c | 30 | — |
| Example 33 | 1 | 1.31 | 1.88 | Zn—11Ni | 20 | 120 | c | 30 | — |
| Example 34 | 1 | 1.31 | 1.88 | Zn—11Ni | 20 | 120 | c | 30 | — |
| Example 35 | 1 | 1.31 | 1.88 | Zn—11Ni | 20 | 120 | c | 30 | — |
| Example 36 | 1 | 1.31 | 1.88 | Zn—11Ni | 3 | 130 | c | 3 | — |
| Example 37 | 2 | 1.06 | 1.17 | Zn—11Ni | 5 | 130 | c | 10 | — |
| Example 38 | 3 | 0.68 | 0.54 | Zn—11Ni | 10 | 120 | c | 30 | — |
| Example 39 | 4 | 1.21 | 1.10 | Zn—11Ni | 20 | 120 | c | 30 | — |
| Example 40 | 5 | 1.56 | 1.71 | Zn—11Ni | 20 | 120 | c | 30 | — |
| Example 41 | 6 | 3.12 | 6.08 | Zn—11Ni | 20 | 120 | c | 30 | — |
| Example 42 | 7 | 0.25 | 0.85 | Zn—11Ni | 20 | 120 | c | 30 | — |
| Example 43 | 8 | 1.33 | 1.26 | Zn—11Ni | 20 | 120 | c | 30 | — |
| Example 44 | 9 | 0.21 | 1.22 | Zn—11Ni | 20 | 120 | c | 30 | — |

| No | Covering film 2 (Compositions of Table 4 and Table 5) Type | Covering film 2 Covering thickness (μm) | Covering film 2 Baking temperature (° C.) | Covering film performance Corrosion resistance 1 (gasoline resistance) | Corrosion resistance 2 (salt water resistance) | Press processability | Weldability (spot) | Weldability (seam) | Secondary processing brittleness resistance | Coatability |
|---|---|---|---|---|---|---|---|---|---|---|
| Example 23 | B2 | 1.0 | 150 | 4 | 4 | 4 | 3 | 5 | 5 | 4 |
| Example 24 | B2 | 1.0 | 150 | 4 | 4 | 4 | 3 | 5 | 5 | 4 |
| Example 25 | B2 | 1.0 | 150 | 4 | 4 | 4 | 3 | 5 | 5 | 4 |
| Example 26 | B2 | 1.0 | 150 | 4 | 4 | 4 | 3 | 5 | 5 | 4 |
| Example 27 | B2 | 1.0 | 150 | 3 | 3 | 4 | 3 | 5 | 5 | 4 |
| Example 28 | B2 | 1.0 | 150 | 3 | 3 | 4 | 3 | 5 | 5 | 4 |
| Example 29 | B2 | 1.0 | 150 | 4 | 4 | 3 | 3 | 5 | 5 | 4 |
| Example 30 | B2 | 1.0 | 150 | 4 | 4 | 3 | 3 | 5 | 5 | 3 |
| Example 31 | B2 | 0.5 | 150 | 3 | 3 | 3 | 4 | 5 | 5 | 4 |
| Example 32 | B2 | 1.5 | 150 | 4 | 4 | 3 | 3 | 5 | 5 | 4 |
| Example 33 | B2 | 2.0 | 150 | 4 | 4 | 3 | 3 | 5 | 5 | 4 |
| Example 34 | B3 | 1.0 | 120 | 4 | 4 | 4 | 3 | 5 | 5 | 3 |
| Example 35 | B4 | 1.0 | 200 | 4 | 4 | 3 | 3 | 5 | 5 | 3 |
| Example 36 | C2 | 1.0 | 160 | 3 | 3 | 4 | 4 | 5 | 5 | 4 |
| Example 37 | C2 | 1.0 | 160 | 3 | 3 | 4 | 4 | 5 | 5 | 4 |
| Example 38 | C2 | 1.0 | 160 | 4 | 4 | 4 | 3 | 5 | 5 | 4 |
| Example 39 | C1 | 1.0 | 160 | 4 | 4 | 4 | 3 | 5 | 5 | 4 |
| Example 40 | C2 | 1.0 | 160 | 4 | 4 | 3 | 3 | 5 | 5 | 4 |
| Example 41 | C3 | 1.0 | 160 | 4 | 4 | 3 | 3 | 5 | 5 | 4 |
| Example 42 | C2 | 1.0 | 160 | 4 | 4 | 3 | 3 | 5 | 5 | 4 |
| Example 43 | C2 | 1.0 | 160 | 4 | 4 | 4 | 3 | 5 | 5 | 4 |
| Example 44 | C2 | 1.0 | 160 | 3 | 3 | 4 | 3 | 5 | 5 | 3 |

※1: The number and area of concavities of the surface of the surface-treated steel sheet were measured by image analysis using a laser microscope.

※2 The content amount of Ni of the outer layer was found from the area ratio between Zn and Ni in an area of $1/10$ of the outer layer of a profile measured by glow discharge optical emission spectrometry.

TABLE 12

| No | Underlying steel sheet | Outer layer form indicator Z (×10⁵ μm³/mm²) ※1 Front | Outer layer form indicator Z (×10⁵ μm³/mm²) ※1 Back | Plating Type | Plating Adhesion amount (g/m²) | Plating Percentage of outer layer Ni (%)※2 | Covering film 1 (Compositions of Table 2 and Table 3) Type | Covering film 1 Adhesion amount (mg/m²) | Covering film 1 Baking temperature (° C.) |
|---|---|---|---|---|---|---|---|---|---|
| Example 45 | 10 | 1.67 | 1.58 | Zn—11Ni | 20 | 120 | c | 30 | — |
| Example 46 | 11 | 1.23 | 1.54 | Zn—11Ni | 20 | 120 | c | 30 | — |
| Example 47 | 12 | 1.22 | 1.37 | Zn—11Ni | 20 | 120 | c | 30 | — |
| Example 48 | 13 | 0.85 | 0.56 | Zn—11Ni | 20 | 120 | c | 30 | — |
| Example 49 | 14 | 1.33 | 1.75 | Zn—11Ni | 20 | 120 | c | 30 | — |
| Example 50 | 15 | 1.59 | 1.77 | Zn—11Ni | 20 | 120 | c | 30 | — |
| Example 51 | 16 | 1.81 | 1.99 | Zn—11Ni | 20 | 120 | c | 30 | — |
| Example 52 | 17 | 0.33 | 0.41 | Zn—11Ni | 20 | 120 | c | 30 | — |
| Example 53 | 18 | 0.85 | 0.69 | Zn—11Ni | 20 | 120 | c | 30 | — |
| Example 54 | 19 | 1.17 | 1.29 | Zn—11Ni | 20 | 120 | c | 30 | — |
| Example 55 | 20 | 0.74 | 0.68 | Zn—11Ni | 20 | 120 | c | 30 | — |
| Example 56 | 1 | 1.31 | 1.88 | Zn—11Ni | 20 | 120 | c | 30 | — |
| Example 57 | 4 | 1.21 | 1.10 | Zn—11Ni | 20 | 120 | c | 30 | — |
| Example 58 | 1 | 1.31 | 1.88 | Zn—11Ni | 20 | 120 | A1 | 450 | 120 |
| Example 59 | 1 | 1.31 | 1.88 | Zn—11Ni | 20 | 120 | A2 | 450 | 120 |
| Example 60 | 1 | 1.31 | 1.88 | Zn—11Ni | 20 | 120 | A3 | 450 | 120 |
| Example 61 | 1 | 1.31 | 1.88 | Zn—11Ni | 20 | 120 | c | 30 | — |
| Example 62 | 1 | 1.31 | 1.88 | Zn—11Ni | 20 | 120 | c | 30 | — |
| Example 63 | 1 | 1.31 | 1.88 | Zn—11Ni | 20 | 120 | A1 | 450 | 120 |
| Example 64 | 1 | 1.31 | 1.88 | Zn—11Ni | 20 | 120 | A2 | 450 | 120 |
| Example 65 | 1 | 1.31 | 1.88 | Zn—11Ni | 20 | 120 | A3 | 450 | 120 |

| No | Covering film 2 (Compositions of Table 4 and Table 5) Type | Covering film 2 Covering thickness (μm) | Covering film 2 Baking temperature (° C.) | Covering film performance Corrosion resistance 1 (gasoline resistance) | Corrosion resistance 2 (salt water resistance) | Press process-ability | Weld-ability (spot) | Weld-ability (seam) | Secondary processing brittleness resistance | Coat-ability |
|---|---|---|---|---|---|---|---|---|---|---|
| Example 45 | C2 | 1.0 | 160 | 3 | 3 | 4 | 3 | 5 | 5 | 3 |
| Example 46 | C2 | 1.0 | 160 | 4 | 4 | 4 | 3 | 5 | 5 | 4 |
| Example 47 | C2 | 1.0 | 160 | 4 | 4 | 4 | 3 | 5 | 5 | 4 |
| Example 48 | C2 | 1.0 | 160 | 4 | 4 | 4 | 3 | 5 | 5 | 4 |
| Example 49 | C2 | 1.0 | 160 | 4 | 4 | 4 | 3 | 5 | 5 | 4 |
| Example 50 | C2 | 1.0 | 160 | 4 | 4 | 4 | 3 | 5 | 5 | 4 |
| Example 51 | C2 | 1.0 | 160 | 4 | 4 | 4 | 3 | 5 | 5 | 4 |
| Example 52 | C2 | 1.0 | 160 | 4 | 4 | 3 | 3 | 5 | 5 | 4 |
| Example 53 | C2 | 1.0 | 160 | 4 | 4 | 4 | 3 | 5 | 5 | 4 |
| Example 54 | C2 | 1.0 | 160 | 4 | 4 | 4 | 3 | 5 | 5 | 4 |
| Example 55 | C2 | 1.0 | 160 | 4 | 4 | 4 | 3. | 5 | 5 | 4 |
| Example 56 | — | — | — | 3 | 3 | 3 | 3 | 5 | 5 | 4 |
| Example 57 | — | — | — | 3 | 3 | 3 | 3 | 5 | 5 | 4 |
| Example 58 | — | — | — | 4 | 3 | 3 | 3 | 5 | 5 | 4 |
| Example 59 | — | — | — | 4 | 3 | 3 | 3 | 5 | 5 | 4 |
| Example 60 | — | — | — | 3 | 3 | 3 | 3 | 5 | 5 | 4 |
| Example 61 | B2 | 1.0 | 150 | 4 | 4 | 4 | 3 | 5 | 5 | 4 |
| Example 62 | B2 | 1.0 | 150 | 4 | 4 | 4 | 3 | 5 | 5 | 4 |
| Example 63 | B2 | 1.0 | 150 | 4 | 4 | 4 | 3 | 5 | 5 | 4 |
| Example 64 | B2 | 1.0 | 150 | 4 | 4 | 4 | 3 | 5 | 5 | 4 |
| Example 65 | B2 | 1.0 | 150 | 4 | 4 | 4 | 3 | 5 | 5 | 4 |

※1: The number and area of concavities of the surface of the surface-treated steel sheet were measured by image analysis using a laser microscope.

※2 The content amount of Ni of the outer layer was found from the area ratio between Zn and Ni in an area of 1/10 of the outer layer of a profile measured by glow discharge optical emission spectrometry.

TABLE 13

| No | Underlying steel sheet | Outer layer form indicator Z (×10⁵ μm³/mm²) ※1 | | Plating | | | Covering film 1 (Compositions of Table 2 and Table 3) | | |
|---|---|---|---|---|---|---|---|---|---|
| | | Front | Back | Type | Adhesion amount (g/m²) | Percentage of outer layer Ni (%)※2 | Type | Adhesion amount (mg/m²) | Baking temperature (° C.) |
| Comparative Example 1 | 21 | 1.33 | 1.68 | Zn—11Ni | 20 | 120 | c | 30 | — |
| Comparative Example 2 | 22 | 3.25 | 2.11 | Zn—11Ni | 20 | 120 | c | 30 | — |
| Comparative Example 3 | 23 | 1.18 | 1.25 | Zn—11Ni | 20 | 120 | c | 30 | — |
| Comparative Example 4 | 24 | 1.15 | 1.41 | Zn—11Ni | 20 | 120 | c | 30 | — |
| Comparative Example 5 | 25 | 1.56 | 1.60 | Zn—11Ni | 20 | 120 | c | 30 | — |
| Comparative Example 6 | 26 | 1.36 | 1.87 | Zn—11Ni | 20 | 120 | c | 30 | — |
| Comparative Example 7 | 27 | 1.94 | 2.00 | Zn—11Ni | 20 | 120 | c | 30 | — |
| Comparative Example 8 | 28 | 1.22 | 1.01 | Zn—11Ni | 20 | 120 | c | 30 | — |
| Comparative Example 9 | 29 | 6.02 | 5.11 | Zn—11Ni | 20 | 120 | c | 30 | — |
| Comparative Example 10 | 1 | 0.05 | 0.07 | Zn—11Ni | 20 | 120 | c | 30 | — |
| Comparative Example 11 | 1 | 11.20 | 10.35 | Zn—11Ni | 20 | 120 | c | 30 | — |

| No | Covering film 2 (Compositions of Table 4 and Table 5) | | | Covering film performance | | | | | | |
|---|---|---|---|---|---|---|---|---|---|---|
| | Type | Covering thickness (μm) | Baking temperature (° C.) | Corrosion resistance 1 (gasoline resistance) | Corrosion resistance 2 (salt water resistance) | Press process-ability | Weld-ability (spot) | Weld-ability (seam) | Secondary processing brittleness resistance | Coat-ability |
| Comparative Example 1 | B2 | 1.0 | 150 | 3 | 3 | 2 | 3 | 1 | 5 | 3 |
| Comparative Example 2 | B2 | 1.0 | 150 | 1 | 1 | 2 | 3 | 1 | 5 | 2 |
| Comparative Example 3 | B2 | 1.0 | 150 | 3 | 3 | 2 | 3 | 1 | 5 | 3 |
| Comparative Example 4 | B2 | 1.0 | 150 | 4 | 3 | 2 | 3 | 1 | 1 | 3 |
| Comparative Example 5 | B2 | 1.0 | 150 | 4 | 3 | 2 | 3 | 5 | 5 | 3 |
| Comparative Example 6 | B2 | 1.0 | 150 | 4 | 3 | 3 | 3 | 1 | 5 | 3 |
| Comparative Example 7 | B2 | 1.0 | 150 | 4 | 3 | 2 | 3 | 5 | 5 | 3 |
| Comparative Example 8 | B2 | 1.0 | 150 | 4 | 3 | 3 | 3 | 5 | 1 | 3 |
| Comparative Example 9 | B2 | 1.0 | 150 | 4 | 3 | 2 | 3 | 5 | 1 | 3 |
| Comparative Example 10 | — | — | — | 3 | 3 | 2 | 3 | 5 | 5 | 4 |
| Comparative Example 11 | — | — | — | 3 | 3 | 2 | 3 | 5 | 5 | 4 |

※1: The number and area of concavities of the surface of the surface-treated steel sheet were measured by image analysis using a laser microscope.

※2 The content amount of Ni of the outer layer was found from the area ratio between Zn and Ni in an area of 1/10 of the outer layer of a profile measured by glow discharge optical emission spectrometry.

TABLE 14

| No | Underlying steel sheet | Ra of surface of surface-treated steel sheet (nm)※1 Front | Ra of surface of surface-treated steel sheet (nm)※1 Back | Rt of surface of surface-treated steel sheet (nm)※1 Front | Rt of surface of surface-treated steel sheet (nm)※1 Back | Plating Type | Plating Adhesion amount (g/m²) | Plating Percentage of outer layer Ni (%)※3 | Covering film 1 (Compositions of Table 2 and Table 3) Type | Covering film 1 Adhesion amount (mg/m²) | Covering film 1 Baking temperature (° C.) |
|---|---|---|---|---|---|---|---|---|---|---|---|
| Example 1 | 1 | 62 | 69 | 301 | 423 | Zn—11Ni | 3 | 130 | c | 3 | — |
| Example 2 | 2 | 86 | 54 | 508 | 345 | Zn—11Ni | 5 | 130 | c | 10 | — |
| Example 3 | 3 | 98 | 72 | 456 | 628 | Zn—11Ni | 10 | 120 | c | 30 | — |
| Example 4 | 4 | 13 | 25 | 439 | 557 | Zn—11Ni | 20 | 120 | c | 30 | — |
| Example 5 | 5 | 91 | 89 | 285 | 429 | Zn—11Ni | 20 | 120 | c | 30 | — |
| Example 6 | 6 | 72 | 81 | 598 | 388 | Zn—11Ni | 20 | 120 | c | 30 | — |
| Example 7 | 7 | 127 | 95 | 816 | 746 | Zn—11Ni | 20 | 120 | c | 30 | — |
| Example 8 | 8 | 115 | 102 | 810 | 889 | Zn—11Ni | 20 | 120 | c | 30 | — |
| Example 9 | 9 | 103 | 111 | 726 | 901 | Zn—11Ni | 20 | 120 | c | 30 | — |
| Example 10 | 10 | 78 | 85 | 369 | 618 | Zn—11Ni | 20 | 120 | c | 30 | — |
| Example 11 | 11 | 55 | 48 | 444 | 510 | Zn—11Ni | 20 | 120 | c | 30 | — |
| Example 12 | 12 | 65 | 51 | 665 | 547 | Zn—11Ni | 20 | 120 | c | 30 | — |
| Example 13 | 13 | 39 | 54 | 304 | 415 | Zn—11Ni | 20 | 120 | c | 30 | — |
| Example 14 | 14 | 52 | 74 | 412 | 364 | Zn—11Ni | 20 | 120 | c | 30 | — |
| Example 15 | 15 | 88 | 65 | 448 | 362 | Zn—11Ni | 20 | 120 | c | 30 | — |
| Example 16 | 16 | 46 | 47 | 771 | 564 | Zn—11Ni | 20 | 120 | c | 30 | — |
| Example 17 | 17 | 95 | 88 | 501 | 492 | Zn—11Ni | 20 | 120 | c | 30 | — |
| Example 18 | 18 | 47 | 78 | 462 | 771 | Zn—11Ni | 20 | 120 | c | 30 | — |
| Example 19 | 19 | 48 | 53 | 528 | 299 | Zn—11Ni | 20 | 120 | c | 30 | — |
| Example 20 | 20 | 74 | 69 | 477 | 398 | Zn—11Ni | 20 | 120 | c | 30 | — |
| Example 21 | 1 | 71 | 79 | 581 | 649 | Zn—11Ni | 20 | 100 | c | 30 | — |
| Example 22 | 1 | 48 | 75 | 667 | 515 | Zn—11Ni | 20 | 100 | c | 30 | — |

| No | Covering film 2 (Compositions of Table 4 and Table 5) Type | Covering film 2 Covering thickness (μm) | Covering film 2 Baking temperature (° C.) | Covering film performance Corrosion resistance 1 (gasoline resistance) | Covering film performance Corrosion resistance 2 (salt water resistance) | Press processability | Weldability (spot) | Weldability (seam) | Secondary processing brittleness resistance | Coatability |
|---|---|---|---|---|---|---|---|---|---|---|
| Example 1 | B2 | 1.0 | 150 | 3 | 3 | 4 | 4 | 5 | 5 | 4 |
| Example 2 | B2 | 1.0 | 150 | 3 | 3 | 4 | 4 | 5 | 5 | 4 |
| Example 3 | B2 | 1.0 | 150 | 4 | 4 | 4 | 3 | 5 | 5 | 4 |
| Example 4 | B1 | 1.0 | 150 | 4 | 4 | 4 | 3 | 5 | 5 | 4 |
| Example 5 | B2 | 1.0 | 150 | 4 | 4 | 4 | 3 | 5 | 5 | 4 |
| Example 6 | B3 | 1.0 | 150 | 4 | 4 | 4 | 3 | 5 | 5 | 4 |
| Example 7 | B4 | 1.0 | 150 | 4 | 4 | 5 | 3 | 5 | 5 | 4 |
| Example 8 | B2 | 1.0 | 150 | 4 | 4 | 4 | 3 | 5 | 5 | 4 |
| Example 9 | B2 | 1.0 | 150 | 3 | 3 | 4 | 3 | 5 | 5 | 3 |
| Example 10 | B2 | 1.0 | 150 | 3 | 3 | 4 | 3 | 5 | 5 | 3 |
| Example 11 | B2 | 1.0 | 150 | 4 | 4 | 4 | 3 | 5 | 5 | 4 |
| Example 12 | B2 | 1.0 | 150 | 4 | 4 | 4 | 3 | 5 | 5 | 4 |
| Example 13 | B2 | 1.0 | 150 | 4 | 4 | 3 | 3 | 5 | 5 | 4 |
| Example 14 | B2 | 1.0 | 150 | 4 | 4 | 3 | 3 | 5 | 5 | 4 |
| Example 15 | B2 | 1.0 | 150 | 4 | 4 | 3 | 3 | 5 | 5 | 4 |
| Example 16 | B2 | 1.0 | 150 | 4 | 4 | 4 | 3 | 5 | 5 | 4 |
| Example 17 | B2 | 1.0 | 150 | 4 | 4 | 5 | 3 | 5 | 5 | 4 |
| Example 18 | B2 | 1.0 | 150 | 4 | 4 | 3 | 3 | 5 | 5 | 4 |
| Example 19 | B2 | 1.0 | 150 | 4 | 4 | 3 | 3 | 5 | 5 | 4 |
| Example 20 | B2 | 1.0 | 150 | 4 | 4 | 4 | 3 | 5 | 5 | 4 |
| Example 21 | B2 | 1.0 | 150 | 3 | 3 | 5 | 3 | 5 | 5 | 4 |
| Example 22 | B2 | 1.0 | 150 | 3 | 3 | 3 | 3 | 5 | 5 | 4 |

※1 The roughness of the surface of the surface-treated steel sheet was measured by image analysis using AFM.
※2: The number and area of concavities of the surface of the surface-treated steel sheet were measured by image analysis using a laser microscope.
※3 The content amount of Ni of the outer layer was found from the area ratio between Zn and Ni in an area of $1/10$ of the outer layer of a profile measured by glow discharge optical emission spectrometry.

TABLE 15

| No | Underlying steel sheet | Ra of surface of surface-treated steel sheet (nm)※1 Front | Ra of surface of surface-treated steel sheet (nm)※1 Back | Rt of surface of surface-treated steel sheet (nm)※1 Front | Rt of surface of surface-treated steel sheet (nm)※1 Back | Plating Type | Plating Adhesion amount (g/m²) | Plating Percentage of outer layer Ni (%)※3 | Covering film 1 Type | Covering film 1 Adhesion amount (mg/m²) | Covering film 1 Baking temperature (° C.) |
|---|---|---|---|---|---|---|---|---|---|---|---|
| Example 22 | 1 | 48 | 75 | 667 | 515 | Zn—11Ni | 20 | 100 | c | 30 | — |
| Example 23 | 1 | 56 | 61 | 429 | 667 | Zn—11Ni | 30 | 120 | c | 100 | — |
| Example 24 | 1 | 43 | 52 | 511 | 421 | Zn—11Ni | 50 | 120 | c | 200 | — |
| Example 25 | 1 | 39 | 58 | 577 | 469 | Zn—11Ni | 20 | 120 | a | 30 | 80 |
| Example 26 | 1 | 71 | 58 | 474 | 661 | Zn—11Ni | 20 | 120 | b | 30 | 80 |
| Example 27 | 4 | 66 | 61 | 744 | 699 | Zn—11Ni | 20 | 130 | c | 30 | — |
| Example 28 | 4 | 74 | 57 | 447 | 513 | Zn—11Ni | 20 | 200 | c | 30 | — |
| Example 29 | 4 | 54 | 38 | 500 | 627 | Zn—11Ni | 20 | 120 | c | 30 | — |
| Example 30 | 4 | 61 | 79 | 533 | 725 | Zn—11Ni | 20 | 120 | c | 30 | — |
| Example 31 | 1 | 90 | 104 | 799 | 856 | Zn—11Ni | 20 | 120 | c | 30 | — |
| Example 32 | 1 | 71 | 68 | 710 | 648 | Zn—11Ni | 20 | 120 | c | 30 | — |
| Example 33 | 1 | 62 | 62 | 299 | 364 | Zn—11Ni | 20 | 120 | c | 30 | — |
| Example 34 | 1 | 53 | 72 | 559 | 428 | Zn—11Ni | 20 | 120 | c | 30 | — |
| Example 35 | 1 | 57 | 45 | 617 | 701 | Zn—11Ni | 20 | 120 | c | 30 | — |
| Example 36 | 1 | 84 | 67 | 441 | 612 | Zn—11Ni | 3 | 130 | c | 3 | — |
| Example 37 | 2 | 54 | 63 | 418 | 547 | Zn—11Ni | 5 | 130 | c | 10 | — |
| Example 38 | 3 | 49 | 68 | 317 | 486 | Zn—11Ni | 10 | 120 | c | 30 | — |
| Example 39 | 4 | 42 | 47 | 592 | 314 | Zn—11Ni | 20 | 120 | c | 30 | — |
| Example 40 | 5 | 85 | 97 | 637 | 452 | Zn—11Ni | 20 | 120 | c | 30 | — |
| Example 41 | 6 | 71 | 92 | 287 | 401 | Zn—11Ni | 20 | 120 | c | 30 | — |
| Example 42 | 7 | 94 | 67 | 492 | 227 | Zn—11Ni | 20 | 120 | c | 30 | — |
| Example 43 | 8 | 47 | 66 | 247 | 398 | Zn—11Ni | 20 | 120 | c | 30 | — |
| Example 44 | 9 | 51 | 44 | 477 | 655 | Zn—11Ni | 20 | 120 | c | 30 | — |

| No | Covering film 2 Type | Covering film 2 Covering thickness (μm) | Covering film 2 Baking temperature (° C.) | Corrosion resistance 1 (gasoline resistance) | Corrosion resistance 2 (salt water resistance) | Press process-ability | Weld-ability (spot) | Weld-ability (seam) | Secondary processing brittieness resistance | Coat-ability |
|---|---|---|---|---|---|---|---|---|---|---|
| Example 22 | | | | | | | | | | |
| Example 23 | B2 | 1.0 | 150 | 4 | 4 | 4 | 3 | 5 | 5 | 4 |
| Example 24 | B2 | 1.0 | 150 | 4 | 4 | 4 | 3 | 5 | 5 | 4 |
| Example 25 | B2 | 1.0 | 150 | 4 | 4 | 4 | 3 | 5 | 5 | 4 |
| Example 26 | B2 | 1.0 | 150 | 4 | 4 | 4 | 3 | 5 | 5 | 4 |
| Example 27 | B2 | 1.0 | 150 | 3 | 3 | 4 | 3 | 5 | 5 | 4 |
| Example 28 | B2 | 1.0 | 150 | 3 | 3 | 4 | 3 | 5 | 5 | 4 |
| Example 29 | B2 | 1.0 | 150 | 4 | 4 | 5 | 3 | 5 | 5 | 4 |
| Example 30 | B2 | 1.0 | 150 | 4 | 4 | 3 | 3 | 5 | 5 | 3 |
| Example 31 | B2 | 0.5 | 150 | 3 | 3 | 3 | 4 | 5 | 5 | 4 |
| Example 32 | B2 | 1.5 | 150 | 4 | 4 | 3 | 3 | 5 | 5 | 4 |
| Example 33 | B2 | 2.0 | 150 | 4 | 4 | 3 | 3 | 5 | 5 | 4 |
| Example 34 | B3 | 1.0 | 120 | 4 | 4 | 4 | 3 | 5 | 5 | 3 |
| Example 35 | B4 | 1.0 | 200 | 4 | 4 | 3 | 3 | 5 | 5 | 3 |
| Example 36 | C2 | 1.0 | 160 | 3 | 3 | 4 | 4 | 5 | 5 | 4 |
| Example 37 | C2 | 1.0 | 160 | 3 | 3 | 4 | 4 | 5 | 5 | 4 |
| Example 38 | C2 | 1.0 | 160 | 4 | 4 | 4 | 3 | 5 | 5 | 4 |
| Example 39 | C1 | 1.0 | 160 | 4 | 4 | 4 | 3 | 5 | 5 | 4 |
| Example 40 | C2 | 1.0 | 160 | 4 | 4 | 3 | 3 | 5 | 5 | 4 |
| Example 41 | C3 | 1.0 | 160 | 4 | 4 | 3 | 3 | 5 | 5 | 4 |
| Example 42 | C2 | 1.0 | 160 | 4 | 4 | 3 | 3 | 5 | 5 | 4 |
| Example 43 | C2 | 1.0 | 160 | 4 | 4 | 4 | 3 | 5 | 5 | 4 |
| Example 44 | C2 | 1.0 | 160 | 3 | 3 | 4 | 3 | 5 | 5 | 3 |

※1 The roughness of the surface of the surface-treated steel sheet was measured by image analysis using AFM.
※2: The number and area of concavities of the surface of the surface-treated steel sheet were measured by image analysis using a laser microscope.
※3 The content amount of Ni of the outer layer was found from the area ratio between Zn and Ni in an area of $1/10$ of the outer layer of a profile measured by glow discharge optical emission spectrometry.

TABLE 16

| No | Underlying steel sheet | Ra of surface of surface-treated steel sheet (nm)※1 | | Rt of surface of surface-treated steel sheet (nm)※1 | | Plating Type | Plating Adhesion amount (g/m²) | Plating Percentage of outer layer Ni (%)※3 | Covering film 1 (Compositions of Table 2 and Table 3) Type | Covering film 1 Adhesion amount (mg/m²) | Covering film 1 Baking temperature (° C.) |
|---|---|---|---|---|---|---|---|---|---|---|---|
| | | Front | Back | Front | Back | | | | | | |
| Example 45 | 10 | 67 | 52 | 632 | 486 | Zn—11Ni | 20 | 120 | c | 30 | — |
| Example 46 | 11 | 95 | 81 | 546 | 489 | Zn—11Ni | 20 | 120 | c | 30 | — |
| Example 47 | 12 | 56 | 42 | 435 | 261 | Zn—11Ni | 20 | 120 | c | 30 | — |
| Example 48 | 13 | 74 | 85 | 332 | 403 | Zn—11Ni | 20 | 120 | c | 30 | — |
| Example 49 | 14 | 54 | 75 | 419 | 264 | Zn—11Ni | 20 | 120 | c | 30 | — |
| Example 50 | 15 | 87 | 75 | 736 | 639 | Zn—11Ni | 20 | 120 | c | 30 | — |
| Example 51 | 16 | 69 | 81 | 328 | 415 | Zn—11Ni | 20 | 120 | c | 30 | — |
| Example 52 | 17 | 73 | 45 | 715 | 721 | Zn—11Ni | 20 | 120 | c | 30 | — |
| Example 53 | 18 | 68 | 54 | 634 | 334 | Zn—11Ni | 20 | 120 | c | 30 | — |
| Example 54 | 19 | 73 | 61 | 295 | 418 | Zn—11Ni | 20 | 120 | c | 30 | — |
| Example 55 | 20 | 85 | 93 | 744 | 614 | Zn—11Ni | 20 | 120 | c | 30 | — |
| Example 56 | 1 | 153 | 169 | 964 | 879 | Zn—11Ni | 20 | 120 | c | 30 | — |
| Example 57 | 4 | 174 | 158 | 911 | 795 | Zn—11Ni | 20 | 120 | c | 30 | — |
| Example 58 | 1 | 145 | 122 | 658 | 751 | Zn—11Ni | 20 | 120 | A1 | 450 | 120 |
| Example 59 | 1 | 111 | 127 | 887 | 802 | Zn—11Ni | 20 | 120 | A2 | 450 | 120 |
| Example 60 | 1 | 117 | 142 | 863 | 927 | Zn—11Ni | 20 | 120 | A3 | 450 | 120 |
| Example 61 | 1 | 58 | 74 | 452 | 650 | Zn—11Ni | 20 | 120 | c | 30 | — |
| Example 62 | 1 | 49 | 40 | 499 | 517 | Zn—11Ni | 20 | 120 | c | 30 | — |
| Example 63 | 1 | 64 | 57 | 594 | 391 | Zn—11Ni | 20 | 120 | A1 | 450 | 120 |
| Example 64 | 1 | 72 | 65 | 571 | 511 | Zn—11Ni | 20 | 120 | A2 | 450 | 120 |
| Example 65 | 1 | 53 | 64 | 292 | 310 | Zn—11Ni | 20 | 120 | A3 | 450 | 120 |

| No | Covering film 2 (Compositions of Table 4 and Table 5) Type | Covering film 2 Covering thickness (μm) | Covering film 2 Baking temperature (° C.) | Covering film performance Corrosion resistance 1 (gasoline resistance) | Corrosion resistance 2 (salt water resistance) | Press processability | Weldability (spot) | Weldability (seam) | Secondary processing brittleness resistance | Coatability |
|---|---|---|---|---|---|---|---|---|---|---|
| Example 45 | C2 | 1.0 | 160 | 3 | 3 | 4 | 3 | 5 | 5 | 3 |
| Example 46 | C2 | 1.0 | 160 | 4 | 4 | 4 | 3 | 5 | 5 | 4 |
| Example 47 | C2 | 1.0 | 160 | 4 | 4 | 4 | 3 | 5 | 5 | 4 |
| Example 48 | C2 | 1.0 | 160 | 4 | 4 | 4 | 3 | 5 | 5 | 4 |
| Example 49 | C2 | 1.0 | 160 | 4 | 4 | 4 | 3 | 5 | 5 | 4 |
| Example 50 | C2 | 1.0 | 160 | 4 | 4 | 4 | 3 | 5 | 5 | 4 |
| Example 51 | C2 | 1.0 | 160 | 4 | 4 | 4 | 3 | 5 | 5 | 4 |
| Example 52 | C2 | 1.0 | 160 | 4 | 4 | 3 | 3 | 5 | 5 | 4 |
| Example 53 | C2 | 1.0 | 160 | 4 | 4 | 4 | 3 | 5 | 5 | 4 |
| Example 54 | C2 | 1.0 | 160 | 4 | 4 | 4 | 3 | 5 | 5 | 4 |
| Example 55 | C2 | 1.0 | 160 | 4 | 4 | 4 | 3 | 5 | 5 | 4 |
| Example 56 | — | — | — | 3 | 3 | 3 | 3 | 5 | 5 | 4 |
| Example 57 | — | — | — | 3 | 3 | 3 | 3 | 5 | 5 | 4 |
| Example 58 | — | — | — | 4 | 3 | 3 | 3 | 5 | 5 | 4 |
| Example 59 | — | — | — | 4 | 3 | 3 | 3 | 5 | 5 | 4 |
| Example 60 | — | — | — | 3 | 3 | 3 | 3 | 5 | 5 | 4 |
| Example 61 | B2 | 1.0 | 150 | 4 | 4 | 4 | 3 | 5 | 5 | 4 |
| Example 62 | B2 | 1.0 | 150 | 4 | 4 | 4 | 3 | 5 | 5 | 4 |
| Example 63 | B2 | 1.0 | 150 | 4 | 4 | 4 | 3 | 5 | 5 | 4 |
| Example 64 | B2 | 1.0 | 150 | 4 | 4 | 4 | 3 | 5 | 5 | 4 |
| Example 65 | B2 | 1.0 | 150 | 4 | 4 | 4 | 3 | 5 | 5 | 4 |

※1 The roughness of the surface of the surface-treated steel sheet was measured by image analysis using AFM.

※2: The number and area of concavities of the surface of the surface-treated steel sheet were measured by image analysis using a laser microscope.

※3 The content amount of Ni of the outer layer was found from the area ratio between Zn and Ni in an area of 1/10 of the outer layer of a profile measured by glow discharge optical emission spectrometry.

TABLE 17

| No | Underlying steel sheet | Ra of surface of surface-treated steel sheet (nm)※1 Front | Ra of surface of surface-treated steel sheet (nm)※1 Back | Rt of surface of surface-treated steel sheet (nm)※1 Front | Rt of surface of surface-treated steel sheet (nm)※1 Back | Plating Type | Plating Adhesion amount (g/m²) | Plating Percentage of outer layer Ni (%)※3 | Covering film 1 (Compositions of Table 2 and Table 3) Type | Covering film 1 Adhesion amount (mg/m²) | Covering film 1 Baking temperature (° C.) |
|---|---|---|---|---|---|---|---|---|---|---|---|
| Comparative Example 1 | 21 | 68 | 59 | 277 | 398 | Zn—11Ni | 20 | 120 | c | 30 | — |
| Comparative Example 2 | 22 | 74 | 47 | 658 | 759 | Zn—11Ni | 20 | 120 | c | 30 | — |
| Comparative Example 3 | 23 | 67 | 80 | 519 | 645 | Zn—11Ni | 20 | 120 | c | 30 | — |
| Comparative Example 4 | 24 | 34 | 37 | 441 | 657 | Zn—11Ni | 20 | 120 | c | 30 | — |
| Comparative Example 5 | 25 | 70 | 69 | 745 | 516 | Zn—11Ni | 20 | 120 | c | 30 | — |
| Comparative Example 6 | 26 | 58 | 71 | 449 | 545 | Zn—11Ni | 20 | 120 | c | 30 | — |
| Comparative Example 7 | 27 | 47 | 39 | 256 | 471 | Zn—11Ni | 20 | 120 | c | 30 | — |
| Comparative Example 8 | 28 | 59 | 31 | 358 | 425 | Zn—11Ni | 20 | 120 | c | 30 | — |
| Comparative Example 9 | 29 | 52 | 78 | 452 | 471 | Zn—11Ni | 20 | 120 | c | 30 | — |
| Comparative Example 10 | 1 | 48 | 65 | 751 | 677 | Zn—11Ni | 20 | 120 | c | 30 | — |
| Comparative Example 11 | 1 | 39 | 67 | 479 | 471 | Zn—11Ni | 20 | 120 | c | 30 | — |
| Comparative Example 12 | 1 | 241 | 227 | 958 | 994 | Zn—11Ni | 20 | 100 | c | 30 | — |
| Comparative Example 13 | 1 | 4 | 3 | 124 | 105 | Zn—11Ni | 20 | 100 | c | 30 | — |
| Comparative Example 14 | 1 | 48 | 64 | 1098 | 1144 | Zn—11Ni | 20 | 100 | c | 30 | — |
| Comparative Example 15 | 1 | 55 | 41 | 87 | 96 | Zn—11Ni | 20 | 100 | c | 30 | — |

| No | Covering film 2 (Compositions of Table 4 and Table 5) Type | Covering film 2 Covering thickness (μm) | Covering film 2 Baking temperature (° C.) | Covering film performance Corrosion resistance 1 (gasoline resistance) | Covering film performance Corrosion resistance 2 (salt water resistance) | Press processability | Weldability (spot) | Weldability (seam) | Secondary processing brittleness resistance | Coatability |
|---|---|---|---|---|---|---|---|---|---|---|
| Comparative Example 1 | B2 | 1.0 | 150 | 3 | 3 | 2 | 3 | 1 | 5 | 3 |
| Comparative Example 2 | B2 | 1.0 | 150 | 1 | 1 | 2 | 3 | 1 | 5 | 2 |
| Comparative Example 3 | B2 | 1.0 | 150 | 3 | 3 | 2 | 3 | 1 | 5 | 3 |
| Comparative Example 4 | B2 | 1.0 | 150 | 4 | 3 | 2 | 3 | 1 | 1 | 3 |
| Comparative Example 5 | B2 | 1.0 | 150 | 4 | 3 | 2 | 3 | 5 | 5 | 3 |
| Comparative Example 6 | B2 | 1.0 | 150 | 4 | 3 | 3 | 3 | 1 | 5 | 3 |
| Comparative Example 7 | B2 | 1.0 | 150 | 4 | 3 | 2 | 3 | 5 | 5 | 3 |
| Comparative Example 8 | B2 | 1.0 | 150 | 4 | 3 | 3 | 3 | 5 | 1 | 3 |
| Comparative Example 9 | B2 | 1.0 | 150 | 4 | 3 | 2 | 3 | 5 | 1 | 3 |
| Comparative Example 10 | — | — | — | 3 | 3 | 2 | 3 | 5 | 5 | 4 |
| Comparative Example 11 | — | — | — | 3 | 3 | 2 | 3 | 5 | 5 | 4 |
| Comparative Example 12 | B2 | 1.0 | 150 | 1 | 1 | 5 | 3 | 5 | 5 | 4 |
| Comparative Example 13 | B2 | 1.0 | 150 | 3 | 3 | 1 | 3 | 5 | 5 | 4 |
| Comparative Example 14 | B2 | 1.0 | 150 | 2 | 1 | 5 | 3 | 5 | 5 | 4 |

TABLE 17-continued

| | | | | | | | | | |
|---|---|---|---|---|---|---|---|---|---|
| Comparative Example 15 | B2 | 1.0 | 150 | 3 | 3 | 1 | 3 | 5 | 5 | 4 |

※1 The roughness of the surface of the surface-treated steel sheet was measured by image analysis using AFM.
※2: The number and area of concavities of the surface of the surface-treated steel sheet were measured by image analysis using a laser microscope.
※3 The content amount of Ni of the outer layer was found from the area ratio between Zn and Ni in an area of 1/10 of the outer layer of a profile measured by glow discharge optical emission spectrometry.

As shown in Tables 6 to 8, Tables 9 to 12, and Tables 13 to 16, all Examples of the present invention have a strength of the steel sheet exhibiting good press moldability and durability, exhibit good corrosion resistance, weldability, secondary processing brittleness resistance, and coatability, and exhibit properties of being capable of sufficiently enduring use as a material of fuel tanks.

INDUSTRIAL APPLICABILITY

As described above, according to the present invention, a surface-treated steel sheet having excellent press processability, material strength, corrosion resistance, and resistance weldability as a material of fuel tanks of automobiles and motorcycles can be provided. Thus, the present invention has high applicability in the steel sheet production industry and the automobile industry.

REFERENCE SIGNS LIST 1a, 1b horizontal portion of test piece
2 weld

The invention claimed is:
1. A surface-treated steel sheet for fuel tanks, comprising:
a Zn—Ni alloy plating layer on one surface or both surfaces of a steel sheet; and
a trivalent chromate covering layer or a chromate-free covering layer on the Zn—Ni alloy plating layer,
wherein the steel sheet consists of, in mass %,
C: 0.0005 to 0.0050%,
Si: 0.01 to 1.00%,
Mn: 0.70 to 2.00%,
P: less than or equal to 0.060%,
S: less than or equal to 0.010%,
Al: 0.01 to 0.30%,
N: 0.001 to 0.010%,
Ti: 0.010 to 0.050%,
Nb: 0.010 to 0.040%,
B: 0.0005 to 0.0030%, and
the balance: Fe and unavoidable impurities, and
in a surface outermost layer, concavities, of which a depth from an arithmetic average height of a cross-sectional curve of the surface outermost layer is more than or equal to 0.1 μm, exist in a proportion of 50 to 1000 concavities/mm$^2$ and at an area ratio of 20 to 80% to a surface area of the steel sheet,
wherein the concavities in the outermost layer are formed from concavities on the Zn—Ni alloy plating layer and the steel sheet.
2. The surface-treated steel sheet for fuel tanks according to claim 1,
wherein the Zn—Ni alloy plating layer is an alloy plating layer containing Zn as a main component and 5 to 15 mass % Ni,
the adhesion amount of the Zn—Ni alloy plating layer is 3 to 50 g/m$^2$, and
the amount of Ni of an outer layer of 1/10 of a layer thickness of the Zn—Ni alloy plating layer is more than or equal to 120% of the average amount of Ni of the Zn—Ni alloy plating layer.
3. The surface-treated steel sheet for fuel tanks according to claim 1,
comprising a chromate-free covering layer on the Zn—Ni alloy plating layer, wherein the chromate-free covering layer is
(A) a covering layer containing a silicon compound and a phosphoric acid compound and further containing one or more of compounds of Zr, V, Ti, and Co,
(B) a covering layer of a urethane-based resin, or
(C) a covering layer containing a crosslinked epoxy-urethane-based resin and at least one of a polyolefin resin and a fluorine-based resin.
4. The surface-treated steel sheet for fuel tanks according to claim 3, comprising, on (A) the covering layer containing a silicon compound and a phosphoric acid compound and further containing one or more of compounds of Zr, V, Ti, and Co:
at least one layer of
(B) a covering layer of a urethane-based resin, and
(C) a covering layer containing a crosslinked epoxy-urethane-based resin and at least one of a polyolefin resin and a fluorine-based resin.
5. The surface-treated steel sheet for fuel tanks according to claim 1, comprising a trivalent chromate covering layer on the Zn—Ni alloy plating layer, comprising, on the trivalent chromate covering layer:
at least one layer of
(B) a covering layer of a urethane-based resin, and
(C) a covering layer containing a crosslinked epoxy-urethane-based resin and at least one of a polyolefin resin and a fluorine-based resin.
6. The surface-treated steel sheet for fuel tanks according to claim 1,
comprising a chromate-free covering layer on the Zn—Ni alloy plating layer, wherein the chromate-free covering layer is a resin covering layer containing a urethane group and a urea group at 0.6 to 10 mass % on a N-equivalent basis in a solid content of an entire covering film and Si at 5 to 20 mass % on a Si-equivalent basis in the entire covering film,
wherein a layer thickness of the resin covering layer is 0.5 to 2.0 μm, and a coefficient of kinetic friction of a surface of the resin covering layer is 0.06 to 0.25.
7. The surface-treated steel sheet for fuel tanks according to claim 1, comprising, on the trivalent chromate covering layer or the chromate-free covering layer:
a resin covering layer containing a urethane group and a urea group at 0.6 to 10 mass % on a N-equivalent basis in a solid content of an entire covering film of the resin covering layer and Si at 5 to 20 mass % on a Si-equivalent basis in the entire covering film of the resin covering layer,
wherein a layer thickness of the resin covering layer is 0.5 to 2.0 μm, and a coefficient of kinetic friction of a surface of the resin covering layer is 0.06 to 0.25.

8. The surface-treated steel sheet for fuel tanks according to claim 1, comprising, on the trivalent chromate covering layer or the chromate-free covering layer:
an organic covering layer containing a resin having a urethane bond, one or two of a polyolefin resin and a fluorine resin, and an electrically conductive pigment, with a film thickness of 3 to 20 μm,
wherein the resin having a urethane bond is an organic resin obtained from a film-forming resin source material containing (I) a polyester polyol having at least three functional groups, and (II) a blocked product of an organic polyisocyanate, or a blocked product of a prepolymer having an NCO group at a terminal obtained by a reaction between an organic polyisocyanate and an active hydrogen compound.

9. The surface-treated steel sheet for fuel tanks according to claim 8,
wherein the electrically conductive pigment in the organic covering layer is made of one or more of stainless steel, Zn, Al, Ni, ferrosilicon, and iron phosphide, and a content ratio of the electrically conductive pigment is 5 to 50 volume % on a solid content basis.

10. The surface-treated steel sheet for fuel tanks according to claim 8,
wherein the organic covering layer further contains an antirust pigment at 1 to 40 volume % on a solid content basis, and contains the electrically conductive pigment and the antirust pigment at 5 to 70 volume % in total on a solid content basis.

11. The surface-treated steel sheet for fuel tanks according to claim 1, comprising:
the Zn—Ni alloy plating layer on one surface or both surfaces of the steel sheet;
the trivalent chromate covering layer on the Zn—Ni alloy plating layer; and
a second resin covering layer containing a crosslinked epoxy-urethane-based resin and at least one of a polyolefin resin and a fluorine-based resin on the trivalent chromate covering layer,
wherein
the amount of Cr of the trivalent chromate covering film is 5 to 200 mg/m² on a Cr-equivalent basis, and
a layer thickness of the second resin covering layer is 0.3 to 2.0 μm, and a coefficient of kinetic friction of a surface of the second resin covering layer is 0.06 to 0.25.

12. A surface-treated steel sheet for fuel tanks, comprising:
a Zn—Ni alloy plating layer on one surface or both surfaces of a steel sheet; and
a trivalent chromate covering layer or a chromate-free covering layer on the Zn—Ni alloy plating layer,
wherein the steel sheet comprises, in mass %,
C: 0.0005 to 0.0050%,
Si: 0.01 to 1.00%,
Mn: 0.70 to 2.00%,
P: less than or equal to 0.060%,
S: less than or equal to 0.010%,
Al: 0.01 to 0.30%,
N: 0.001 to 0.010%,
Ti: 0.010 to 0.050%,
Nb: 0.010 to 0.040%,
B: 0.0005 to 0.0030%, and
the balance comprising Fe and unavoidable impurities, and
in a surface outermost layer, concavities, of which a depth from an arithmetic average height of a cross-sectional curve of the surface outermost layer is more than or equal to 0.1 μm, exist in a proportion of 50 to 1000 concavities/mm² and at an area ratio of 20 to 80% to a surface area of the steel sheet,
wherein the concavities in the outermost layer are formed from concavities on the Zn—Ni alloy plating layer and the steel sheet.

13. A surface-treated steel sheet for fuel tanks, comprising:
a Zn—Ni alloy plating layer on one surface or both surfaces of a steel sheet; and a trivalent chromate covering layer or a chromate-free covering layer on the Zn—Ni alloy plating layer,
wherein the steel sheet consists of, in mass %,
C: 0.0005 to 0.0050%,
Si: 0.01 to 1,00%,
Mn: 0.70 to 2.00%,
P: less than or equal to 0.060%,
S: less than or equal to 0.010%,
Al: 0.01 to 0.30%,
N: 0.001 to 0.010%,
Ti: 0.010 to 0.050%,
Nb: 0.010 to 0.040%,
B: 0.0005 to 0.0030%, and
the balance: Fe and unavoidable impurities, and
in the surface outermost layer, concavities, of which a depth from an arithmetic average height of a cross-sectional curve of the surface outermost layer is more than or equal to 0.1 μm, exist in a range of $1.0 \times 10^4$ to $1.0 \times 10^6$ in terms of an outer layer form indicator Z defined by Formula (a) below, $Z$ (μm³/mm²)=sum total of volumes (a total volume), in μm³, of concavities of which the depth from the arithmetic average height of the cross-sectional curve of the surface outermost layer is more than or equal to 0.1 μm per unit area, in mm², of the surface outermost layer      Formula (a), wherein the concavities in the outermost layer are formed from concavities on the Zn—Ni alloy plating layer and the steel sheet.

14. A surface-treated steel sheet for fuel tanks, comprising:
a Zn—Ni alloy plating layer on one surface or both surfaces of a steel sheet; and
a trivalent chromate covering layer or a chromate-free covering layer on the Zn—Ni alloy plating layer,
wherein the steel sheet consists of, in mass %,
C: 0.0005 to 0.0050%,
Si: 0.01 to 1.00%,
Mn: 0.70 to 2.00%,
P: less than or equal to 0.060%,
S: less than or equal to 0.010%,
Al: 0.01 to 0.30%,
N: 0.001 to 0.010%,
Ti: 0.010 to 0,050%,
Nb: 0.010 to 0.040%,
B: 0.0005 to 0.0030%, and
the balance: Fe and unavoidable impurities, and
on a surface outermost layer, an arithmetic average roughness (Ra) in a rectangular area with four 5-μm sides is 5 to 200 nm, and a maximum cross-sectional height (Rt) of a roughness curve is 100 to 1000 nm.

* * * * *